US 8,181,065 B2

United States Patent
Fachan et al.

(10) Patent No.: US 8,181,065 B2
(45) Date of Patent: May 15, 2012

(54) SYSTEMS AND METHODS FOR PROVIDING NONLINEAR JOURNALING

(75) Inventors: Neal T. Fachan, Seattle, WA (US); Peter J. Godman, Seattle, WA (US); Justin M. Husted, Seattle, WA (US); Aaron J. Passey, Seattle, WA (US)

(73) Assignee: EMC Corporation, Hopkinton, MA (US)

( * ) Notice: Subject to any disclaimer, the term of this patent is extended or adjusted under 35 U.S.C. 154(b) by 260 days.

(21) Appl. No.: 12/716,110

(22) Filed: Mar. 2, 2010

(65) Prior Publication Data
US 2010/0223235 A1    Sep. 2, 2010

Related U.S. Application Data

(62) Division of application No. 11/507,073, filed on Aug. 18, 2006, now Pat. No. 7,676,691.

(51) Int. Cl.
*G06F 11/00* (2006.01)
(52) U.S. Cl. ............................................ 714/15; 714/6.1
(58) Field of Classification Search .................... 714/15, 714/5.1, 5.11, 6.1, 6.11, 6.12, 6.13, 6.3, 6.31, 714/6.32, 10–13; 711/112, 114, 154
See application file for complete search history.

(56) References Cited

U.S. PATENT DOCUMENTS

| | | | |
|---|---|---|---|
| 5,163,131 A | 11/1992 | Row et al. |
| 5,181,162 A | 1/1993 | Smith et al. |
| 5,212,784 A | 5/1993 | Sparks |
| 5,230,047 A | 7/1993 | Frey et al. |
| 5,251,206 A | 10/1993 | Calvignac et al. |
| 5,258,984 A | 11/1993 | Menon et al. |
| 5,329,626 A | 7/1994 | Klein et al. |
| 5,359,594 A | 10/1994 | Gould et al. |
| 5,403,639 A | 4/1995 | Belsan et al. |
| 5,548,724 A | 8/1996 | Akizawa et al. |
| 5,596,709 A | 1/1997 | Bond et al. |
| 5,606,669 A | 2/1997 | Bertin et al. |
| 5,612,865 A | 3/1997 | Dasgupta |
| 5,649,200 A | 7/1997 | Leblang et al. |
| 5,657,439 A | 8/1997 | Jones et al. |
| 5,668,943 A | 9/1997 | Attanasio et al. |
| 5,680,621 A | 10/1997 | Korenshtein |
| 5,694,593 A | 12/1997 | Baclawski |
| 5,696,895 A | 12/1997 | Hemphill et al. |
| 5,734,826 A | 3/1998 | Olnowich et al. |
| 5,761,659 A | 6/1998 | Bertoni |
| 5,774,643 A | 6/1998 | Lubbers et al. |
| 5,799,305 A | 8/1998 | Bortvedt et al. |

(Continued)

FOREIGN PATENT DOCUMENTS
EP    0774723    5/1997
(Continued)

OTHER PUBLICATIONS

Nov. 15, 2002 Int'l Search report PCT/US02/24728, 2 pages.

(Continued)

*Primary Examiner* — Dieu-Minh Le
(74) *Attorney, Agent, or Firm* — Knobbe, Martens, Olson & Bear LLP

(57) ABSTRACT

In one embodiment, systems and methods are provided for nonlinear journaling. In one embodiment, groups of data designated for storage in a data storage unit are journaled into persistent storage. In one embodiment, the journal data is recorded nonlinearly. In one embodiment, a linked data structure records data and data descriptors in persistent storage.

22 Claims, 37 Drawing Sheets

U.S. PATENT DOCUMENTS

| | | |
|---|---|---|
| 5,805,578 A | 9/1998 | Stirpe et al. |
| 5,805,900 A | 9/1998 | Fagen et al. |
| 5,806,065 A | 9/1998 | Lomet |
| 5,822,790 A | 10/1998 | Mehrotra |
| 5,862,312 A | 1/1999 | Mann |
| 5,870,563 A | 2/1999 | Roper et al. |
| 5,878,410 A | 3/1999 | Zbikowski et al. |
| 5,878,414 A | 3/1999 | Hsiao et al. |
| 5,884,046 A | 3/1999 | Antonov |
| 5,884,098 A | 3/1999 | Mason, Jr. |
| 5,884,303 A | 3/1999 | Brown |
| 5,890,147 A | 3/1999 | Peltonen et al. |
| 5,917,998 A | 6/1999 | Cabrera et al. |
| 5,933,834 A | 8/1999 | Aichelen |
| 5,943,690 A | 8/1999 | Dorricott et al. |
| 5,966,707 A | 10/1999 | Van Huben et al. |
| 5,996,089 A | 11/1999 | Mann |
| 6,014,669 A | 1/2000 | Slaughter et al. |
| 6,021,414 A | 2/2000 | Fuller |
| 6,029,168 A | 2/2000 | Frey |
| 6,038,570 A | 3/2000 | Hitz et al. |
| 6,044,367 A | 3/2000 | Wolff |
| 6,052,759 A | 4/2000 | Stallmo et al. |
| 6,055,543 A | 4/2000 | Christensen et al. |
| 6,070,172 A | 5/2000 | Lowe |
| 6,081,833 A | 6/2000 | Okamoto et al. |
| 6,081,883 A | 6/2000 | Popelka et al. |
| 6,108,759 A | 8/2000 | Orcutt et al. |
| 6,117,181 A | 9/2000 | Dearth et al. |
| 6,122,754 A | 9/2000 | Litwin et al. |
| 6,138,126 A | 10/2000 | Hitz et al. |
| 6,154,854 A | 11/2000 | Stallmo |
| 6,173,374 B1 | 1/2001 | Heil et al. |
| 6,209,059 B1 | 3/2001 | Ofer et al. |
| 6,219,693 B1 | 4/2001 | Napolitano et al. |
| 6,321,345 B1 | 11/2001 | Mann |
| 6,334,168 B1 | 12/2001 | Islam et al. |
| 6,353,823 B1 | 3/2002 | Kumar |
| 6,384,626 B2 | 5/2002 | Tsai et al. |
| 6,385,626 B1 | 5/2002 | Tamer et al. |
| 6,393,483 B1 | 5/2002 | Latif et al. |
| 6,397,311 B1 | 5/2002 | Capps |
| 6,405,219 B2 | 6/2002 | Saether et al. |
| 6,408,313 B1 | 6/2002 | Campbell et al. |
| 6,421,781 B1 | 7/2002 | Fox et al. |
| 6,434,574 B1 | 8/2002 | Day et al. |
| 6,449,730 B2 | 9/2002 | Mann |
| 6,453,389 B1 | 9/2002 | Weinberger et al. |
| 6,457,139 B1 | 9/2002 | D'Errico et al. |
| 6,463,442 B1 | 10/2002 | Bent et al. |
| 6,499,091 B1 | 12/2002 | Bergsten |
| 6,502,172 B2 | 12/2002 | Chang |
| 6,502,174 B1 | 12/2002 | Beardsley |
| 6,523,130 B1 | 2/2003 | Hickman et al. |
| 6,526,478 B1 | 2/2003 | Kirby |
| 6,546,443 B1 | 4/2003 | Kakivaya et al. |
| 6,549,513 B1 | 4/2003 | Chao et al. |
| 6,557,114 B2 | 4/2003 | Mann |
| 6,567,894 B1 | 5/2003 | Hsu et al. |
| 6,567,926 B2 | 5/2003 | Mann |
| 6,571,244 B1 | 5/2003 | Larson |
| 6,571,349 B1 | 5/2003 | Mann |
| 6,574,745 B2 | 6/2003 | Mann |
| 6,594,655 B2 | 7/2003 | Tal et al. |
| 6,594,660 B1 | 7/2003 | Berkowitz et al. |
| 6,594,744 B1 | 7/2003 | Humlicek et al. |
| 6,598,174 B1 | 7/2003 | Parks et al. |
| 6,618,798 B1 | 9/2003 | Burton et al. |
| 6,662,184 B1 | 12/2003 | Friedberg |
| 6,671,686 B2 | 12/2003 | Pardon et al. |
| 6,671,704 B1 | 12/2003 | Gondi et al. |
| 6,732,125 B1 | 5/2004 | Autrey et al. |
| 6,748,429 B1 | 6/2004 | Talluri et al. |
| 6,801,949 B1 | 10/2004 | Bruck et al. |
| 6,848,029 B2 | 1/2005 | Coldewey |
| 6,856,591 B1 | 2/2005 | Ma et al. |
| 6,895,534 B2 | 5/2005 | Wong et al. |
| 6,907,011 B1 | 6/2005 | Miller et al. |
| 6,917,942 B1 | 7/2005 | Burns et al. |
| 6,922,696 B1 | 7/2005 | Lincoln et al. |
| 6,934,878 B2 | 8/2005 | Massa et al. |
| 6,940,966 B2 | 9/2005 | Lee |
| 6,954,435 B2 | 10/2005 | Billhartz et al. |
| 6,990,604 B2 | 1/2006 | Binger |
| 6,990,611 B2 | 1/2006 | Busser |
| 7,007,044 B1 | 2/2006 | Rafert et al. |
| 7,007,097 B1 | 2/2006 | Huffman et al. |
| 7,017,003 B2 | 3/2006 | Murotani et al. |
| 7,043,485 B2 | 5/2006 | Manley et al. |
| 7,069,320 B1 | 6/2006 | Chang et al. |
| 7,111,305 B2 | 9/2006 | Solter et al. |
| 7,124,264 B2 | 10/2006 | Yamashita |
| 7,146,524 B2 | 12/2006 | Patel et al. |
| 7,152,182 B2 | 12/2006 | Ji et al. |
| 7,177,295 B1 | 2/2007 | Sholander et al. |
| 7,184,421 B1 | 2/2007 | Liu et al. |
| 7,194,487 B1 | 3/2007 | Kekre et al. |
| 7,225,204 B2 | 5/2007 | Manley et al. |
| 7,228,299 B1 | 6/2007 | Harmer et al. |
| 7,240,235 B2 | 7/2007 | Lewalski-Brechter |
| 7,249,118 B2 | 7/2007 | Sandler et al. |
| 7,257,257 B2 | 8/2007 | Anderson et al. |
| 7,313,614 B2 | 12/2007 | Considine et al. |
| 7,318,134 B1 | 1/2008 | Oliveira et al. |
| 7,373,426 B2 | 5/2008 | Jinmei et al. |
| 7,386,697 B1 | 6/2008 | Case et al. |
| 7,440,966 B2 | 10/2008 | Adkins et al. |
| 7,451,341 B2 | 11/2008 | Okaki et al. |
| 7,509,448 B2 | 3/2009 | Fachan et al. |
| 7,533,298 B2 | 5/2009 | Smith et al. |
| 7,546,354 B1 | 6/2009 | Fan et al. |
| 7,546,412 B2 | 6/2009 | Ahmad et al. |
| 7,571,348 B2 | 8/2009 | Deguchi et al. |
| 7,680,836 B2 | 3/2010 | Anderson et al. |
| 7,680,842 B2 | 3/2010 | Anderson et al. |
| 2001/0042224 A1 | 11/2001 | Stanfill et al. |
| 2001/0047451 A1 | 11/2001 | Noble et al. |
| 2001/0056492 A1 | 12/2001 | Bressoud et al. |
| 2002/0010696 A1 | 1/2002 | Izumi |
| 2002/0035668 A1 | 3/2002 | Nakano et al. |
| 2002/0038436 A1 | 3/2002 | Suzuki |
| 2002/0055940 A1 | 5/2002 | Elkan |
| 2002/0072974 A1 | 6/2002 | Pugliese et al. |
| 2002/0075870 A1 | 6/2002 | de Azevedo et al. |
| 2002/0078180 A1 | 6/2002 | Miyazawa |
| 2002/0083078 A1 | 6/2002 | Pardon et al. |
| 2002/0083118 A1 | 6/2002 | Sim |
| 2002/0087366 A1 | 7/2002 | Collier et al. |
| 2002/0095438 A1 | 7/2002 | Rising et al. |
| 2002/0124137 A1 | 9/2002 | Ulrich et al. |
| 2002/0138559 A1 | 9/2002 | Ulrich et al. |
| 2002/0156840 A1 | 10/2002 | Ulrich et al. |
| 2002/0156891 A1 | 10/2002 | Ulrich et al. |
| 2002/0156973 A1 | 10/2002 | Ulrich et al. |
| 2002/0156974 A1 | 10/2002 | Ulrich et al. |
| 2002/0156975 A1 | 10/2002 | Staub et al. |
| 2002/0158900 A1 | 10/2002 | Hsieh et al. |
| 2002/0161846 A1 | 10/2002 | Ulrich et al. |
| 2002/0161850 A1 | 10/2002 | Ulrich et al. |
| 2002/0161973 A1 | 10/2002 | Ulrich et al. |
| 2002/0163889 A1 | 11/2002 | Yemini et al. |
| 2002/0165942 A1 | 11/2002 | Ulrich et al. |
| 2002/0166026 A1 | 11/2002 | Ulrich et al. |
| 2002/0166079 A1 | 11/2002 | Ulrich et al. |
| 2002/0169827 A1 | 11/2002 | Ulrich et al. |
| 2002/0174295 A1 | 11/2002 | Ulrich et al. |
| 2002/0174296 A1 | 11/2002 | Ulrich et al. |
| 2002/0178162 A1 | 11/2002 | Ulrich et al. |
| 2002/0191311 A1 | 12/2002 | Ulrich et al. |
| 2002/0194523 A1 | 12/2002 | Ulrich et al. |
| 2002/0194526 A1 | 12/2002 | Ulrich et al. |
| 2002/0198864 A1 | 12/2002 | Ostermann et al. |
| 2003/0005159 A1 | 1/2003 | Kumhyr |
| 2003/0014391 A1 | 1/2003 | Evans et al. |
| 2003/0033308 A1 | 2/2003 | Patel et al. |
| 2003/0061491 A1 | 3/2003 | Jaskiewicz et al. |
| 2003/0109253 A1 | 6/2003 | Fenton et al. |

| | | | | | |
|---|---|---|---|---|---|
| 2003/0120863 A1 | 6/2003 | Lee et al. | 2008/0126365 A1 | 5/2008 | Fachan et al. |
| 2003/0125852 A1 | 7/2003 | Schade et al. | 2008/0154978 A1 | 6/2008 | Lemar et al. |
| 2003/0131860 A1 | 7/2003 | Ashcraft et al. | 2008/0168458 A1 | 7/2008 | Fachan et al. |
| 2003/0135514 A1 | 7/2003 | Patel et al. | 2008/0256103 A1 | 10/2008 | Fachan et al. |
| 2003/0149750 A1 | 8/2003 | Franzenburg | 2008/0256545 A1 | 10/2008 | Akidau et al. |
| 2003/0158873 A1 | 8/2003 | Sawdon et al. | 2008/0294611 A1 | 11/2008 | Anglin et al. |
| 2003/0163726 A1 | 8/2003 | Kidd | | | |
| 2003/0172149 A1 | 9/2003 | Edsall et al. | | | |
| 2003/0177308 A1 | 9/2003 | Lewalski-Brechter | | | |
| 2003/0182325 A1 | 9/2003 | Manley et al. | | | |
| 2004/0003053 A1 | 1/2004 | Williams | | | |
| 2004/0024731 A1 | 2/2004 | Cabrera et al. | | | |
| 2004/0024963 A1 | 2/2004 | Talagala et al. | | | |
| 2004/0078812 A1 | 4/2004 | Calvert | | | |
| 2004/0133670 A1 | 7/2004 | Kaminsky et al. | | | |
| 2004/0143647 A1 | 7/2004 | Cherkasova | | | |
| 2004/0153479 A1 | 8/2004 | Mikesell et al. | | | |
| 2004/0189682 A1 | 9/2004 | Troyansky et al. | | | |
| 2004/0199734 A1 | 10/2004 | Rajamani et al. | | | |
| 2004/0199812 A1 | 10/2004 | Earl et al. | | | |
| 2004/0205141 A1 | 10/2004 | Goland | | | |
| 2004/0230748 A1 | 11/2004 | Ohba | | | |
| 2004/0260673 A1 | 12/2004 | Hitz et al. | | | |
| 2005/0010592 A1 | 1/2005 | Guthrie | | | |
| 2005/0066095 A1 | 3/2005 | Mullick et al. | | | |
| 2005/0114402 A1 | 5/2005 | Guthrie | | | |
| 2005/0114609 A1 | 5/2005 | Shorb | | | |
| 2005/0131860 A1 | 6/2005 | Livshits | | | |
| 2005/0131990 A1 | 6/2005 | Jewell | | | |
| 2005/0138195 A1 | 6/2005 | Bono | | | |
| 2005/0171960 A1 | 8/2005 | Lomet | | | |
| 2005/0171962 A1 | 8/2005 | Martin et al. | | | |
| 2005/0187889 A1 | 8/2005 | Yasoshima | | | |
| 2005/0188052 A1 | 8/2005 | Ewanchuk et al. | | | |
| 2005/0192993 A1 | 9/2005 | Messinger | | | |
| 2005/0289169 A1 | 12/2005 | Adya et al. | | | |
| 2005/0289188 A1 | 12/2005 | Nettleton et al. | | | |
| 2006/0004760 A1 | 1/2006 | Clift et al. | | | |
| 2006/0041894 A1 | 2/2006 | Cheng | | | |
| 2006/0047925 A1 | 3/2006 | Perry | | | |
| 2006/0059467 A1 | 3/2006 | Wong | | | |
| 2006/0074922 A1 | 4/2006 | Nishimura | | | |
| 2006/0083177 A1 | 4/2006 | Iyer et al. | | | |
| 2006/0095438 A1 | 5/2006 | Fachan et al. | | | |
| 2006/0101062 A1 | 5/2006 | Godman et al. | | | |
| 2006/0129584 A1 | 6/2006 | Hoang et al. | | | |
| 2006/0129631 A1 | 6/2006 | Na et al. | | | |
| 2006/0129983 A1 | 6/2006 | Feng | | | |
| 2006/0155831 A1 | 7/2006 | Chandrasekaran | | | |
| 2006/0206536 A1 | 9/2006 | Sawdon et al. | | | |
| 2006/0230411 A1 | 10/2006 | Richter et al. | | | |
| 2006/0277432 A1 | 12/2006 | Patel | | | |
| 2006/0288161 A1 | 12/2006 | Cavallo | | | |
| 2007/0091790 A1 | 4/2007 | Passey et al. | | | |
| 2007/0094269 A1 | 4/2007 | Mikesell et al. | | | |
| 2007/0094277 A1 | 4/2007 | Fachan et al. | | | |
| 2007/0094310 A1 | 4/2007 | Passey et al. | | | |
| 2007/0094431 A1 | 4/2007 | Fachan | | | |
| 2007/0094452 A1 | 4/2007 | Fachan | | | |
| 2007/0168351 A1 | 7/2007 | Fachan | | | |
| 2007/0171919 A1 | 7/2007 | Godman et al. | | | |
| 2007/0195810 A1 | 8/2007 | Fachan | | | |
| 2007/0233684 A1 | 10/2007 | Verma et al. | | | |
| 2007/0233710 A1 | 10/2007 | Passey et al. | | | |
| 2007/0255765 A1 | 11/2007 | Robinson | | | |
| 2008/0005145 A1 | 1/2008 | Worrall | | | |
| 2008/0010507 A1 | 1/2008 | Vingralek | | | |
| 2008/0021907 A1 | 1/2008 | Patel et al. | | | |
| 2008/0031238 A1 | 2/2008 | Harmelin et al. | | | |
| 2008/0034004 A1 | 2/2008 | Cisler et al. | | | |
| 2008/0044016 A1 | 2/2008 | Henzinger | | | |
| 2008/0046432 A1 | 2/2008 | Anderson et al. | | | |
| 2008/0046443 A1 | 2/2008 | Fachan et al. | | | |
| 2008/0046444 A1 | 2/2008 | Fachan et al. | | | |
| 2008/0046445 A1 | 2/2008 | Passey et al. | | | |
| 2008/0046475 A1 | 2/2008 | Anderson et al. | | | |
| 2008/0046476 A1 | 2/2008 | Anderson et al. | | | |
| 2008/0046667 A1 | 2/2008 | Fachan et al. | | | |
| 2008/0059541 A1 | 3/2008 | Fachan et al. | | | |

FOREIGN PATENT DOCUMENTS

| | | |
|---|---|---|
| JP | 2006-506741 | 6/2004 |
| WO | WO 94/29796 | 12/1994 |
| WO | WO 00/57315 | 9/2000 |
| WO | WO 01/14991 | 3/2001 |
| WO | WO 01/33829 | 5/2001 |
| WO | WO 02/061737 | 8/2002 |
| WO | WO 03/012699 | 2/2003 |
| WO | WO 2004/046971 | 6/2004 |
| WO | WO 2008/021527 | 2/2008 |
| WO | WO 2008/021528 | 2/2008 |

OTHER PUBLICATIONS

Apr. 20, 2004 Int'l Search report PCT/US03/36699, 10 pages.
Aug. 6, 2004 Int'l Search report PCT/US03/33704, 11 pages.
May 21, 2007 European Search Report EP 02756944.1-2201, 8 pages.
Feb. 22, 2008 Int'l Search report PCT/US07/018326, 20 pages.
Supp EPO Search Report, App. No. EP 03 78 3599; dated Apr. 29, 2008, 2 pages.
May 8, 2008 Int'l Search report PCT/US07/018324, 13 pages.
May 18, 2009 Int'l Search report PCT/US08/059798, 18 pages.
Oct. 22, 2009 Int'l Preliminary Report on Patentability PCT/US08/059798, 10 pages.
Philip A. Bernstein, Vassos Hadzilacos, and Nathan Goodman, Concurrency Control and Recovery in Database Systems, Addison-Wesley, 370 pages, 1987.
Kenneth P. Birman, Building Secure and Reliable Network Applications, Manning, 1996, pp. 1-327.
Kenneth P. Birman, Building Secure and Reliable Network Applications, Manning, 1996, pp. 328-619.
Birk, Y., Deterministic load-balancing schemes for disk-based video-on-demand storage servers, Mass Storage Systems 1995; Storage—At the Forefront of Information Infrastructures, Proceedings of the Fourteenth IEEE Symposium on Monterey, CA, Sep. 11-14, 1995, pp. 17-25.
Coulouris et al., Distributed Systems Concepts and Design; Addison-Wesley, Second Edition, 1994, pp. 353-371 and 377-405.
Jim Gray and Andreas Reuter, Transaction Processing: Concepts and Techniques, Morgan Kaufmann, 1993, pp. 1-328.
Jim Gray and Andreas Reuter, Transaction Processing: Concepts and Techniques, Morgan Kaufmann, 1993, pp. 329-664.
Jim Gray and Andreas Reuter, Transaction Processing: Concepts and Techniques, Morgan Kaufmann, 1993, pp. 665-1105.
Kumar, Akhil, "An analysis of borrowing policies for escrow transactions in a replicated data environment", Institute of Electrical and Electronics Engineers; Proceedings of the International Conference on Data Engineering, Los Angeles, Feb. 5-9, 1990; Los Alamitos, IEEE, Comp. Soc. Press, US. vol. Conf. 6, pp. 446-454, XP010018185 ISBN: 978-0-8186-2025-6 p. 446, left-hand column, line 1—p. 447, last line.
Nancy A. Lynch, Distributed Algorithms, Morgan Kaufmann, 1996, pp. 1-409.
Nancy A. Lynch, Distributed Algorithms, Morgan Kaufmann, 1996 pp. 410-871.
Sape Mullender, editor, Distributed Systems (2nd Ed.), ACM Press/Addison-Wesley Publishing Co., New York, NY, USA, 1993, pp. 1-327.
Sape Mullender, editor, Distributed Systems (2nd Ed.), ACM Press/Addison-Wesley Publishing Co., New York, NY, USA, 1993, pp. 328-604.
Gibson, Garth A. et al., *The Scotch Parallel Storage System*, IEEE, 1995, pp. 403-410.
Gerhard Weikum, et al., Transactional Information Systems: Theory, Algorithms, and the Practice of Concurrency Control and Recovery, Morgan Kaufmann, 2002, pp. 1-450.

Gerhard Weikum, et al., Transactional Information Systems: Theory, Algorithms, and the Practice of Concurrency Control and Recovery, Morgan Kaufmann, 2002, pp. 451-863.
Sanjay Ghemawat et al., The Google File System, Symposium on Operating Systems Principles, Oct. 19-22, 2003, 15 pages, Bolton Landing, NY.
Pei Cao et al., The TickerTAIP parallel RAID architecture, 1993, 12 pages, Princeton, NJ.
Pei Cao et al., The TickerTAIP parallel RAID architecture, ACM Transactions on Computer Systems, vol. 12, No. 3, Aug. 1994, 34 pages, Palto Alto, California.
Duzett, Bob et al., *An Overview of the nCube 3 Supercomputer*, IEEE, Jul. 1992, pp. 458-464.
Hartman, John Henry, *The Zebra Striped Network File System*, (Sc.B. (Brown University) 1987, pp. 1-148.
Long, Darrell D.E., et al., *Swift/RAID: A Distributed RAID System, Computing Systems*, vol. 7, No. 3 Summer 1994, pp. 333-359.
Stallings, William, Operating Systems, Prentice Hall, Fourth Edition; 2001, pp. 197-253 and 265-293.
Michael Stonebraker et al., Distributed Raid: A New Multiple Copy Algorithm, Proc. Sixth Int. Conf. Data Eng., IEEE Service Center, Piscataway, NJ (IEEE cat No. 90CH2840-7), pp. 430-437, Feb. 5, 1990.
United States Court of Appeals, Federal Circuit, *Seachange International, Inc.* vs. *nCUBE, Corp.*, Oct. 26, 2004, 28 pages.
United States Court of Appeals, Federal Circuit, *Seachange International, Inc.* vs. *C-Corp, Inc.*, Jun. 29, 2005, 22 pages.
United States District Court, Delaware, *Seachange International, Inc.* vs. *nCUBE, Corp.*, Apr. 7, 2004, 13 pages.
United States District Court, Delaware, *Seachange International, Inc.* vs. *nCUBE, Corp.*, Aug. 29, 2000, 12 pages.
Steven M. Bauer, Letter to Steve Goldman, Jul. 31, 2006 (including the first page of the patents), 8 pages.
Arthur S. Rose, Letter to Steven M. Bauer, Aug. 7, 2006, 2 pages.
Steven M. Bauer, Letter to Arthur S. Rose, Sep. 25, 2006, 2 pages.
Steven M. Bauer, Letter to Arthur S. Rose, Oct. 31, 2006, 1 page.
Arthur S. Rose, Letter to Steven M. Bauer, Nov. 9, 2006, 2 pages.
Steven M. Bauer, Letter to Arthur S. Rose, Feb. 6, 2007, 2 pages.
Arthur S. Rose, Letter to Steven M. Bauer, Feb. 23, 2007, 1 page.
Steven M. Bauer, Letter to Arthur S. Rose, Jun. 6, 2007 (including claim chart), 28 pages.
Arthur S. Rose, Letter to Steven M. Bauer, Jun. 22, 2007, 1 page.
Todd A. Gerety, Letter to Arthur S. Rose, Jun. 26, 2007 (exhibits listed separately below), 1 page.
Arthur S. Rose, Letter to Steven M. Bauer, Aug. 31, 2007, 4 pages.
Isilon Systems, "Isilon IQ Plateform Overview", 4 pages, 2007 (Exhibit A).
Isilon Systems, "Uncompromising Reliability through Clustered Storage", Sep. 2006, 10 pages (Exhibit B).
Byteandswitch, "Discovery Chooses Isilon," Apr. 23, 2007, 1 page (Exhibit C).
Taneja Group Technology Analysts, "The Power of InfiniBand and Clustered Storage", Dec. 2005, 8 pages (Exhibit E).
Ramez Elmasri, Fundamentals of Database Systems 3rd ed, Sep. 30, 1999, Addison-Wesley, pp. 155, 169, 171, 172, 173, 178, 181, 182, 381, 771.
MCSA/MSCE/MCDBA Self Paced Training Kit: MS SQL Server 2000 System Administration, May 14, 2003, Microsoft Press, Second Edition, 12 pages.
Levy E., Ed.—Institute of Electrical and Electronics Engineers: "Incremental restart (database management)" Proc. Int. Conf. Data Eng., Kobe, JP, Apr. 8-12, 1991; IEEE Comp. Soc. Press, U.S., vol. Conf. 7, Apr. 8, 1991, pp. 640-648.
Haerder T et al: "Principles of Transaction-Oriented Database Recovery" ACM Computing Surveys, ACM, New York, NY, US, vol. 15, No. 4, Dec. 1, 1983, pp. 287-317.
Gray J et al: "Transaction processing: concepts and techniques (excerpt), Passage" Transaction Processing: Concepts and Techniques, Jan. 1, 1993, pp. 373-445.
Garcia-Molina H et al: "Database System Implementation, passage" Database System Implementation, Jan. 1, 2000, pp. I-V, 423-509.
Wedde H. F., et al.: "A universal framework for managing metadata in the distributed Dragon Slayer System", Proceedings of the Euromicro Conference. Euromicro. Informatics: Inventing the Future, Proceedings of Euromicro Workshop on Multimedia and Telecommunications, vol. 2, Sep. 5, 2000, pp. 96-101.
Tanenbaum, Andrew S., MINIX Operating System, Japan, Apr. 21, 1989, 1st Edition, pp. 328, 505; Also attached is what Applicant believes is the English language version: Tanenbaum, Andrew S., Operating Systems: Design and Implementation, Prentice-Hall, 1987, pp. 279, 347, 348.
Yamashita, Hirofumi, et al., "Development of RAID Filesystem VAFS/HR," The Special Interest Group Notes of IPSJ, Japan, Information Processing Society of Japan, Sep. 16, 1994, vol. 94, No. 80, p. 9-16.
Lougher P. et al., "Scalable storage servers for digital audio and video," International Conference on Storage and Recording Systems, 1994, Keele, UK, Jan. 1, 1994, pp. 140-143.
Keidar, et al.: Increasing the Resilience of Distributed and Replicated Database Systems (1998) pp. 1-25.
Reddy, P. Krishna et al., Reducing the blocking in two phase commit with backup sites Apr. 15, 2003, Elsevier, pp. 39-47.
IOS Commands, Feb. 6, 2005, Pantz.org, [online], <web.archive.org/web/20050206184604/http://pantz.org/os/ios/ioscommands.shtml>, pp. 1-12 as printed.
IP Forwarding with Cisco Routers Lab Exercises, Jun. 15, 1999 [online], <ws.eduisoc.org/data1999/1481713642400af6a2de65a/ip_fwd_cisco_config.ppt>, pp. 1-11 as printed.
Hisayuki Aoki, Parallel Filesystem MFS, IPSJ SIG Technical Reports, Japan, Information Processing Society of Japan, Aug. 26, 1996, vol. 96, No. 79, pp. 31 to 36 (stamped Citation 1 / English Translation attached) total 23 pages.
Yoshitake Shinkai, Cluster File System: HAMFS, Fujitsu, Japan, Fujitsu Limited, Jul. 9, 1999, vol. 50, No. 4, pp. 210 to 214 (stamped Citation 2 / English Translation attached) total 16 pages.
Apr. 3, 2009 Non-Final Rejection in U.S. Appl. No. 11/506,597, filed Aug. 18, 2006.
Dec. 15, 2009 Final Office Action in U.S. Appl. No. 11/506,597, filed Aug. 18, 2006.
May 27, 2009 Non-Final Rejection in U.S. Appl. No. 11/507,073, filed Aug. 18, 2006.
Oct. 27, 2009 Response to May 27, 2009 Non-Final Rejection in U.S. Appl. No. 11/507,073, filed Aug. 18, 2006.
Dec. 8, 2009 Notice of Allowance in U.S. Appl. No. 11/507,073, filed Aug. 18, 2006.
Feb. 17, 2010 Issue Notification in U.S. Appl. No. 11/507,073, filed Aug. 18, 2006.
Jun. 17, 2008 Non-Final Rejection in U.S. Appl. No. 11/507,070, filed Aug. 18, 2006.
Oct. 16, 2008 Response to Jun. 17, 2008 Non-Final Rejection in U.S. Appl. No. 11/507,070, filed Aug. 18, 2006.
Jan. 22, 2009 Final Rejection in U.S. Appl. No. 11/507,070, filed Aug. 18, 2006.
Aug. 6, 2009 Non-Final Rejection in U.S. Appl. No. 11/507,070, filed Aug. 18, 2006.
Jun. 27, 2008 Non-Final Rejection in U.S. Appl. No. 11/507,076, filed Aug. 18, 2006.
Oct. 27, 2008 Response to Jun. 27, 2008 Non-Final Rejection in U.S. Appl. No. 11/507,076, filed Aug. 18, 2006.
Jan. 23, 2009 Final Rejection in U.S. Appl. No. 11/507,076, filed Aug. 18, 2006.
May 22, 2009 Response to Jan. 23, 2009 Final Rejection in U.S. Appl. No. 11/507,076, filed Aug. 18, 2006.
Jun. 26, 2009 Rejection in U.S. Appl. No. 11/507,076, filed Aug. 18, 2006.
Sep. 28, 2009 Response to Jun. 26, 2009 Rejection in U.S. Appl. No. 11/507,076, filed Aug. 18, 2006.
Jul. 2, 2009 Response to Apr. 3, 2009 Non-Final Rejection in U.S. Appl. No. 11/506,597, filed Aug. 18, 2006.
Apr. 5, 2010 Final Office Action in U.S. Appl. No. 11/507,070, filed Aug. 18, 2006.
Jan. 26, 2010 Notice of Allowance in U.S. Appl. No. 11/507,076, filed Aug. 18, 2006.
Apr. 21, 2010 Response to 312 Amendment in U.S. Appl. No. 11/507,076, filed Aug. 18, 2006.
Oct. 8, 2008 European Supplemental Search Report EP 02 75 6944, 6 pages.
Jan. 23, 2009 Examination Report EP 02 75 6944, 5 pages.

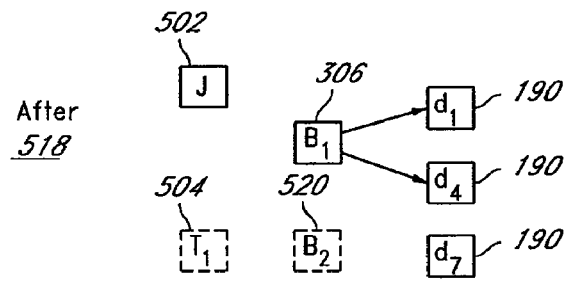

After
*518*

536 abort (T₁) [J] — 302

- free journal block [d₁] space
- free journal block [d₄] space
- free journal block [d₇] space
- free block descriptor B₁ space
- free transaction descriptor T₁ space

FIG. 5B

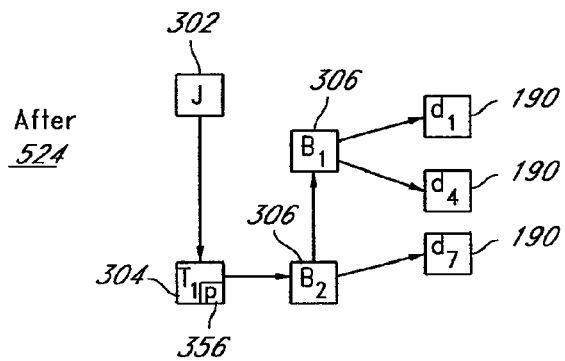

After
*524*

542 abort (T₁) [J] — 302

- unlink transaction block T₁ from journal descriptor J
- free journal block [d₁] space
- free journal block [d₄] space
- free journal block [d₇] space
- free block descriptor B₁ space
- free block descriptor B₂ space
- free transaction descriptor T₁ space

FIG. 5C

| | drive 1<br>disk_block 7 | *180*<br>[M] | *190*<br>[J] | *178*<br>[d] |
|---|---|---|---|---|
| *900* | | [Invalid] | | XYZ |
| *902* | Read | XYZ | | XYZ |
| *904* | $T_A$ write [abc] | abc | abc | XYZ |
| *906* | commit ($T_1$) | $abc_d$ | abc | XYZ |
| *912* | $T_B$ write [hello] | hello | (abc)<br>hello | XYZ |
| *914* | commit ($T_B$) | $hello_d$ | hello | XYZ |
| *916* | block_flushed() | hello | hello | hello/XYZ<br>? |
| *918* | drive_synced() | hello | | hello |

FIG. 9B

|  | drive 1<br>disk_block 7 | 180<br>M | 190<br>J | 178<br>d |
|---|---|---|---|---|
| 900 |  | [Invalid] |  | XYZ |
| 902 | Read | XYZ |  | XYZ |
| 904 | $T_A$ write [abc] | abc | abc | XYZ |
| 906 | commit | abc$_d$ | abc | XYZ |
| 912 | $T_B$ write [hello] | hello | (abc)<br>hello | XYZ |
| 920 | abort ($T_B$) | abc$_d$ | abc | XYZ |
| 922 | block_flushed() | abc | abc | abc/XYZ<br>? |
| 924 | drive_synced() | abc |  | abc |

| drive 4 disk_block 27 | M  /180 | J  /300 | d  /178 |
|---|---|---|---|
| *1200* | Invalid | | 1 |
| *1202* T₁ add 9: | | | |
|     read | 1 | | 1 |
|     add 9 | 10 | | 1 |
|     write [10] | 10 | $10_{(1)w}$ | 1 |
| *1204* commit (T₁) | $10_d$ | $10_{(1)c}$ | 1 |
| *1206* T₂ add 2 | 12 | $10_{(1)c}$ | 1 |
|  |  | $\Delta+2_{(2)w}$ |  |
| *1208* T₃ add 5 | 17 | $10_{(1)c}$ | 1 |
|  |  | $\Delta+2_{(2)w}$ |  |
|  |  | $\Delta+5_{(3)w}$ |  |
| *1210* T₄ add 3 | 20 | $10_{(1)c}$ | 1 |
|  |  | $\Delta+2_{(2)w}$ |  |
|  |  | $\Delta+5_{(3)w}$ |  |
|  |  | $\Delta+3_{(4)w}$ |  |
| *1212* abort (T₂) | 18 | $10_{(1)c}$ | 1 |
|  |  | $\Delta+5_{(3)w}$ |  |
|  |  | $\Delta+3_{(4)w}$ |  |
| *1214* commit (T₄) | 18 | $10_{(1)c}$ | 1 |
|  |  | $\Delta+5_{(3)w}$ |  |
|  |  | $\Delta+3_{(4)c}$ |  |
| *1216* commit (T₃) | $18_d$ | $10_{(1)c}$ | 1 |
|  |  | $\Delta+5_{(3)c}$ |  |
|  |  | $\Delta+3_{(4)c}$ |  |
| *1217* block_flushed() | 18 | $10_{(1)c}$ | 1 |
|  |  | $\Delta+5_{(3)c}$ |  |
|  |  | $\Delta+3_{(4)c}$ |  |
| *1218* drive_synced() | 18 |  | 18 |

| drive 4<br>disk_block 27 | M ⟋180 | J ⟋300 | d ⟋178 |
|---|---|---|---|
| _1200_ | Invalid | | 1 |
| _1202_ $T_1$ add 9: | | | |
|    read | 1 | | 1 |
|    add 9 | 10 | | 1 |
|    write [10] | 10 | $10_{(1)w}$ | 1 |
| _1204_ commit ($T_1$) | $10_d$ | $10_{(1)c}$ | 1 |
| _1206_ $T_2$ add 2 | 12 | $10_{(1)c}$ | 1 |
| | | $\Delta+2_{(2)w}$ | |
| _1208_ $T_3$ add 5 | 17 | $10_{(1)c}$ | 1 |
| | | $\Delta+2_{(2)w}$ | |
| | | $\Delta+5_{(3)w}$ | |
| _1210_ $T_4$ add 3 | 20 | $10_{(1)c}$ | 1 |
| | | $\Delta+2_{(2)w}$ | |
| | | $\Delta+5_{(3)w}$ | |
| | | $\Delta+3_{(4)w}$ | |
| _1212_ abort ($T_2$) | 18 | $10_{(1)c}$ | 1 |
| | | $\Delta+5_{(3)w}$ | |
| | | $\Delta+3_{(4)w}$ | |
| _1214_ commit ($T_4$) | 18 | $10_{(1)c}$ | 1 |
| | | $\Delta+5_{(3)w}$ | |
| | | $\Delta+3_{(4)c}$ | |
| _1216_ commit ($T_3$) | $18_d$ | $10_{(1)c}$ | 1 |
| | | $\Delta+5_{(3)w}$ | |
| | | $\Delta+3_{(4)c}$ | |

FIG. 12B-1

| | 180 | 300 | 178 |
|---|---|---|---|
| drive 4 disk_block 27 | M | J | d |

| | | | | |
|---|---|---|---|---|
| *1224* | T₅ add 10 | 28 | $10_{(1)c}$ | 1 |
| | | | $\Delta+5_{(3)c}$ | |
| | | | $\Delta+3_{(4)c}$ | |
| | | | $\Delta+10_{(5)w}$ | |
| *1226* | commit (T₅) | $28_d$ | $10_{(1)c}$ | 1 |
| | | | $\Delta+5_{(3)c}$ | |
| | | | $\Delta+3_{(4)c}$ | |
| | | | $\Delta+10_{(5)c}$ | |
| *1228* | T₆ write[28] | 28 | $10_{(1)c}$  $28_{(6)w}$ | 1 |
| | | | $\Delta+5_{(3)c}$ | |
| | | | $\Delta+3_{(4)c}$ | |
| | | | $\Delta+10_{(5)c}$ | |
| *1230* | commit (T₆) | $28_d$ | $28_{(6)c}$ | 1 |

FIG. 12B-2

| drive 4 disk_block 27 | M (180) | J (300) | d (178) |
|---|---|---|---|
| *1200* | Invalid | | 1 |
| *1202* T₁ add 9: | | | |
|    read | 1 | | 1 |
|    add 9 | 10 | | 1 |
|    write [10] | 10 | $10_{(1)w}$ | 1 |
| *1204* commit (T₁) | $10_d$ | $10_{(1)c}$ | 1 |
| *1206* T₂ add 2 | 12 | $10_{(1)c}$ | 1 |
| | | $\Delta+2_{(2)w}$ | |
| *1208* T₃ add 5 | 17 | $10_{(1)c}$ | 1 |
| | | $\Delta+2_{(2)w}$ | |
| | | $\Delta+5_{(3)w}$ | |
| *1210* T₄ add 3 | 20 | $10_{(1)c}$ | 1 |
| | | $\Delta+2_{(2)w}$ | |
| | | $\Delta+5_{(3)w}$ | |
| | | $\Delta+3_{(4)w}$ | |
| *1212* abort (T₂) | 18 | $10_{(1)c}$ | 1 |
| | | $\Delta+5_{(3)w}$ | |
| | | $\Delta+3_{(4)w}$ | |
| *1214* commit (T₄) | 18 | $10_{(1)c}$ | 1 |
| | | $\Delta+5_{(3)w}$ | |
| | | $\Delta+3_{(4)c}$ | |
| *1216* commit (T₃) | $18_d$ | $10_{(1)c}$ | 1 |
| | | $\Delta+5_{(3)c}$ | |
| | | $\Delta+3_{(4)c}$ | |

FIG. 12C-1

|  | *180* | *300* | *178* |
|---|---|---|---|
| drive 4<br>disk_block 27 | M | J | d |

| | | | | | |
|---|---|---|---|---|---|
| *1232* | T₅ write[17] | 17 | 10₍₁₎c<br>Δ+5₍₃₎c<br>Δ+3₍₄₎c | 17₍₅₎w | 1 |
| *1234* | commit (T₅) | 17_d | | 17₍₅₎c | 1 |
| *1236* | T₆ add 22 | 39 | | 17₍₅₎c<br>Δ+22₍₆₎w | 1 |

FIG. 12C-2

SYSTEMS AND METHODS FOR PROVIDING NONLINEAR JOURNALING

PRIORITY INFORMATION

This application is a divisional of U.S. application Ser. No. 11/507,073, filed Aug. 18, 2006, to be issued as U.S. Pat. No. 7,676,691, entitled "Systems And Methods For Providing Nonlinear Journaling," which is herein incorporated by reference in its entirety, and which was filed on the same day as the following applications: application Ser. No. 11/506,597, entitled "Systems And Methods For Providing Nonlinear Journaling," application Ser. No. 11/507,070, entitled "Systems And Methods For Providing Nonlinear Journaling" and application Ser. No. 11/507,076, entitled "Systems And Methods For Incremental Journaling," all of which are hereby incorporated by reference in their entirety herein.

LIMITED COPYRIGHT AUTHORIZATION

A portion of the disclosure of this patent document includes material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

FIELD OF THE INVENTION

This invention relates generally to systems and methods of nonlinear journaling.

BACKGROUND

The increase in processing power of computer systems has ushered in a new era in which information is accessed on a constant basis. One response has been to distribute processing requests across multiple nodes or devices. A distributed architecture allows for more flexible configurations with respect to factors such as speed, band-width management, and other performance and reliability parameters.

A distributed architecture system may provide for numerous storage operations across many multiple storage devices. In general, recording information regarding these storage operations in a journal—that is, journaling storage operation information—may provide an effective front end for storage operations, which may support the reliability and cooperation of nodes within a system. Problems may arise with current systems for journaling data in both distributed and non-distributed systems.

Because of the foregoing challenges and limitations, there is an ongoing need to improve the manner in which computer systems journal storage operations, such as data writes, on storage devices.

SUMMARY OF THE INVENTION

The systems and methods generally relate to the nonlinear journaling of data. In one embodiment, a nonlinear method of journaling data being written to a storage unit is provided. The method may include storing a plurality of groups of data in a journal located in persistent storage; storing information about the location and status of each of said plurality of groups of data; providing a data structure linking the stored groups of data and the information about each of said groups of data; and providing for the unlinking of any data group and its corresponding stored information, without regards to the order in which the data group was stored in the journal.

In another embodiment, a system for journaling data writes into a linked data structure in conjunction with storage of the data writes is provided. The system may include a data storage unit; persistent memory associated with said data storage unit; and a program module configured to journal in said persistent memory data writes to said data storage unit, said data writes comprising data to be written to said data storage unit and respective locations in said data storage unit to write said data; wherein said program module is configured to journal said data writes nonlinearly.

In another embodiment, a journal data structure for recording data writes in conjunction with storage of data writes in a data storage unit is provided. The journal data structure may include a plurality of journal blocks comprising data; a plurality of block descriptors, each block descriptor comprising a link to at least one of said journal blocks and at least one respective address in the data storage unit associated with said at least one journal block; and a plurality of transaction descriptors, each transaction descriptor comprising a link to at least one of said block descriptors.

In another embodiment, a method of journaling data into a linked data structure in conjunction with storage of the data in a data storage unit is provided. The method may include journaling data in persistent memory; journaling in persistent memory a location in the data storage unit, said location corresponding to said data; and linking said data and said location.

In another embodiment, a method of journaling data into a linked data structure in conjunction with storage of the data in a data storage unit is provided. The method may include journaling data in persistent memory; journaling in persistent memory a location in the data storage unit, said location corresponding to said data; and associating said data and said location; wherein said data and said location are recorded in nonlinear locations in said persistent memory.

In another embodiment, a method of journaling data for a data storage unit with multiple storage devices is provided. The method may include journaling data to be written on a plurality of storage devices of a data storage unit; determining when one of said storage devices is unavailable; and keeping the data journaled for said one storage device while said storage device is unavailable for storage.

In another embodiment, a system supporting per-drive journal replay for a data storage unit with multiple storage devices is provided. The system may include a plurality of storage devices; persistent memory; and a program module configured to keep in said persistent memory journal data corresponding to a subset of said plurality of storage devices; wherein said subset of storage devices is temporarily unavailable to store said journal data.

In another embodiment, a networked cluster of data storage nodes cooperating to execute transactions that are global to the networked cluster of storage nodes is provided. The networked cluster may include a plurality of storage nodes configured to be connected in a network; and a plurality of journal modules, each one of said storage nodes having a different one of said plurality of journal modules associated therewith, the journal modules configured to record on the storage nodes data associated with global transactions; wherein the recorded data is sufficient to recreate the transactions when necessary.

In another embodiment, a method of journaling data associated with global transactions in a distributed data storage system is provided. The method may include journaling data in persistent memory that is associated with a data storage unit in the distributed data storage system, said data associated with a transaction that is global to the distributed data storage system; wherein journaling said data comprises recording information sufficient to recreate the transaction.

In another embodiment, a networked cluster of data storage nodes cooperating to execute transactions that are global to the networked cluster of data storage nodes is provided. The networked cluster may include a plurality of data storage nodes configured to be connected in a network; a plurality of persistent memory allocations, each one of said data storage nodes having a different one of said plurality of persistent memory allocations associated therewith; and at least one journal program module, the at least one journal program module configured to record on a subset of the persistent memory allocations data associated with transactions that are global to the networked cluster of data storage nodes; wherein the recorded data is sufficient to recreate the global transactions when necessary.

In another embodiment, a method of journaling data in a storage unit of a distributed storage system to provide a shadow buffer in the event that the distributed system aborts a transaction is provided. The method may include journaling first data, said first data associated with a first transaction that the distributed storage system has committed to write, said first data designated to be written to a storage location, but said first data has not yet been written to said storage location; journaling second data, said second data associated with a second transaction that the distributed storage system has not yet committed to write, said second data designated to be written to said storage location; and preserving said first data for purposes of restoring said first data, in the event that the distributed storage system aborts said second transaction.

In another embodiment, a system that journals data for a data storage unit that provides a shadow buffer in the event that a transaction aborts is included. The system may include a data storage unit; a memory buffer, said memory buffer associated with a location on said data storage unit; persistent memory, said persistent memory associated with said data storage unit; and a program module configured to journal the first data in said persistent memory from said memory buffer, and further configured to preserve, after said memory buffer is overwritten with second data, the first data in said persistent memory until one of the following conditions is met: a transaction associated with the second data commits the second data to being stored at the location on said data storage unit and, in the event the second data is not committed, the first data has been stored to said data storage unit.

In another embodiment, a method of journaling data in a data storage unit of a distributed data storage system to provide both a journal function and a shadow buffer function is provided. The method including keeping a first data in a memory buffer, the memory buffer associated with a location in a data storage unit; journaling the first data in persistent memory; overwriting the memory buffer with second data before the first data is stored in the data storage unit; and preserving the first data in the persistent memory until after receiving an indication that it may be erased.

In another embodiment, a method conditioning the removal of data from a journal upon verification that the data has been reliably stored on a storage device of a data storage unit is provided. The method may include journaling data designated to be written to a location on a storage device associated with a data storage unit, said data storage device being one of a plurality of storage devices associated with said data storage unit; directing the storage device to record the data at the location; and selectively removing the data from the journal in an order based upon a communication from the storage device that the data has been stored at the location without regards to the order in which the data was stored.

In another embodiment, a method conditioning the removal of data from a journal based upon a determination of the least recently used data for a particular drive is provided. The method may include journaling data designated to be written to a location on a storage device associated with a data storage unit, said data storage device being one of a plurality of storage devices associated with said data storage unit; directing the storage device to record the data at the location; and selectively removing the data from the journal based upon a determination that the data is the least recently used data corresponding to the storage device.

In another embodiment, a system of journaling data that removes data from the journal upon synchronizing the contents of a data storage unit is provided. The system may include a data storage unit associated with a plurality of storage devices; persistent memory associated with said data storage unit; a synchronization module configured to actively synchronize contents of said persistent memory with contents of said plurality of storage devices; and a journaling module configured to journal data in the persistent memory, and further configured to remove data from said persistent memory after the synchronization module synchronizes.

In another embodiment, a system for atomically updating a journal for a data storage unit is provided. The system may include persistent memory; and a program module configured to update a journal located in said persistent memory with atomic operations; wherein the journal is not in an inconsistent state following a write failure to update the journal.

In another embodiment, a method of building atomically a journal for a data storage unit is provided. The method may include recording data in persistent memory, the data being too large to be recorded in a single atomic operation; and building a journal in the persistent memory, the journal comprising the data; wherein the journal is built with atomic operations such that the journal does not comprise only a portion of the data.

In another embodiment, a concurrent transaction subsystem for a journal as a reliable high-speed front end for disk writes is provided. The concurrent transaction subsystem may include a module configured to write at least one data block to a journal, wherein the journal comprises an allocation of persistent storage, and wherein the at least one data block is associated with a location on a memory; wherein the module is further configured to write at least one delta element to the journal, wherein the at least one delta element is associated with at least one data operation that is one of the following: order independent and partially ordered; and wherein the at least one delta element is associated with the location on the memory.

In another embodiment, a method of implementing a concurrent transaction subsystem for a journal as a reliable high-speed front end for disk writes is provided. The method may include writing at least one data block to a journal, wherein the journal comprises an allocation of persistent storage, and wherein the at least one data block is associated with a location on a memory; and writing at least one delta element to the journal, wherein the at least one delta element is associated with at least one data operation that is one of the following: order independent and partially ordered; and wherein the at least one delta element is associated with the location on the memory.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

FIGS. 5A, 5B, 5C, and 5D illustrate embodiments of building, modifying, and removing nonlinear journal data structures.

FIGS. 9A, 9B and 9C illustrate embodiments of keeping a shadow buffer in a nonlinear journal.

FIGS. 12A, 12B-1, 12B-2, 12C-1, 12C-2, 12D-1, and 12D-2 illustrate embodiments of implementing concurrent transactions in a nonlinear journal.

Figure 1A:
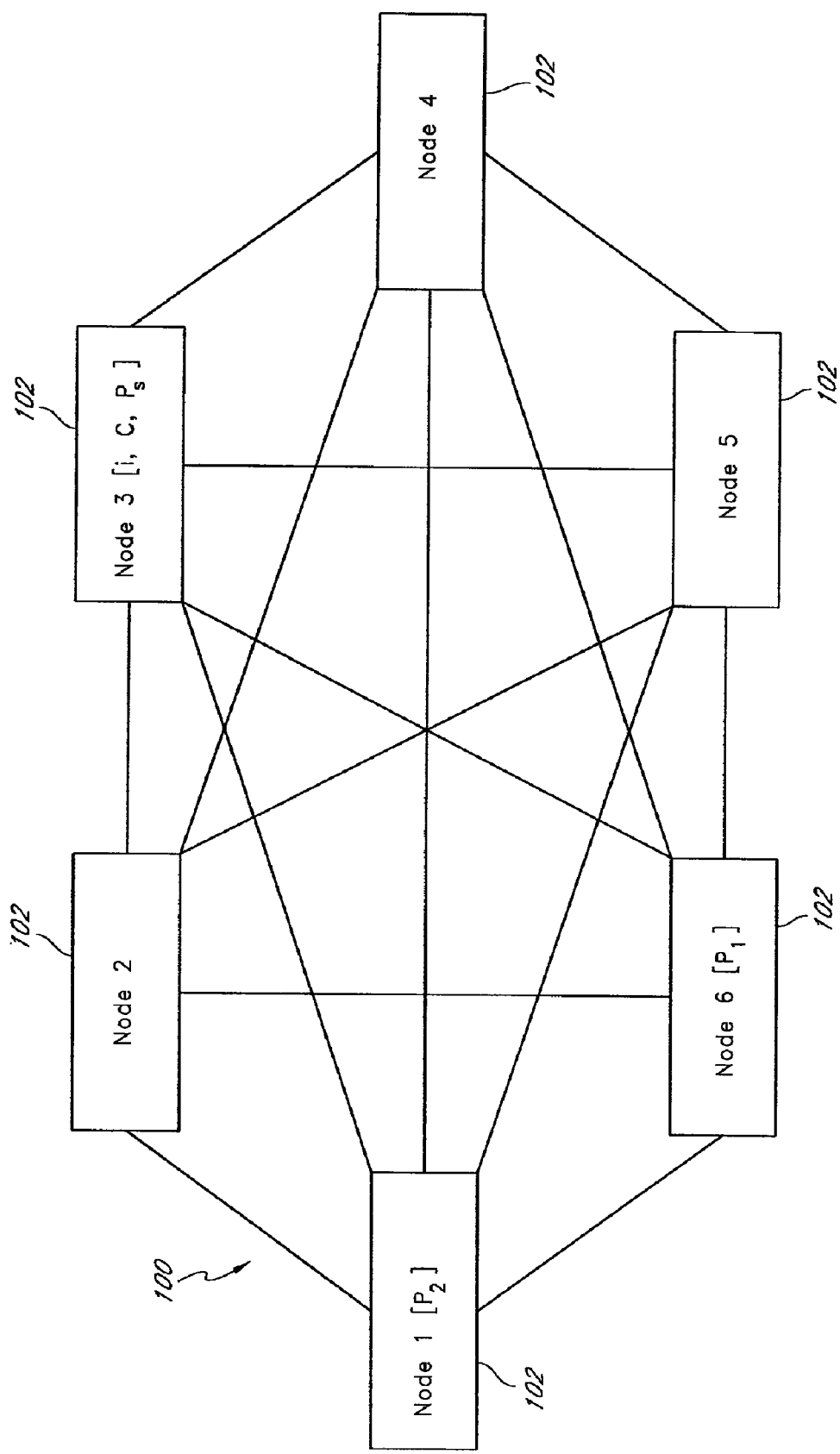
FIGS. 1A, 1B, and 1C illustrate embodiments of a networked cluster of nodes that journals data.

These and other features will now be described with reference to the drawings summarized above. The drawings and the associated descriptions are provided to illustrate embodiments of the invention and not to limit the scope of the invention. Throughout the drawings, reference numbers may be reused to indicate correspondence between referenced elements. In addition, the first digit of each reference number generally indicates the figure in which the element first appears.

DETAILED DESCRIPTION OF PREFERRED EMBODIMENTS

Systems and methods which represent one embodiment of an example application of the invention will now be described with reference to the drawings. Variations to the systems and methods which represent other embodiments will also be described.

For purposes of illustration, some embodiments will be described in the context of a distributed file system. The present invention is not limited by the type of environment in which the systems and methods are used, however, and systems and methods may be used in other environments, such as, for example, other file systems, other distributed systems, the Internet, the World Wide Web, a private network for a hospital, a broadcast network for a government agency, and an internal network for a corporate enterprise, an Intranet, a local area network, a wide area network, a wired network, a wireless network, and so forth. Some of the figures and descriptions, however, relate to an embodiment of the invention wherein the environment is that of a distributed file system. It is also recognized that in other embodiments, the systems and methods may be implemented as a single module and/or implemented in conjunction with a variety of other modules and the like. Moreover, the specific implementations described herein are set forth in order to illustrate, and not to limit, the invention. The scope of the invention is defined by the appended claims.

One example of a distributed file system, in which embodiments of systems and methods described herein may be implemented, is described in U.S. patent application Ser. No. 10/007,003 entitled "Systems and Methods for Providing a Distributed File System Utilizing Metadata to Track Information About Data Stored Throughout the System," filed Nov. 9, 2001 which claims priority to Application No. 60/309,803 filed Aug. 3, 2001, U.S. patent application Ser. No. 10/281,467 entitled "Systems and Methods for Providing A Distributed File System Incorporating a Virtual Hot Spare," filed Oct. 25, 2002, and U.S. patent application Ser. No. 10/714,326 entitled "Systems And Methods For Restriping Files In A Distributed File System," filed Nov. 14, 2003, which claims priority to Application No. 60/426,464, filed Nov. 14, 2002, all of which are hereby incorporated by reference herein in their entirety.

I. Overview

In general, embodiments of the invention relate to nonlinear journaling. In computing systems, a journal may provide a reliable high-speed front-end for disk writes, which implements coherent transactions locally and rewrites data after power or write failure. Hard-disk drives typically have an asynchronous write cache. Requests for disk writes are acknowledged immediately by the drive; however, the data is not actually written to stable storage for an unknown amount of time after the write has been acknowledged. Without a journal, the drive is in an unknown state after a power or write failure. In other words, the contents of the disks (within the drive) are no longer reliable because it is not known whether the data was actually written to the disks before the failure occurred. A journal may be used to return the drive back into a known state. A system equipped with a journal records in the journal the disk writes to the drive over a period of time. After a power or a write failure, the system accesses the journal to reissue the writes before the drive is used again. Some journal systems simply keep a fixed amount of data to replay in a ring buffer, expiring the oldest—or Least Recently Used (LRU)—data to make space for new writes. Such an implementation may, however, stall the journal as discussed below.

In addition to providing reliable writes, a journal system may also implement transactions. A collection of blocks may be written under a single transaction, writing either all of the blocks or no blocks. This feature may also be used in a global transaction system to implement cluster wide transactions. In a cluster wide transaction, journals on multiple nodes are synchronized such that a transaction on each node associated with a single global transaction either commits or aborts.

It will be appreciated by one skilled in the art that there are many ways to journal data writes. Some problems may arise when implementing journaling. First, journals may be subject to a single stuck transaction that halts the entire journal. Some journals are ring-based, in which the journal expires the oldest data to make space for new writes. In a ring-based system, a single stuck transaction can halt the entire journal because a transaction that has not been flushed cannot be freed for a new write, and a new write cannot occur until this stuck transaction completes if it is the oldest data. This may cause journal space deadlock problems, requiring an extensive journal process for clearing out deadlocks.

Second, some journal systems may not have support for when a node goes completely offline. As discussed above, many journal systems are ring-based, which provide no support for long-lived blocks in a journal. In a ring-based journal, the allocated journal space is systematically being overwritten, which means that no journal block—a data block in the journal—may last longer in the journal than a full cycle through the journal. If the journal includes data to be written to a drive that is currently down, the journal will likely expire that data prior to the drive being brought back up. Because bringing back a down drive requires holding on to blocks for replay over a relatively long period of time, previous journal systems did not support replaying data for down drives.

Third, some journals may require journal escaping. In a linear journal system, journal blocks may be written to appear as journal meta blocks. For example, a malicious user could write a journal block that mimics metadata in order to corrupt the system. In order to prevent the system from treating the journal block as metadata, linear journal systems may require "journal escaping." Journal escaping is a procedure whereby the system scans data blocks before they are written in the journal, marking in the journal those data blocks that appear to be metadata. During system replay, marked journal blocks are treated as journal blocks, not metadata. Escaping journals for proper replay may be a performance problem because this may be the only place the data is touched after being given to the journal. Journal escaping can pollute the CPU's cache and use extra CPU time.

Fourth, some journal systems may require complicated replay. Because linear journals overwrite the oldest data with new writes, linear journals typically have partially written journal blocks. Moreover, linear journals that implement transactions typically have partially overwritten transactions as a result of the linear overwrite. Furthermore, linear journals may suffer from ambiguous head and tail pointers, which identify the beginning of the ring of data for replay. Partially written blocks, partially overwritten transactions, and ambiguous head and tail pointers add complexity to using the journal, causing development problems and bugs.

Fifth, some journals implement sloppy disk flushing. Following a power failure, the contents of the journal are replayed. Hopefully, the contents of the journal are sufficient to rewrite anything that was lost in a drive's write cache. This may cause a problem if there is not enough data storage for a particular drive.

Sixth, some previous journal systems implement shadow buffers in system memory. A shadow buffer holds a copy of data written to a particular journal block so that it may be used in the event of an abort of a successive write to the same block. If a write is aborted, then the in-memory block corresponding to the journal block of the aborted write should be rewritten with the previous value of the buffer before the aborted write. The journal block could be read from disk but may cause a lag in performance. Another solution is to keep an in-memory shadow buffer, but this may also cause a lag in performance.

Seventh, some journal systems only support one writer modifying a same block at a time. If there are multiple writers on the block, each writer has to wait for the previous transaction to commit before it could proceed.

Embodiments of a nonlinear journal (NLJ) described herein may address one or more of the above issues.

Although the drawings and accompanying description generally describe embodiments of the invention in terms of a distributed architecture, embodiments of the invention are not limited in application to a networked cluster of computers. Systems and methods for nonlinear journaling may also be implemented in non-distributed systems.

II. Exemplary Distributed System

Figure 1B:
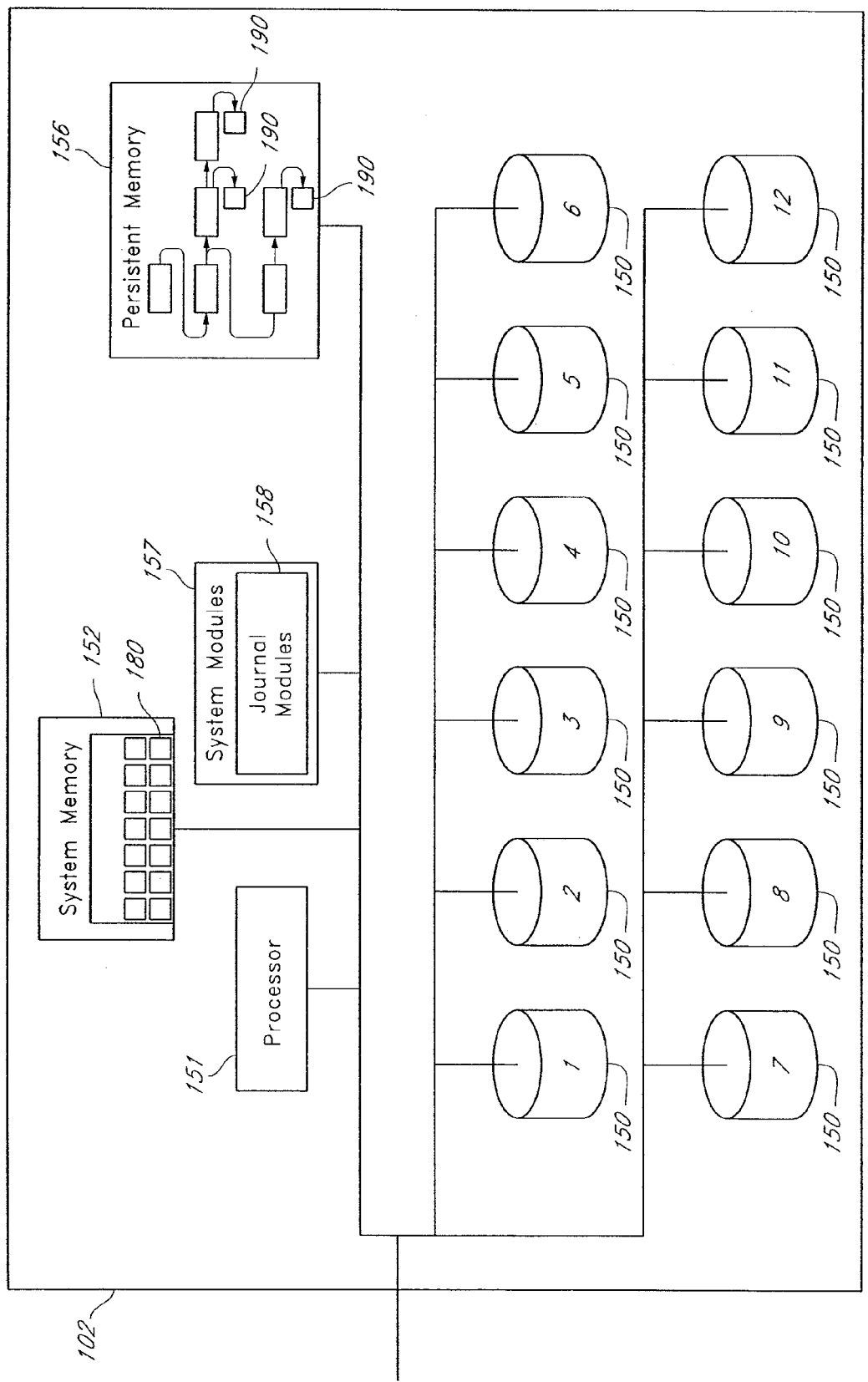
Figure 1C:
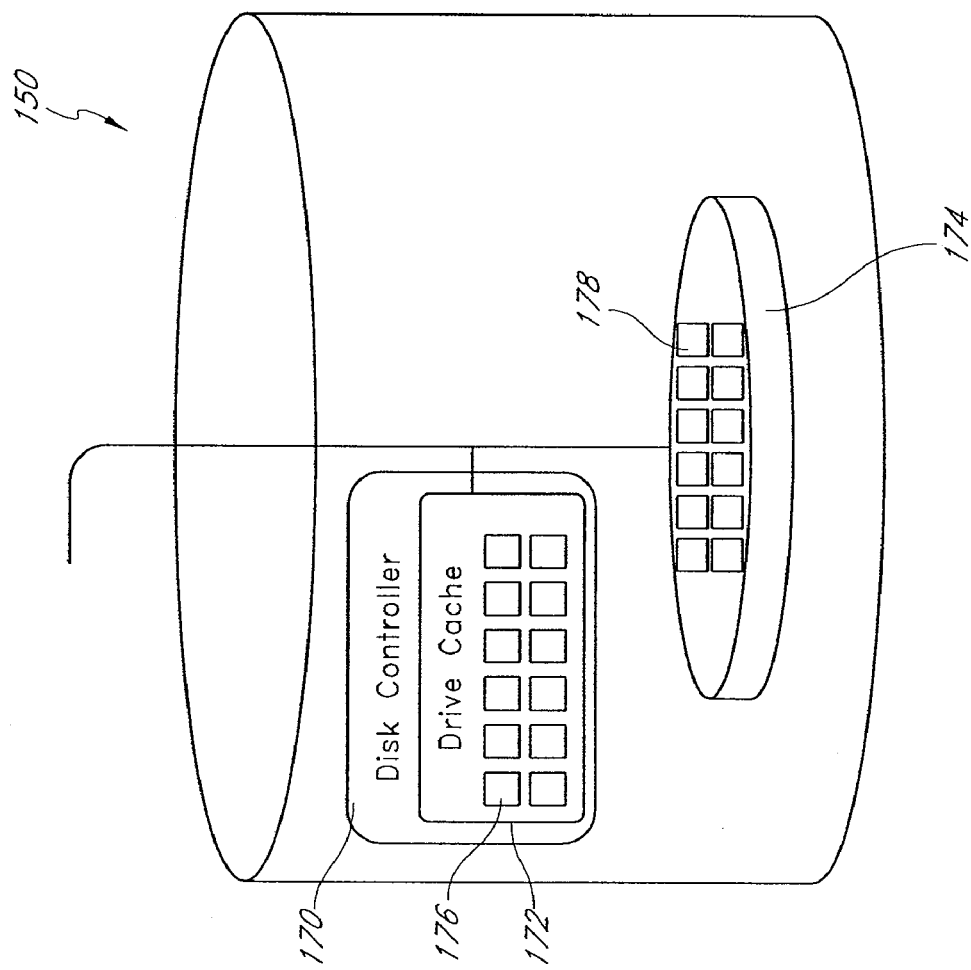

FIGS. 1A, 1B, and 1C illustrate embodiments of a networked cluster of nodes that journals data. FIG. 1A illustrates a high-level diagram of one embodiment of a distributed system 100 that may journal storage transactions between nodes 102. In the illustrated embodiment, distributed system 100 includes six nodes 102. Three of these nodes 102 are designated as being involved in a particular transaction. Node-1 102 and Node-6 102 are Participants of the transaction and are designated as $P_2$ and $P_1$, respectively. Node-3 102 is designated as the Initiator of the transaction, the Coordinator for the transaction, and a Participant of the transaction. Because Node-3 102 is an initiator and coordinator as well as a participant, it is a Shared Participant designated as $P_S$. The meaning of the terms "Participant," Shared Participant," "Initiator" and "Coordinator" in a global transaction system will be discussed in further detail below with respect to FIGS. 2A and 2B. Although the illustrated embodiment illustrates a single transaction, involving just three nodes 102, it will be appreciated by one skilled in the art that the distributed system 100 may execute numerous transactions, which may include various suitable combinations of the nodes 102 as Participants, Shared Participants, Coordinators, and Initiators.

Although in the illustrated embodiment nodes 102 are arranged in a fully connected network topology, in other embodiments of the invention, nodes 102 may be arranged in other topologies, including, but not limited to, the following topologies: ring, mesh, star, line, tree, bus topologies, and so forth. It will be appreciated by one skilled in the art that various network topologies and/or combinations thereof may be used to implement different embodiments of the invention. In addition, it is recognized that nodes 102 may be connected directly, indirectly, or a combination of the two, and that all of the nodes 102 may be connected using the same type of connection or one or more different types of connections. It is also recognized that in other embodiments, a different number of nodes may be included in the cluster, such as, for example, 2, 16, 83, 6, 883, 10,000, and so forth.

In one embodiment, the nodes 102 are interconnected through a bi-directional communication link where messages are received in the order they are sent. In one embodiment, the link comprises a "keep-alive" mechanism that quickly detects when nodes or other network components fail, and the nodes are notified when a link goes up or down. In one embodiment, the link includes a Transmission Control Protocol (TCP) connection. In other embodiments, the link includes an Session Description Protocol (SDP) connection over Infiniband, a wireless network, a wired network, a serial connection, Internet Protocol (IP) over FibreChannel, proprietary communication links, connection based datagrams or streams, and/or connection based protocols.

In one embodiment of the invention, nodes 102 are individual data storage units for a distributed file system. FIG. 1B illustrates one embodiment of a node 102 in a distributed file system, such as the distributed system 100. In the illustrated embodiment, the nodes 102 include hard-disk drives 150, processor 151, system memory 152, persistent memory 156, and system modules 157. In the illustrated embodiment, hard-disk drives 150 store respective portions of the distributed file system assigned to the respective node 102 in distributed system 100. Processor 151 executes system modules 157 that manage the distributed file system, such as read and/or write requests. While executing system modules 157, processor 151 utilizes system memory 152 to store data including, for example, data corresponding to read and write requests. In the illustrated embodiment, nodes 102 include a respective persistent storage 156, which may be used to store a journal of, for example, data writes to hard-disk drives 150. In the illustrated embodiment, the system modules 157 include journal modules 158, which manage the operation of the journal stored in persistent storage 156. A journal module 158 may also refer to a journal subsystem, or its components, processes, procedures, and so forth. System modules 157 may also include global transaction modules, message processing modules, write modules, read modules, drive sync modules, least recently used (LRU) modules, participant modules, initiator modules, coordinator modules and so forth.

Although in the illustrated embodiment system modules 157 are illustrated as a separate component, the system modules 157 are program instructions that may be stored in a variety of suitable locations, including, for example, local partitions on hard-disk drives 150 or dedicated storage devices. Moreover, although the nodes 102 individually store their portions of the distributed file system in an array of twelve hard-disk drives 150, in other embodiments the nodes 102 may include a different-sized array of hard-disk drives 150, including possibly a single hard-disk drive 150. Furthermore, although embodiments of the invention are generally described with respect to storage devices based on hard-disk drives, other embodiments may be implemented on systems including alternative forms of secondary storage, such as solid state disks (or drives), random access memory (RAM) disks, Flash disks, combinations of the same, and suitable equivalents. Similarly, embodiments of the invention may include storage devices with various implementations of system memory 152, including primary storage based on static RAM (SRAM), non-volatile RAM (NVRAM), dynamic RAM (DRAM), combinations of the same, and suitable equivalents. It will be appreciated by one skilled in the art how to implement embodiments of the invention on storage systems using suitable alternative devices for primary and/or secondary storage.

In the illustrated embodiment, a journal of disk writes is stored in persistent memory 156. Persistent memory, as described herein, may refer to memory devices whose contents remain stable despite power failure to the device. For example, a hard-disk drive, such as one of the hard-disk drives 150, is an example of persistent storage. Hard-disk drives retain their contents, even in the absence of a power supply. Hard-disk drives do not, however, have efficient random access. Relatively long seek times limit the advantageous use of hard-disk drives for journal storage. Although a hard-disk drive may be used to store a journal, in some embodiments nonvolatile random access memory (NVRAM) is preferred. Flash memory, for example, has faster access times in comparison with hard-disk drives. One disadvantage of flash memory, however, is its relatively limited lifecycle. In one embodiment, persistent memory 156 is battery-backed RAM. If persistent memory 156 loses power, the backup battery maintains its persistent state. Battery-backed RAM has the advantage of efficient access time, long lifecycle, and persistent state, making it a suitable source of persistent memory 156 for storing a journal. Because battery-backed RAM can lose its memory contents in the event that the battery fails, persistent memory 156 includes not only those storage mediums that maintain their contents without any power; such as a hard-disk drive, but may also include storage mediums with suitable power-supply backups. Persistent memory 156 may also include magnetic random access memory (MRAM), which has access time and lifecycle advantages of battery-backed RAM without the need for a backup power supply. It will be appreciated by one skilled in the art that persistent memory 156 may include many suitable forms of nonvolatile memory, including, for example, magnetic random access memory (MRAM), Flash RAM, battery-backed RAM, combinations of the same, and suitable equivalents.

FIG. 1C illustrates one embodiment of a hard-disk drive 150. In the illustrated embodiment, hard-disk drives 150 include a disk controller 170 and disk platters 174. The disk controller 170 processes read and write requests to the respective disk platter 174, and it includes a drive cache 172 that, for example, buffers data blocks waiting to be written to the disk platters 174. Because the drive cache 172 may include volatile storage medium, the contents of the drive cache 172, may be lost without power. A problem arises with disk drives that do not distinguish between acknowledging data written to the drive cache 172 and acknowledging data written to a disk platter 174. If a hard-disk drive 150 only acknowledges writing data blocks to the drive cache 172, without later acknowledging writing the data blocks to the disk platters 174, a power failure may result in an inconsistent state because it is uncertain whether the data block was written to the respective disk platter 174 before the power failure caused the contents of the drive cache 172 to be lost. That is, following a power failure, a node 102 may not be able to confirm whether a write request was actually written to the respective disk platter 174 because the respective hard-disk drive 150 acknowledged writing data that was actually lost in the drive cache 172 as a result of the power failure. One purpose for journaling data in persistent memory, such as persistent memory 156, is to preserve data in the event of a power failure to a hard-disk drive 150, resulting in an inconsistent state due to unacknowledged data loss in the respective drive cache 172. That is, one function of a journal in distributed system 100 may be to keep data backed up in the event of an inconsistent state caused by a power failure affecting respective hard-disk drives 150.

In embodiments described herein, groups of data in the distributed file system are organized into data blocks. Conceptually, a data block may be any size of data, such as a single bit, a byte, a gigabyte, or even larger. In general, a data block is the smallest logical unit of data storage in the file system. In some embodiments, a file system may use data block sizes that are different from the native block size of a disk. For example, a disk may have a native size of 512 bytes, but a file system may address 4096 bytes or 8192 bytes. In one embodiment, a journal may handle data blocks in the native size of the file system, not the disk. In another embodiment, a journal may handle data blocks based on the native size of the disk. In general, the terms "disk block," "cache block," "memory block," and "journal block," described below with reference to FIG. 1C, refer to locations in memory devices corresponding to the size of a "data block." One skilled in the art will appreciate that file systems may be implemented with many suitable data block sizes, including, but not limited to, 512 bytes, 4096 bytes, and 8192 bytes. In some embodiments, the block size may be configurable. It will be further appreciated that, although the illustrated embodiment illustrates a single data block size, file systems may be implemented with variably sized data blocks.

In the illustrated embodiment, there are several physical storage spaces in a node 102 that correspond to the same data block on a particular disk platter 174 of a respective hard-disk drive 150. Blocks of data on the disk platters are referred to as disk blocks 178. Blocks of data in a drive cache 172 correspond to respective disk blocks 178 and are referred to as cache blocks 176. Although a drive cache 172 may not have a cache block 176 for every disk block 178, a cache block 176 may map to multiple disk blocks 178, though not at the same time. Typically, a disk block 178 is written from the copy of the data stored in the corresponding cache block 176. That is, a cache bock 176 temporarily stores the data value to be written to a corresponding disk block 178.

There may also be blocks of data in the system memory 152 that correspond to a particular disk block 172; these portions of system memory 152 are referred to as memory blocks 180. A memory block 180 may store the present value of a corresponding disk block 178, following, for example, a successful read operation of the respective disk block 178. Alternatively, a memory block 180 may store the future value of a corresponding disk block 178, following, for example, the processing of a write request in system memory 152 before a successful write operation to the respective disk block 178. The foregoing interim period may occur while waiting to write the drive cache 176 or waiting to write the respective disk platter 174. Because the system memory 152 may not store a memory block 180 for every disk block 178, a memory block 180 may correspond to multiple disk blocks 178, determined either statically or dynamically. When a memory block 180 corresponds to another disk block 178, the respective memory block 180 is said to be in an "Invalid" state with respect to the relevant disk block 178. In some embodiments, a memory block 180 may also be known as a memory buffer, meaning that the in-memory data structure buffers read/writes to, for example, hard-disk drives 150.

There may also be blocks of data in persistent memory 156 that correspond to a particular disk block 178. Data blocks written to hard-disk drives 150 may be journaled in the persistent memory 156. These copies of the data are referred to as journal blocks 190. Typically, there is a single memory block 180 and a single cache block 176, at any given time, that correspond to a particular disk block 178. There may be multiple journal blocks 190, however, that correspond to a particular disk block 178. This is because a journal may have a record of multiple transactions that write to the same disk block 178, or a single transaction that writes multiple times to the same block.

Thus, in the illustrated embodiment, the location of a particular disk block 178 may have a corresponding cache block 176, a corresponding memory block 180, and multiple corresponding journal blocks 190, though the values of those corresponding data blocks may be different depending on the state of a particular transaction. Moreover, a data value corresponding to a particular transaction may be stored in a corresponding memory block 180, journal block 190, cache block 176, and disk block 178. Typically, a data value corresponding to a particular transaction is not stored in multiple journal blocks 190, though multiple journal blocks 190 may correspond to the same disk block 178 to which the respective data value is directed. In general, the term "data block," as used herein, refers to a value for a group of data that may be stored in a disk block 178. For example, "data block" is used to describe, with reference to FIG. 2A discussed in greater detail below, the respective values of separate portions of a transaction. Moreover, disk blocks 178, cache blocks 176, memory blocks 180, and journal blocks 190, as used herein, generally refer to a location in the corresponding storage device.

The following provides an example disk write transaction. When a node 102 receives a disk-write request, a message module may be executed by processor 151 to process the disk-write request. The message module may identify a data value to write and a disk block 178 to which to write the data value. A write module may store the identified data value in a memory block 180 and associate the memory block 180 with the identified disk block 178. A write module may also journal the data value in a journal block 190 and associate the journal block with the disk block 178. The persistent memory 156 may have previously stored a journal block 178 associated with the disk block 178. A write module may then flush the data value from the memory block 180 to the hard-disk drive 150, which writes the data value first to an associated cache block 176 until the identified disk block 178 may be written with the data value.

In general, the word module, as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

In one embodiment, the distributed system 100 may comprise a variety of computer systems such as, for example, a computer, a server, a smart storage unit, and so forth. In one embodiment, the computer may be a general purpose computer using one or more microprocessors, such as, for example, a Pentium processor, a Pentium II processor, a Pentium Pro processor, a Pentium IV processor, an x86 processor, an 8051 processor, a MIPS processor, a Power PC processor, a SPARC processor, an Alpha processor, and so forth. The computer may run a variety of operating systems that perform standard operating system functions such as opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Palm Pilot OS, Apple® MacOS®, Disk Operating System (DOS), UNIX, IRIX, Solaris, SunOS, FreeBSD, Linux®, or IBM® OS/2® operating systems.

III. Exemplary Global Transaction System

Figure 2A:
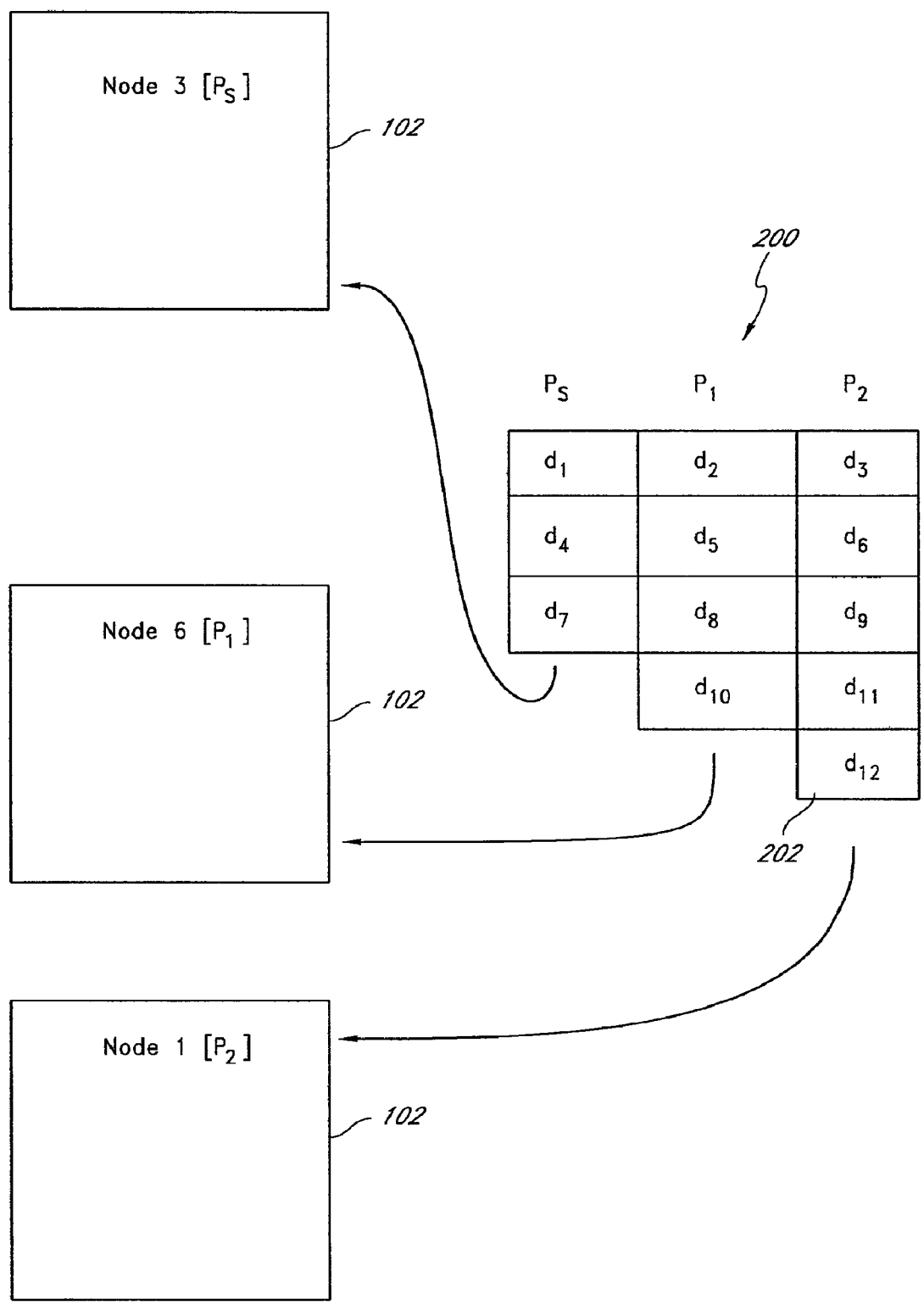
FIGS. 2A and 2B illustrate embodiments of a networked cluster of nodes that coordinates storage transactions.
Figure 2B:
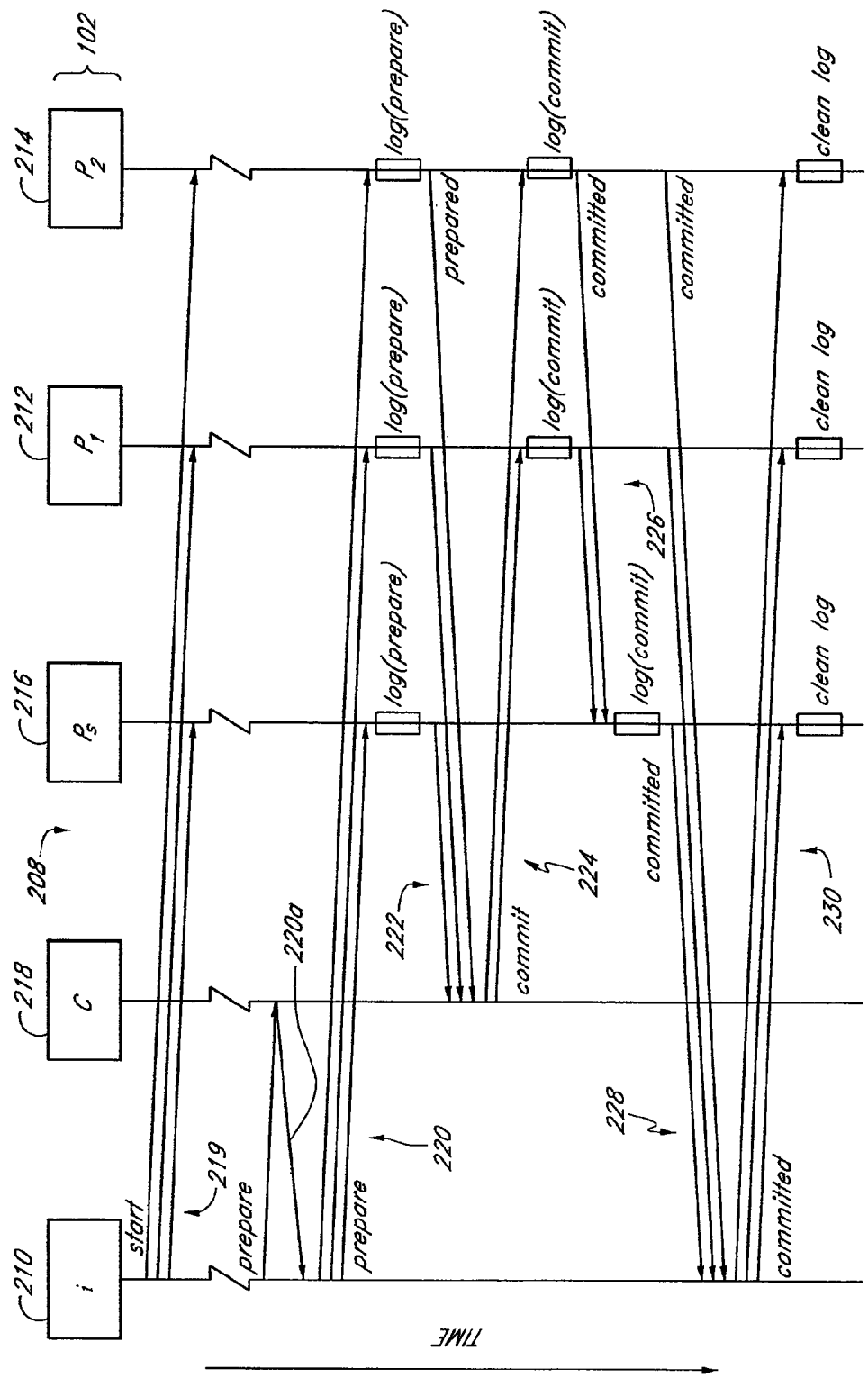

FIGS. 2A and 2B illustrate embodiments of a networked cluster of nodes that coordinates storage transactions. FIG. 2A illustrates a transaction [$T_1$] 200 that a global transaction module divides into 12 separate data blocks 202. It will be appreciated by one skilled in the art that there are many different ways a global transaction module could divide transactions into separate data blocks. Although in the illustrated embodiment the data blocks 202 appear equally sized, in other embodiments data may be portioned in other suitable ways. In the illustrated embodiment, a global transaction module assigns the data blocks 202 to one of the three participant nodes 102 of distributed system 100. Node-3 [$P_S$] 102 is assigned three data blocks [$d_1$, $d_4$, $d_7$] 202; Node-6 [$P_1$] 102 is assigned four data blocks [$d_2$, $d_5$, $d_8$, $d_{10}$] 202; and Node 1 [$P_2$] 102 is assigned five data blocks [$d_3$, $d_6$, $d_9$, $d_{11}$, $d_{12}$] 202. In the illustrated embodiment, the data blocks 202 are, also communicated to their respective participant nodes 102. It will be appreciated that a global transaction module may assign the data blocks 202 to participant nodes 102 in a variety of suitable manners. With reference to the embodiment illustrated in FIG. 1A, Node-3 102 is the coordinator node [C] and the initiator node [i], in addition to being the shared participant node [$P_S$]. In one embodiment, Node-3 102, as the initiator node [i], may execute the module that divides transaction [$T_1$] 200 into separate data blocks 202 and then assigns them to the respective nodes 102, including Node-3 102, as the shared participant node [$P_S$]. Node-3 102, as the coordinator node [C], may then coordinate the execution of transaction [$T_1$] 200 among the respective participant nodes 102. Thus, in the illustrated embodiment, a single node 102, such as Node-3 102, may perform the functions of an Initiator, a Coordinator, and a (Shared) Participant by executing, for example, an initiator module, a coordinator module, and a (shared) participant module.

FIG. 2B illustrates one embodiment of a protocol for coordinating global transactions in a distributed system, such as distributed system 100. FIG. 2B illustrates an exemplary timing chart according to one embodiment of a commit protocol 208 for a transaction involving an initiator 210 (shown as "i"), a first participant 212 (shown as "$p_1$"), a second participant 214 (shown as "$p_2$"), a shared participant 216 (shown as "$p_s$") and a coordinator 218 (shown as "c"). As discussed above, the initiator 210 and the coordinator 218 are on the same node. In the example shown in FIG. 2B, the shared participant 216 is also on the same node as the initiator 210 and the coordinator 218. The first participant 212 and the second participant 214 are located on remote nodes.

During the transaction, the initiator 210 adds the first participant 212, the second participant 214, and the shared participant 216 to the transaction. As it does so, the initiator 210 sends start messages 219 (three shown) to the first participant 212, the second participant 214, and the shared participant 216. When the initiator 210 is ready to try to commit the transaction, the initiator sends "prepare" messages 220 (four shown) to the coordinator 218, the first participant 212, the second participant 214, and the shared participant 216. In one embodiment, the coordinator 218 is configured to return a response 220a to the "prepare" message 220. Since the initiator 210 and the coordinator 218 are on the same node, the coordinator 218 receives the "prepare" message 220 before the remote participants 212, 214.

The first participant 212, the second participant 214, and the shared participant 216 respectively log the "prepare" messages 220 and determine whether they are prepared to commit the transaction. If they can commit the transaction, the first participant 212, the second participant 214, and the shared participant 216 each send a "prepared" message 222 (three shown) to the coordinator 218. If the coordinator 218 receives all of the "prepared" messages 222, the coordinator 218 sends "commit" messages 224 (two shown) to the first participant 212 the second participant 214. The coordinator 218 does not send a "commit" message 224 to the shared participant 216.

After receiving the "commit" messages 224 from the coordinator 218, the first participant 212 and the second participant 214 each log their respective "commits" and send "committed" messages 226 to the shared participant 216. Thus, the shared participant 216 learns of the transaction's outcome from the other participants 212, 214. After committing to the transaction, the first participant 212, the second participant 214 and the shared participant 218 send "committed" messages 228 (three shown) to the initiator 210. For garbage collection purposes, the initiator 210 responds by sending "committed" messages 430 to the first participant 212, the second participant 214, and the shared participant 216. After receiving the "committed" message 430 from the initiator 210, the first participant 212, the second participant 214, and the shared participant 216 clear their respective logs and the commit protocol 208 ends.

The exemplary timing chart shown in FIG. 2B illustrates the commit protocol 208 when no failures occur. Since the remote participants 212, 214 notify the shared participant 216 of the transaction's outcome, the remote participants 212, 214 can resolve the transaction if they both become disconnected from the coordinator 218.

One example of a global transaction system, in which embodiments of systems and methods described herein may be implemented, is described in U.S. patent application Ser. No. 11/449,153 entitled "Non-Blocking Commit Protocol Systems and Methods," filed Jun. 8, 2006, which is a continuation of U.S. patent application Ser. No. 11/262,306 entitled "Non-Blocking Commit Protocol Systems and Methods," filed Oct. 28, 2005, which claims priority to Application No. 60/623,843, filed Oct. 29, 2004, all of which are hereby incorporated by reference herein in their entirety.

IV. Exemplary Data Structures for Nonlinear Journaling

Figure 3A:
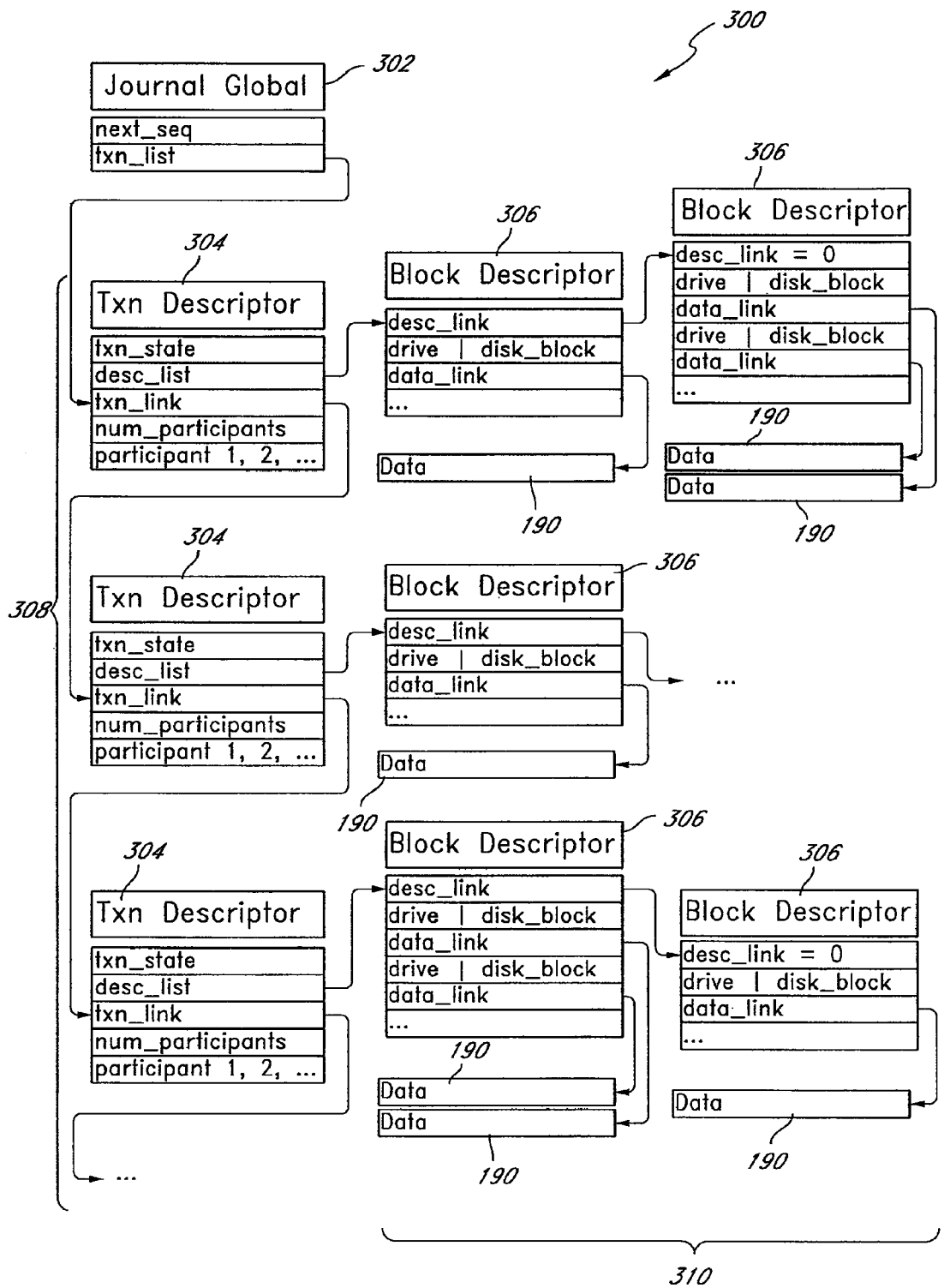
FIGS. 3A, 3B, and 3C illustrate embodiments of data structures for implementing a nonlinear journal.
Figure 3B:
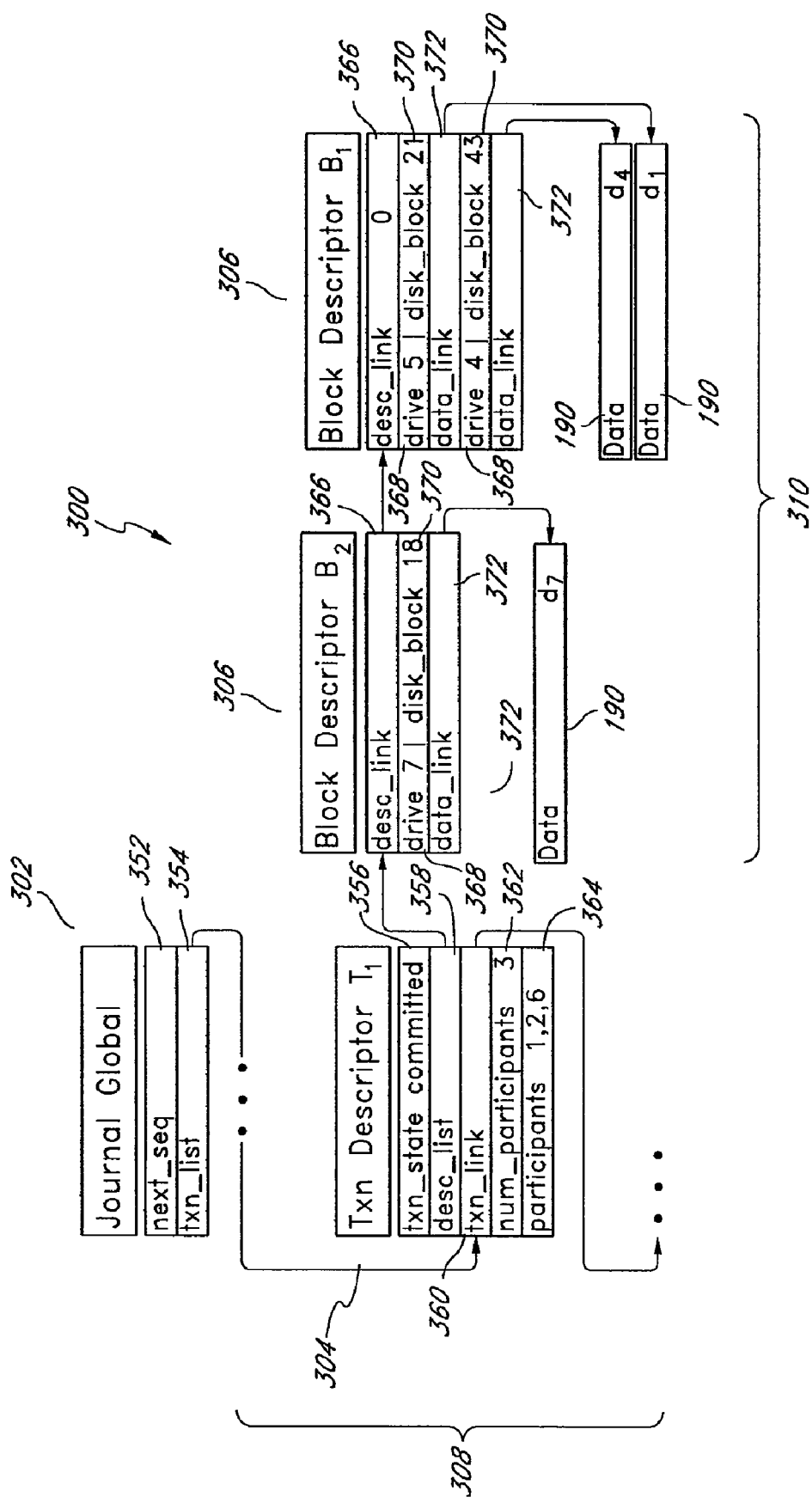
Figure 3C:
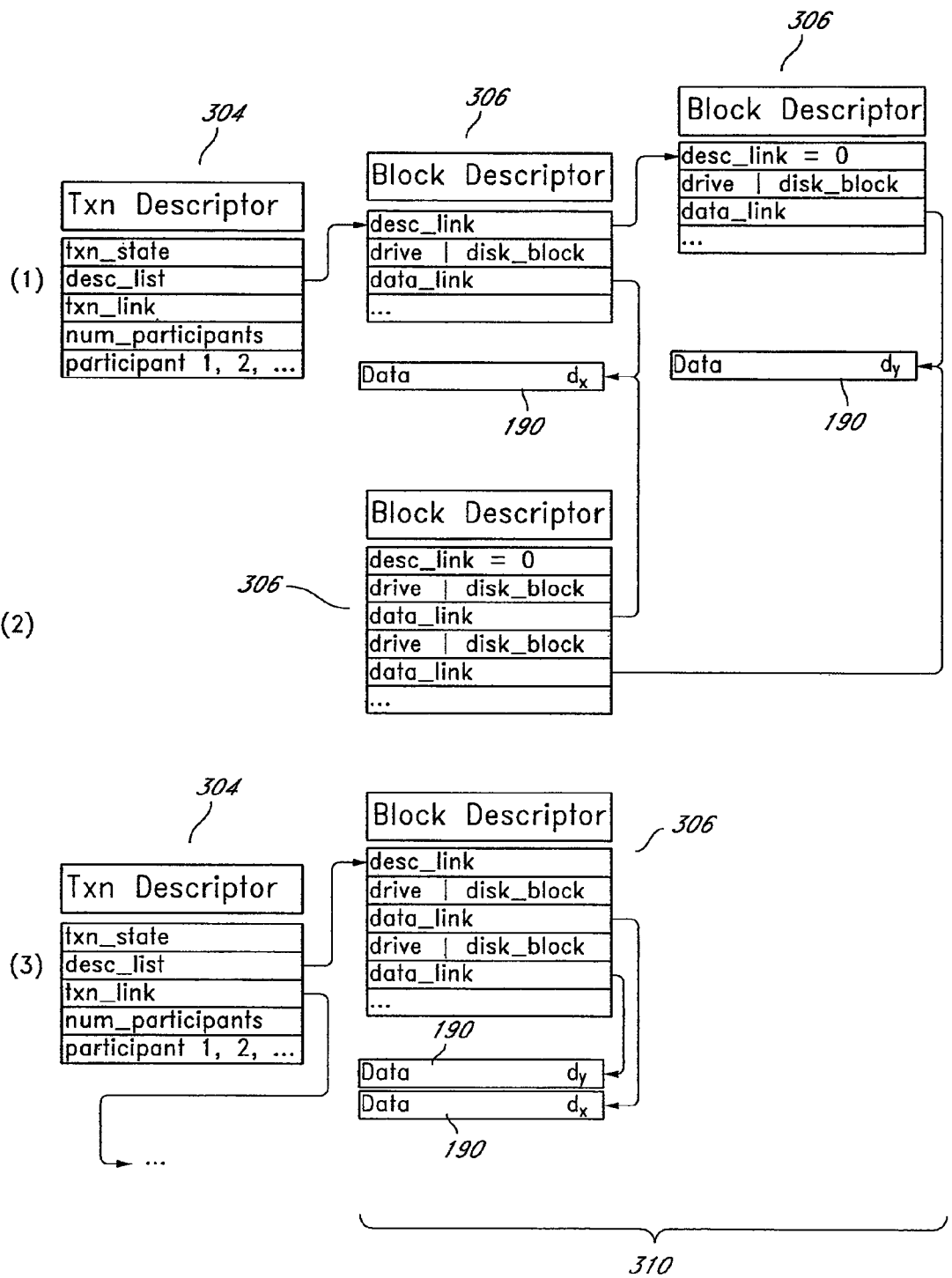

FIGS. 3A, 3B, and 3C illustrate embodiments of data structures for implementing a nonlinear journal 300. In the illustrated embodiment, the nonlinear journal 300 is a two-dimensional linked list configured to support global transactions, atomic additions/deletions to/from the journal, and shadow buffers. In one dimension, the nonlinear journal 300 is a linked list of metadata representing separate transactions, which is anchored to a journal super-block. The transactions are stored in the nonlinear journal 300 in the order the transactions are prepared. In other words, the transactions are stored in the nonlinear journal 300 when a global transaction module sends a "prepared" message, indicating that a transaction has been written to persistent memory 156 and may now be stored into the journal with a single atomic write. Thus, a particular transaction may be stored in persistent memory 156 before it is stored (or linked) to the nonlinear journal 300.

The nonlinear journal also includes a linked list of metadata representing the data blocks that correspond to the same transaction. In the illustrated embodiment, the data blocks are stored unordered in the nonlinear journal 300, and these data blocks—or "journal" blocks—correspond to unique disk addresses relative to that transaction. The data blocks are stored to persistent memory 156 as isolated journal blocks 190 before they are linked with the other journal blocks 190 corresponding to the same transaction. Metadata structures called "descriptors" organize the journal blocks 190 according to their respective transactions. The journal blocks and their associated descriptors are then linked into the journal with a single atomic write.

FIG. 3A illustrates one embodiment of a nonlinear journal 300 that includes a journal descriptor 302, transaction descriptors 304, block descriptors 306, and journal blocks 190. The journal descriptor 302 is the global super-block for the nonlinear journal 300, providing a reference point for a system module 157 to locate the nonlinear journal 300 in persistent memory 156. In one embodiment, the journal descriptor 302 may be written in statically allocated memory at a known location in persistent memory 156. It will be appreciated that there are many ways to implement a journal super-block. In the illustrated embodiment, journal descriptor 302 includes two data fields: next_seq and txn_list.

In the illustrated embodiment, the nonlinear journal 300 is organized into separate transactions, which facilitates, for example, a write module to guarantee that either all data blocks in a transaction are written to disk or no data blocks in a transaction are written to disk. In the illustrated embodiment, each transaction descriptor 304 corresponds to a particular transaction, such as transaction $[T_1]$ 200. The transaction descriptors 304 are organized into a list, the transaction list 308, which is linked to the journal descriptor 302. In the illustrated embodiment, transaction descriptors 304 include metadata for locating the block descriptors 304 that correspond to the respective transaction, for locating the next transaction descriptor 306 in the transaction list 308, and for managing the respective transaction, including support for global transactions, in the distributed system 100. Transaction descriptors 304 include, in the illustrated embodiment, the following data fields: txn_state, desc_list, txn_link, num_participants, and participants. It will be appreciated that there are many suitable ways to implement transaction descriptors. In other embodiments, transaction descriptors may include data fields included by transaction descriptors 304, other data fields, combinations of the same, and their suitable equivalents. Furthermore, a linked list of transaction descriptors, such as transaction list 308, may be organized into many suitable data structures, including hierarchical data structures, such as a linked list, a linked list of linked lists, a linked list of multiple dimension linked lists, other data structures, such as a binary tree, a b-tree, and so forth, suitable combinations and/or equivalents. Moreover, it will be appreciated by one skilled in the art that transaction descriptors 304 may also be implemented in statically allocated data structures, such as arrays, and suitable combinations of statically and dynamically allocated data structures.

In the illustrated embodiment, the data blocks 202 of a transaction 200 are recorded in respective journal blocks 190 in the nonlinear journal 300. The journal blocks 190 are connected indirectly to a transaction descriptor 304. The respective transaction descriptor 304 corresponds to the transaction whose data blocks correspond to the respective journal blocks 190. Journal blocks 190 are connected indirectly to respective transaction descriptors through block descriptors 306. In the illustrated embodiment, the block descriptors 306 corresponding to a particular transaction are linked together in a list, the block list 310, which is linked to the respective transaction descriptor 304 for the particular transaction. Block descriptors 306 include metadata for locating a set of journal blocks 190, for locating the respective disk blocks 178 to which the members of the set of journal blocks 190 correspond, and for locating the next block descriptor 306 in the block list 310. In the illustrated embodiment, block descriptors 306 include the following data fields: desc_link, drive, and disk_block. In the illustrated embodiment, block descriptors 306 may include metadata for a single journal block 190 or multiple journal blocks 190. It will be appreciated by one skilled in the art that other embodiments of block descriptors may be implemented in many suitable implementations to include metadata for different numbers of journal blocks 190. It will be further appreciated that other embodiments of block descriptors may include the foregoing data fields, other suitable data fields, suitable combinations, and suitable equivalents.

Although the illustrated embodiment of nonlinear journal 300 includes a journal descriptor 302, multiple transaction descriptors 304, and multiple block descriptors 306, it will be appreciated that there are many suitable data structures for implementing a nonlinear journal. For example, a nonlinear journal may include a statically allocated array of transaction descriptors that link to linked lists of block descriptors. Additionally and/or alternatively, a particular block descriptor may store a journal block as a static data field rather than storing a link to the respective journal block. Additionally and/or alternatively, a nonlinear journal may include other descriptors for managing data stored in a nonlinear journal and for performing the desired functions of a nonlinear journal. As used herein, a nonlinear journal may describe many suitable combinations of static and/or dynamic memory allocation, different data structures, and various data fields. In general, the term "nonlinear journal" is used to distinguish ring-based (or linear) journals that overwrite statically allocated memory in a linear fashion.

FIG. 3B illustrates one embodiment of a nonlinear journal that includes a block list 310 corresponding to transaction $[T_1]$ 200, described above with reference to FIG. 2A. In the illustrated embodiment, the nonlinear journal 300 is the journal for Node-3 $[P_S]$ 102 in distributed system 100. As described above with reference to FIG. 2A, a global transaction module assigned three data blocks $[d_1, d_4, d_7]$ 202 to Node-3 $[P_S]$ 102.

In the illustrated embodiment, journal descriptor 302 includes two data fields: next_seq data field 352 and txn_list data field 354. The next_seq data field 352 stores the next sequence number available to a new transaction 200. Transactions 200 may be assigned a unique sequence number in order to identify the transactions 200. In general, sequence numbers remain unique in the face of reboots and power failures, so the record of the next sequence number is preferably stored in persistent memory, such as persistent memory 152. In one embodiment, the next_seq data field 352 holds the next available sequence number. A range of sequence numbers may be allocated by incrementing the next_seq data field 352 by the amount of the range. Allocating multiple sequence numbers at the same time may reduce writes to persistent storage 152. In some embodiments, the transaction descriptors 304 and their associated other descriptors and journal blocks 190 may store the unique sequence number of the corresponding transaction.

The txn_list data field 354 stores the location in persistent memory 156 of the first transaction descriptor 304. In the illustrated embodiment, transaction descriptor $[T_1]$ 304 corresponds to transaction $[T_1]$ 200, described above with reference to FIG. 2A. Although not illustrated, transaction list 308 may include other transaction descriptors 304 with their associated block descriptors 306 and journal blocks 190.

In the illustrated embodiment, a transaction descriptor $[T_1]$ 304 includes five data fields: txn_state data field 356, desc_list data field 358, txn_link data field 360, num_participants data field 362, and participants data field 364. In the illustrated embodiment, the txn_state data field 356 stores the value "committed," indicating the present state of the transaction. In one embodiment, the value of the txn_state data field 356 may correspond to a state defined by a global transaction module, such as the global transaction module described above with reference to FIG. 2B. Additionally and/or alternatively, the value may correspond to a state defined by a local transaction module. Transaction states for both global and local transactions are described in more detail below with respect to FIGS. 4A and 4B, respectively. In the illustrated embodiment, the desc_list data field 358 stores the location in persistent memory 156 for the head of a linked list of block descriptors [$B_2$, $B_1$] 306, which link to the journal blocks 190 that correspond to transaction [$T_1$] 200. In the illustrated embodiment, the txn_link data field 360 stores a location in persistent memory 156 corresponding to the next transaction descriptor 304 in the transaction list 308. If transaction descriptor [$T_1$] 304 is the last transaction descriptor 304 in the transaction list 308, then the respective txn_link data field 360 stores a null pointer—that is a value that indicates no accessible memory address location is being stored. In the illustrated embodiment, the num_participants data field 362 stores the number "3," indicating that there are three participants for transaction [$T_1$] 200. In the illustrated embodiment, the participants data field 364 stores a list of identifiers "1, 3, 6," which identify the participant nodes (Node-1, Node-3, and Node-6) 102 for transaction [$T_1$] 200.

In the illustrated embodiment, block descriptors [$B_2$, $B_1$] 306 include a constant data field, desc_link data field 366, and multiple groups of three data fields: drive data field 368, disk_block data field 370, and data_link data field 372. In the illustrated embodiment, the desc_link data field 366 of block descriptor [$B_2$] stores the location in persistent memory 156 for block descriptor [$B_1$] 306, which is the next block descriptor 306 in the block list 310. Because block descriptor [$B_1$] 306 is the last block descriptor 306 in the block list 310, its desc_link data field 366 stores a null pointer, indicating that there are no remaining block descriptors 306 in the block list 310. In the illustrated embodiment, data_link data field 372 of block descriptor [$B_2$] 306 stores a location for the journal block 190 that stores the value of data block [$d_7$] 202 of transaction [$T_1$] 200. In the illustrated embodiment, the drive data field 368 and the disk_block data field 370, of block descriptor [$B_2$] 306, store the values "7" and "18," respectively, indicating that the value of data block [$d_7$] 202 of transaction [$T_1$] 200 is assigned for storage to disk block [18] 178 of hard-disk drive [7] 150 on Node-3 102 of distributed system 100. Respective data fields for block descriptor [$B_1$] 306 indicate that the value of data block [$d_4$] 202 of transaction [$T_1$] 200 is assigned for storage to disk block [43] 178 of hard-disk drive [4] 150 on Node-3 102 of distributed system 100, and that the value of data block [$d_j$] 202 of transaction [$T_1$] 200 is assigned for storage to disk block [21] 178 of hard-disk drive [5] 150 on Node-3 102 of distributed system 100. In other embodiments, the value of the respective data block 202 may be stored in place of the data_link data field 372.

FIG. 3C illustrates one embodiment of defragmenting a nonlinear journal 300 by deleting a block descriptor 306 and linking its journal blocks 190 to another block descriptor 306. In some embodiments, there may be a need to implement defragmentation because there may be heterogeneous block sizes allocated in the nonlinear journal 300 and because there may be different lifetimes of data. In one embodiment, the basic unit of allocation may be made to be 512 bytes, and larger blocks may be constructed with scatter/gather lists. In another embodiment, the nonlinear journal 300 may be defragmented on demand. In the illustrated embodiment, to move the data of any particular journal block 190 and/or its associated descriptors in the nonlinear journal 300, the data or descriptor may be copied to a new location and a single atomic write may change the pointer in the nonlinear journal 300 that points to the respective data or descriptor. Additionally and/or alternatively, block descriptors 306 may be coalesced in the case that they are adjacent in the block list 310. A single atomic write may be used to change any linkage. For example, a single block descriptor 306 may be written with links to the combined set of journal blocks 190 corresponding to two different block descriptors 306. In the illustrated embodiment, a new block descriptor 306 is first created with its respective data_link data fields 372 linked to the journal blocks 190 of the two old block descriptors 306. The new block descriptor 306 is then linked into the respective block list 310 in place of the old block descriptors 306. The two old block descriptors 306 may now be freed.

In other embodiments, there may be transaction descriptors, which directly reference the journal blocks without block descriptors. In one embodiment, the transaction descriptors could be variable-sized in persistent memory. In another embodiment, there may be block descriptors, which duplicate transaction metadata in the block descriptors themselves without implementing transaction descriptors. In one embodiment, a scheme may be used to determine which block descriptor(s) has the correct transaction state. In another embodiment, transaction descriptors are pre-allocated in a contiguous array. In one embodiment, block descriptors are also pre-allocated in a contiguous array. In another embodiment, transaction descriptors share block descriptors. In one embodiment, the transaction descriptors use reference counts. In another embodiment, block descriptors include data inline. In another embodiment, partial block descriptors may be placed inside transaction descriptors, for example, to save space. The embodiments enumerated above are by way of example to illustrate the many suitable organizations and configurations comprised in embodiments of the invention. Other embodiments may specify other descriptors, data fields, and structures. Still other embodiments may combine the above-enumerated embodiments and their suitable equivalents.

V. Exemplary Global Transactions

Figure 4A:
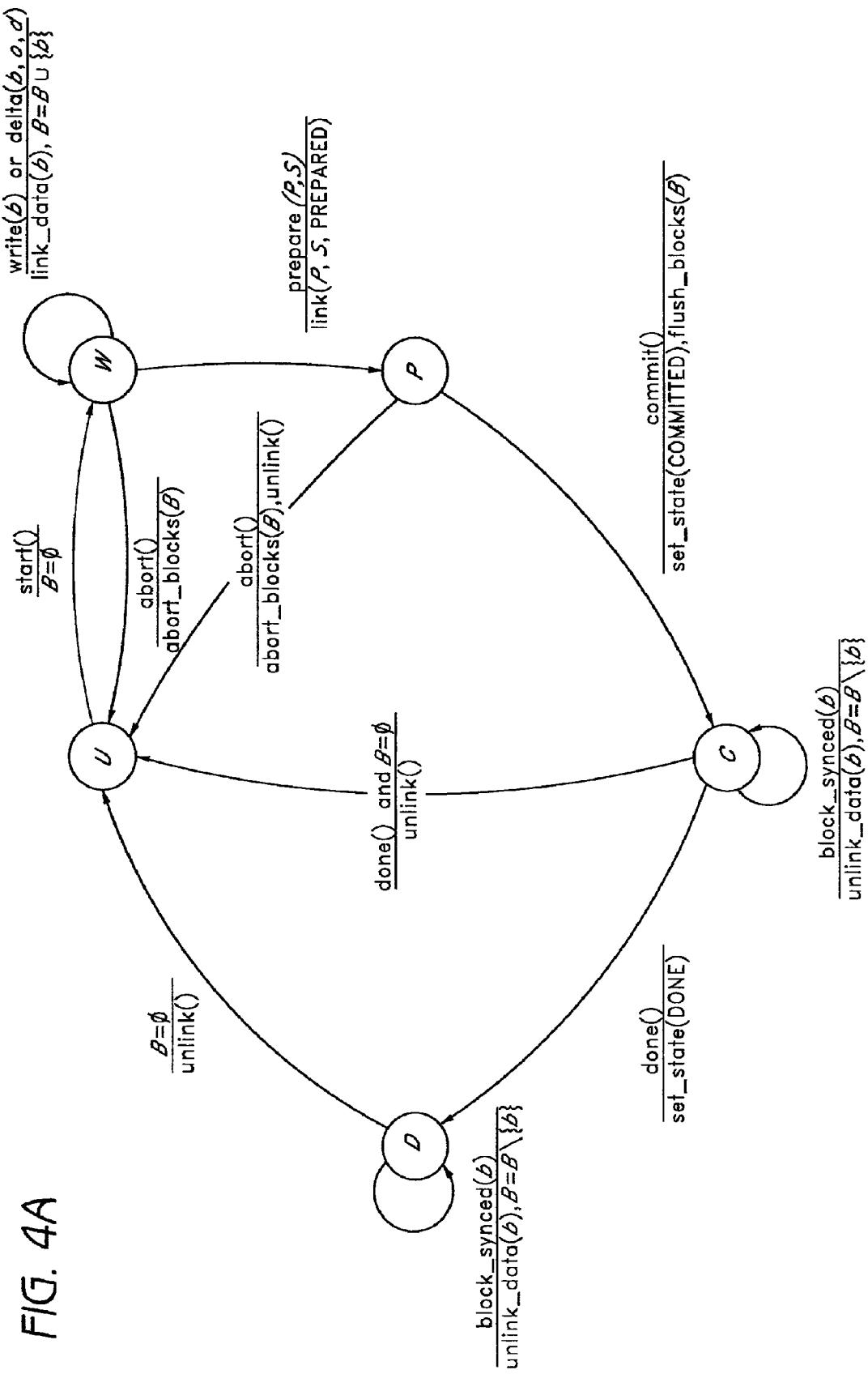
FIGS. 4A, 4B, 4C, 4D, and 4E illustrate state diagrams of embodiments of a nonlinear journal.
Figure 4B:
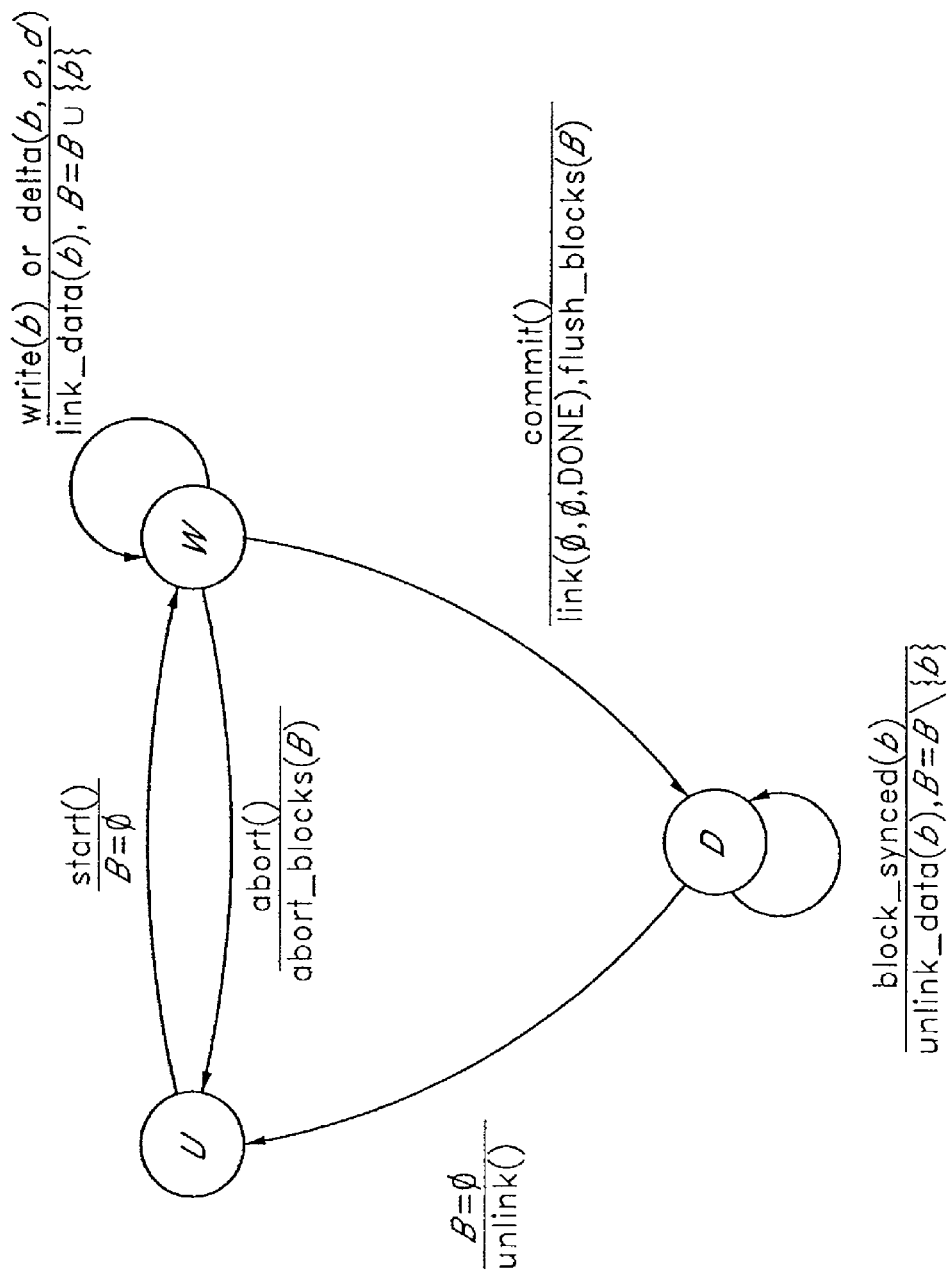

FIGS. 4A and 4B illustrate state diagrams of embodiments of a nonlinear journal system for global and local transactions, respectively. FIG. 4A is a state diagram showing the on journal states for one embodiment of a global transaction module using one embodiment of a nonlinear journal 300. State U is the unknown state. In state U, there is no knowledge of the transaction in the nonlinear journal 300. State W is the writing state. In the writing state, data blocks 202 are written to persistent memory 156 as journal blocks 190, and the linked list of block descriptors 306 is built up. In one embodiment, transactions in state U and W will not be reconstructed at replay time because they are not yet linked into the transaction list 308. In other words, if the nonlinear journal 300 is replayed after a failure, the data written to persistent memory 156 for all transactions in state U will be ignored because the replay module will only restore the data linked into the transaction list 308. State P is the prepared state. A prepared transaction has a transaction descriptor 304 that is linked into the transaction list 308, and its descriptors' txn_state data field 356 is set to "prepared." State C is the committed state. A committed transaction is linked into the transaction list 308, and its descriptor's txn_state data field 356 is set to "committed." A committed transaction is waiting for the global transaction module to confirm that the participants have committed before transitioning to done. The final state D is the done state. A transaction in the done state holds the journal blocks 190 that still need to be written to disk.

The following are exemplary entry points into one embodiment of a journal subsystem for a participant in a distributed system, such as a participant node 102 of distributed system 100:

start( ): Called to start a transaction.

write(b): Called to write a block on a transaction.

delta(b, o, d): Called to write a delta to a block on a transaction.

prepare(P, S): Called at prepare time. It is passed the set of participants P and the shared participant S which gets put in the txn descriptor.

commit( ): Called to commit the transaction.

abort( ): Called to abort the transaction.

done( ): Called to indicate it is no longer necessary for the journal to keep a record of the transaction's outcome.

block_synced(b): Called when the block is known to be on the disk platters.

The following is exemplary pseudocode of one embodiment of a journal subsystem in a participant node 102 of distributed system 100: (In the illustrated embodiment, the pseudocode is common to both global and local transactions of the journal subsystem.)

| | |
|---|---|
| function abort_blocks(B): | for all b in B:<br>  block_abort(b) |
| function flush_blocks(B): | for all b in B:<br>  block_flush (b) |
| function link(P, S, s): | write out txn descriptor with participants P, shared participant S and state s<br>do atomic write to link descriptor into the global txn list |
| function unlink( ): | do atomic write to unlink descriptor from the global txn list<br>set state to U |
| function link_data(b): | do atomic write to link data block into txn block list |
| function unlink_data(b): | do atomic write to unlink data block from txn block list |

The following exemplary pseudocode further describes one embodiment of a journal subsystem in a participant node 102 of distributed system 100. In the illustrated embodiment, the pseudocode is with respect to global transactions:

| | |
|---|---|
| Function mark_state(s): | do atomic write to change state to s in txn descriptor |
| in state U: | |
| on start( ): | set state to (W, ∅) |
| in state (W, B): | |
| on write(b): | block_alloc( )<br>link_data(b)<br>set state to (W, B ∪ {b}) |
| on delta(b, o, d): | If (predecessor_block(b))<br>  set state to (W, D ∪ {b, o, d})<br>else<br>  read(b)<br>  Apply_delta(b, o, d)<br>  write(b) |
| on prepare (P, S): | Link(P, S, PREPARED)<br>set state to (P, P, S, B) |
| on abort( ): | abort_blocks(B)<br>set state to U |
| in state (P, P, S, B): | |
| on commit ( ): | mark_state(COMMITTED)<br>flush_blocks(B)<br>set state to (C, P, B) |
| on abort( ): | abort_blocks(B)<br>unlink( ) |
| In state (C, P, B): | |
| on block_synced(b): | unlink_data(b)<br>set state to (C, P, B \ {b}) |
| on done( ) and B = ∅: | unlink( ) |
| on done( ): | mark_state(DONE)<br>set state to (D, B) |
| in state (D, B): | |
| on block_synced(b): | unlink_data(b)<br>set state to (D, B \ {b}) |
| on B = ∅: | unlink( ) |

FIG. 4B is the state diagram showing the on-journal states for one embodiment of a local transaction module using one embodiment of a nonlinear journal 300. Local transactions are those transactions that affect relevant node 102 executing the transaction, but do not affect other nodes 102 in the distributed system. Because there is no need to hold onto the outcome of the transaction for other participants to query, a local transaction goes directly from W to D.

The following exemplary pseudocode further describes nonlinear journaling with respect to local transactions:

| | |
|---|---|
| In state U: | |
| on start( ): | set state to (W,∅) |
| in state (W, B): | |
| on write(b): | block_alloc( )<br>link_data(b)<br>set state to (W, B ∪ {b}) |
| on delta(b, o, d): | If (predecessor_block(b))<br>  set state to (W, D ∪ {b, o, d})<br>else<br>  read(b)<br>  apply_delta(b,o,d)<br>  write(b) |
| on commit( ): | link(∅,∅, DONE)<br>flush_blocks(B)<br>set state to (D, B) |
| on abort( ): | abort_blocks(B)<br>set state to U |
| in state (D, B): | |
| on block_synced(b): | unlink_data(b)<br>set state to (V, B \ {b}) |
| on B = ∅: | unlink( ) |

Figure 4C:
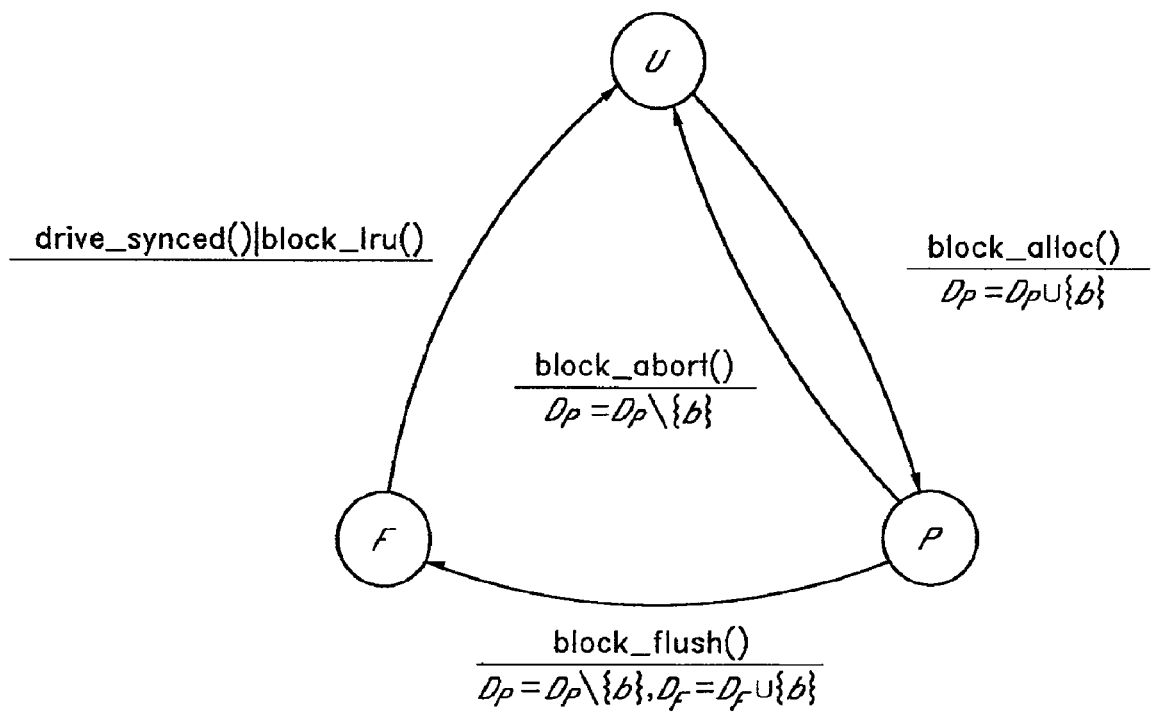
Figure 4D:
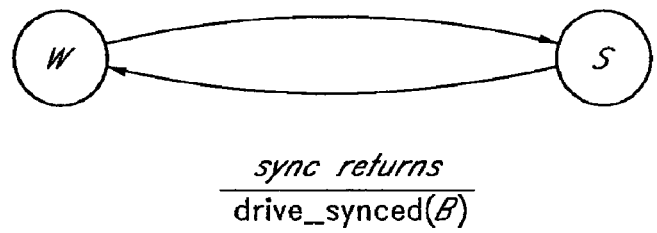
Figure 4E:
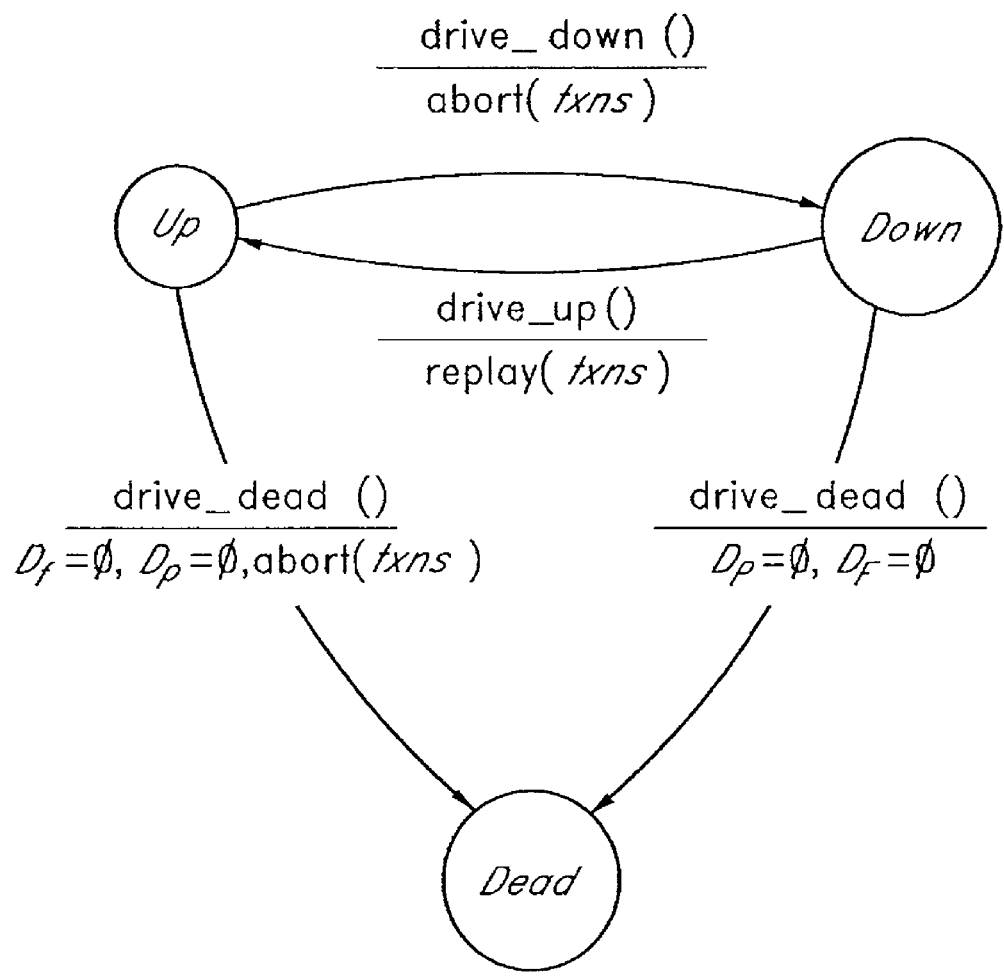

FIGS. 4C and 4D illustrate state diagrams describing the life cycle of journal blocks 190 in nonlinear journal 300. FIG. 4E illustrates a state diagram describing one embodiment of providing support for down drives in nonlinear journal 300. These state diagrams are described in greater detail below in Sections VI and VIII, respectively.

A. Example Transactions

Figure 5A:
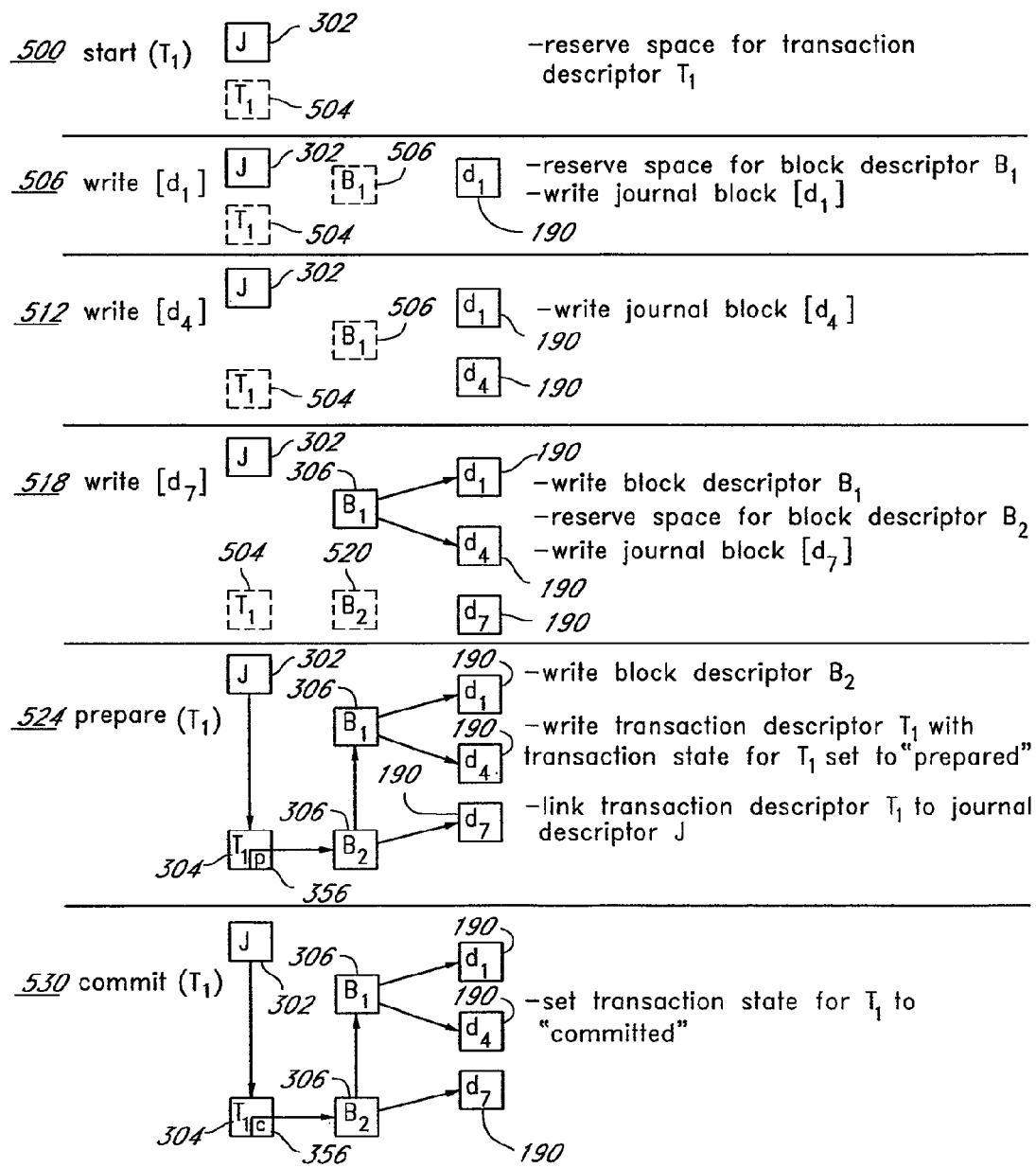

FIGS. 5A, 5B, and 5C illustrate embodiments of building, modifying, and removing nonlinear journal data structures. Up until the point a transaction is prepared (or done for local transactions), in the illustrated embodiment, the transaction is guaranteed to be ignored (to abort) at replay time because a transaction is not linked into the transaction list 308 until the transaction is prepared. Accordingly, in the illustrated embodiment, a list of journal blocks 190—or, more specifically, a list of block descriptors 306 with their associated journal blocks 306—may be constructed in any free space in persistent memory 156, unattached to any other structures.

In the illustrated embodiment, to construct the block list 310, the first block descriptor 306 is written with a null desc_link data field 366. Subsequent block descriptors 306 are written with a desc_link data field 366 pointing to the previous block descriptor 306. With reference to FIGS. 3A and 3B, in one embodiment, the block descriptors 306 are written from right to left. In the illustrated embodiment, to replay properly, either the journal blocks 190 need to be replayed in the same order as they were written, or there needs to be no duplicate block writes to the same disk location in a single transaction. In the illustrated embodiment, there are no journal blocks 190 in the same block list 310 that correspond to the same disk block 178 on the same hard-disk drive 150. In other embodiments, the journal blocks may be replayed in order, and journal blocks 190 may correspond to the same disk location within the same transaction. In one embodiment, when a disk block 178 is written by multiple data blocks 202 within the same transaction, a single corresponding journal block 190 may be overwritten with the new data.

Journal-block writes to persistent memory 156 may be asynchronous. To prepare a transaction, the journal-block writes are completed before linking the corresponding transaction descriptor 304 for the respective journal blocks 190 into the transaction list 308. Because a transaction is not prepared until after it is linked, the transaction-descriptor write may be asynchronous as well. After the block-descriptor writes are started, the respective transaction descriptor 304 is written with its desc_list data field 358 set to the location of a block descriptor 306, its txn_link data field 360 set as a null pointer, and its txn_state data field 356 set to "prepared." When the descriptor writes and journal-block writes finish, a single atomic write to the txn_link data field 360 of the previous descriptor in the transaction list 308 links the new transaction descriptor 304 and its associated block descriptors 306 and respective journal blocks 190.

To commit a global transaction, a single atomic write is made to the txn_state data field 356 of the respective transaction descriptor 304. That field is set to "committed." For a local transaction, the txn_state data field 356 of the respective transaction descriptor 304 is written as "done" when the transaction descriptor 304 is written. The transaction descriptor 304 is then atomically linked into the transaction list 308.

In one embodiment, before removing a record of a global transaction from the nonlinear journal 300, the contents of respective journal blocks 190 associated with the transaction are written to corresponding disk blocks 178, and a global transaction module, such as the coordinator module described above with reference to FIG. 2B, informs the respective participant node 102 that the remaining participant nodes 102 are committed. Local transactions, however, are done as soon as they commit. Local transactions are described in greater detail above with reference to FIG. 4B. Once journal blocks 190 are stored to corresponding disk blocks 178, journal blocks 190 associated with a particular transaction can be freed while that transaction is still active. This may be done by zeroing or nulling the data_link data field 372 of the associated block descriptor 306 with an atomic write. If the associated block descriptor 306 no longer links to any journal blocks 190, it may be removed by unlinking it from the desc_link data field 366 of the preceding block descriptor 306, or the desc_list data field 358 of the associated transaction descriptor 304 (if the block descriptor 360 was the first block descriptor 306 in block list 310). Any remaining block descriptors 306 in the block list 310 may then be relinked to the respective desc_link data field 366 or desc_list data field 358, which was just set to null to unlink it from the removed block descriptor 306. Once journal blocks 190 associated with a transaction are stored to corresponding disk blocks 178 and freed from the nonlinear journal 300, the corresponding transaction descriptor 304 is a candidate for being freed as well. It may be retained, however, until the global transaction module releases it, for example, by setting the state of the transaction to done.

FIG. 5A illustrates one embodiment of building transaction $[T_1]$ 200 in the nonlinear journal 300. In state 500, Node-3 $[P_S]$ 102 of distributed system 100 receives a "start $T_1$" message from an initiator node, such as the initiator node [i] 102 described above with reference to FIG. 2B. In the illustrated embodiment, prior to receiving the "start $T_1$" message, journal descriptor 302 was written to persistent memory 156 in a known location. In the illustrated embodiment, there are no transaction descriptors 304 linked in the transaction list 308, indicating that no transaction is currently journaled in the nonlinear journal 300. Upon receiving the "start" message, the participant module reserves space for transaction descriptor $[T_1]$ 304 in space 504 in persistent storage 156.

Throughout the description of the drawings reference is made to a "participant module." The participant module is meant to refer to suitable programs implemented in hardware or software that execute the described functions and operations. In some embodiments, the participant module may be a journal subsystem that is responsible for managing the operations associated with a journal, such as nonlinear journal 300. In other embodiments, the participant module may comprise a journal subsystem along with other subsystems, such as a subsystem, module, procedure, or process for global transactions. In still other embodiments, the participant module may be a component of a journal subsystem. The participant module need not be separately compilable, though it may be. In one embodiment the participant module may execute on a system comprising a single node, such as node 102, executing a journal subsystem in isolation from other entities. In other embodiments, the participant module may execute on a distributed system, such as distributed system 100, executing in separate instances on individual nodes, or possibly executing in part on multiple nodes within the system.

In 506, the participant module receives a "write $[d_1]$" message from an initiator node, such as the initiator node [i] 102 described above with reference to FIG. 2B. The participant module reserves space for block descriptor $[B_1]$ 306 in space 506 of persistent memory 156. The participant module then writes a journal block 190 with the value of data block $[d_1]$ 202. Because the block descriptors 306 in the illustrated embodiment may link to two journal blocks 190, block descriptor $[B_1]$ 306 is not yet written to persistent storage 156.

In 512, the participant module receives a "write $[d_4]$" message from an initiator node, such as the initiator node [i] 102 described above with reference to FIG. 2B. The participant module writes a journal block 190 with the value of data block $[d_4]$ 202.

In 518, the participant module receives a "write $[d_7]$" message from an initiator node, such as the initiator node [i] 102 described above with reference to FIG. 2B. The participant module writes block descriptor $[B_1]$ 306, links to it journal block $[d_1]$ 190 and journal block $[d_4]$ 190, and writes their respective drive data fields 368 and disk_block data fields 370. The participant module reserves space for block descriptor $[B_2]$ 306 in space 520 of persistent memory 156, and writes journal block $[d_7]$ 190 in persistent memory 156 with the value of data block $[d_7]$ 202. Although in the illustrated embodiment the respective block descriptor 306 is not written until a second journal block 190 is written, in other embodiments a block descriptor 306 may be written after (or even before) a first journal block 190 is written. It will be appreciated by one skilled in the art that there are many suitable ways to order the writing of journal blocks 190 and their associated descriptors. Moreover, although in the illustrated embodiment the block descriptors 306 comprise metadata for two journal blocks 190, block descriptors may be designed to comprise many suitable numbers of journal blocks 190.

In 524, the participant module receives a "prepare ($T_1$)" message from an initiator node, such as the initiator node [i] 102 described above with reference to FIG. 2B. The participant module writes block descriptor [$B_2$] to persistent storage 156, links to it block descriptor [$B_1$] and journal block [$d_7$] 190, and stores values for drive data field 368 and disk_block data field 370 corresponding to data block [$d_7$] 202. The participant module then writes transaction descriptor [$T_1$] 304, which links to it block descriptor [$B_2$] 306 and keeps respective values for its txn_state data field 356 (set to "prepared"), txn_link data field 360, num_participants data field 362, and participants data field 364. The participant module then links transaction descriptor [$T_1$] 304 into the transaction list 308. Because transaction descriptor [$T_1$] 304 is the first transaction descriptor to be linked into the transaction list 308, the participant module writes to the txn_list field 354 of journal descriptor 302 the location of transaction descriptor [$T_1$] 304 in persistent memory 156.

In 530, the participant module receives a "commit ($T_1$)" message from a coordinator node, such as the coordinator node [C] 102 described above with reference to FIG. 2B. As described above with reference to FIG. 2B, in some embodiments of a global transaction module the coordinator nodes does not send a "commit" message, waiting instead for the other participant nodes to inform the shared participant that the transaction is committed. In the illustrated embodiment, however, the coordinator node [C] 102 sends a "commit ($T_1$)" message. To commit the transaction, the participant module atomically writes to the txn_state field 356 of transaction descriptor [$T_1$] 304 the value "committed."

FIG. 5B illustrates the effect of an "abort ($T_1$)" message received after 518. In 536, the participant module receives the message following state 518. The participant module frees the space allocated to journal blocks [$d_1$, $d_4$, $d_7$] 190, block descriptor [$B_1$] 306, and transaction descriptor [$T_1$] 304. There is nothing to unlink from nonlinear journal 300 because transaction [$T_1$] 200 had not yet been prepared. If the nonlinear journal 300 had been replayed prior to the "abort $T_1$," the journal blocks [$d_1$, $d_4$, $d_7$] 190 would not have been reconstructed because transaction [$T_1$] 200 had never been linked into nonlinear journal 300.

FIG. 5C illustrates the effect of an "abort ($T_1$)" message received after 524. In 542, the participant module receives the message following 524. The participant module unlinks transaction descriptor [$T_1$] 304 from the transaction list 308 by atomically writing the txn_list data field 354 of journal descriptor 302 and setting it to null. The participant module then frees the space allocated to journal blocks [$d_1$, $d_4$, $d_7$] 190, block descriptors [$B_1$, $B_2$] 306, and transaction descriptor [$T_1$] 304. In the illustrated embodiment, after unlinking the transaction and freeing the space allocated with its descriptors, the nonlinear journal 300 still includes the journal descriptor 302. Although in the illustrated embodiment the participant module immediately freed the space allocated to the journal blocks 190 and their associated descriptors, in other embodiments the space may not be freed until a garbage collector is executed. In still other embodiments, the space may not be freed until the space is needed for another journal block 190 or descriptor. For example, a space allocator may determine whether allocated journal space is active by searching through in-memory data structures for a reference to the space and reclaim any unreferenced space. Even a journal block 190 that has not been linked to by a descriptor could still be referenced in memory, allowing the space allocator to distinguish between unlinked and leftover journal blocks 190.

Figure 5D:
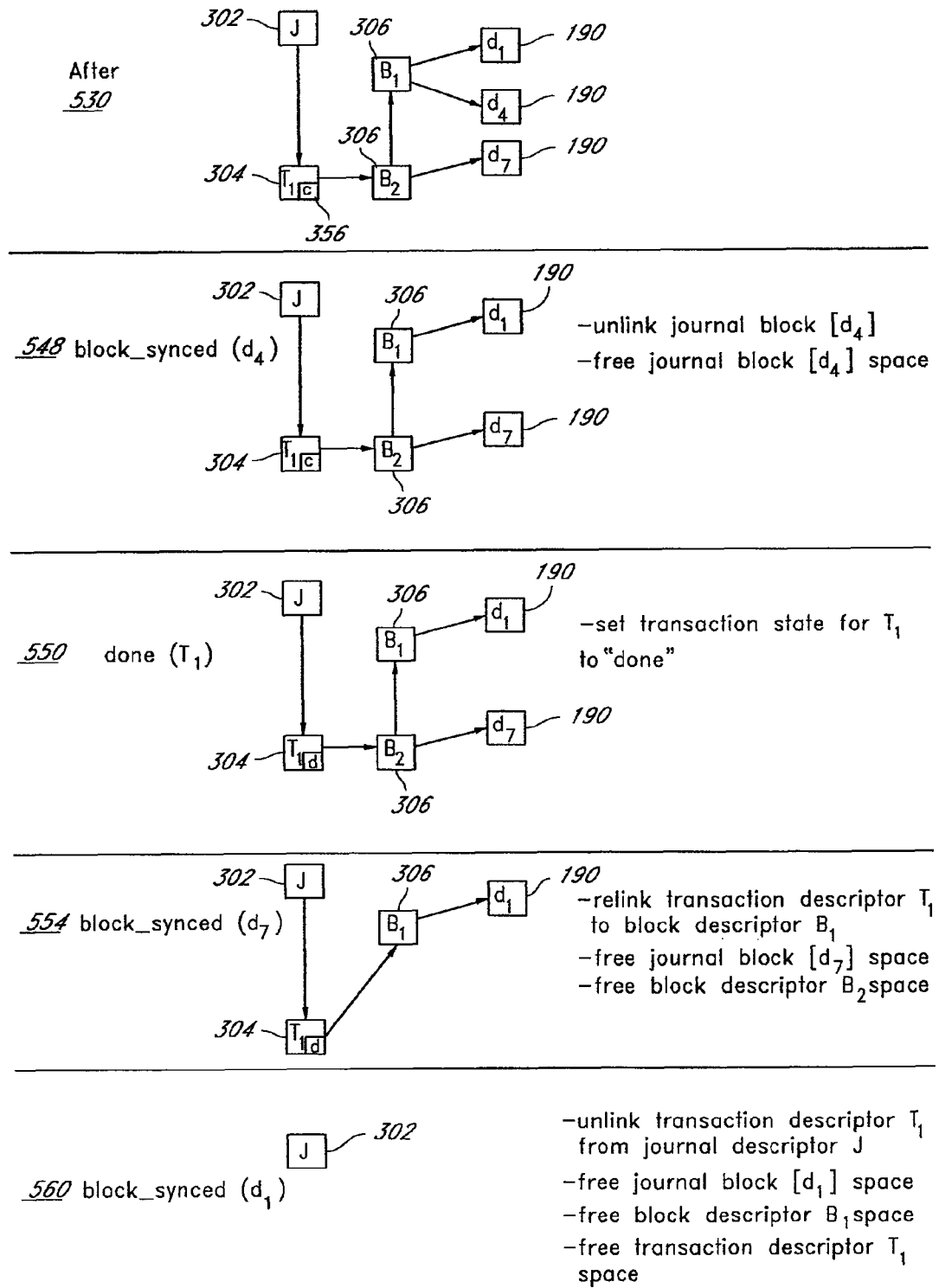

FIG. 5D, discussed in greater detail below in Section VI(C), illustrates the freeing of space allocated for a particular transaction 200 as respective journal blocks 190 are synced with their corresponding disk blocks 178 following state 530.

B. Example Procedures

Figure 6A:
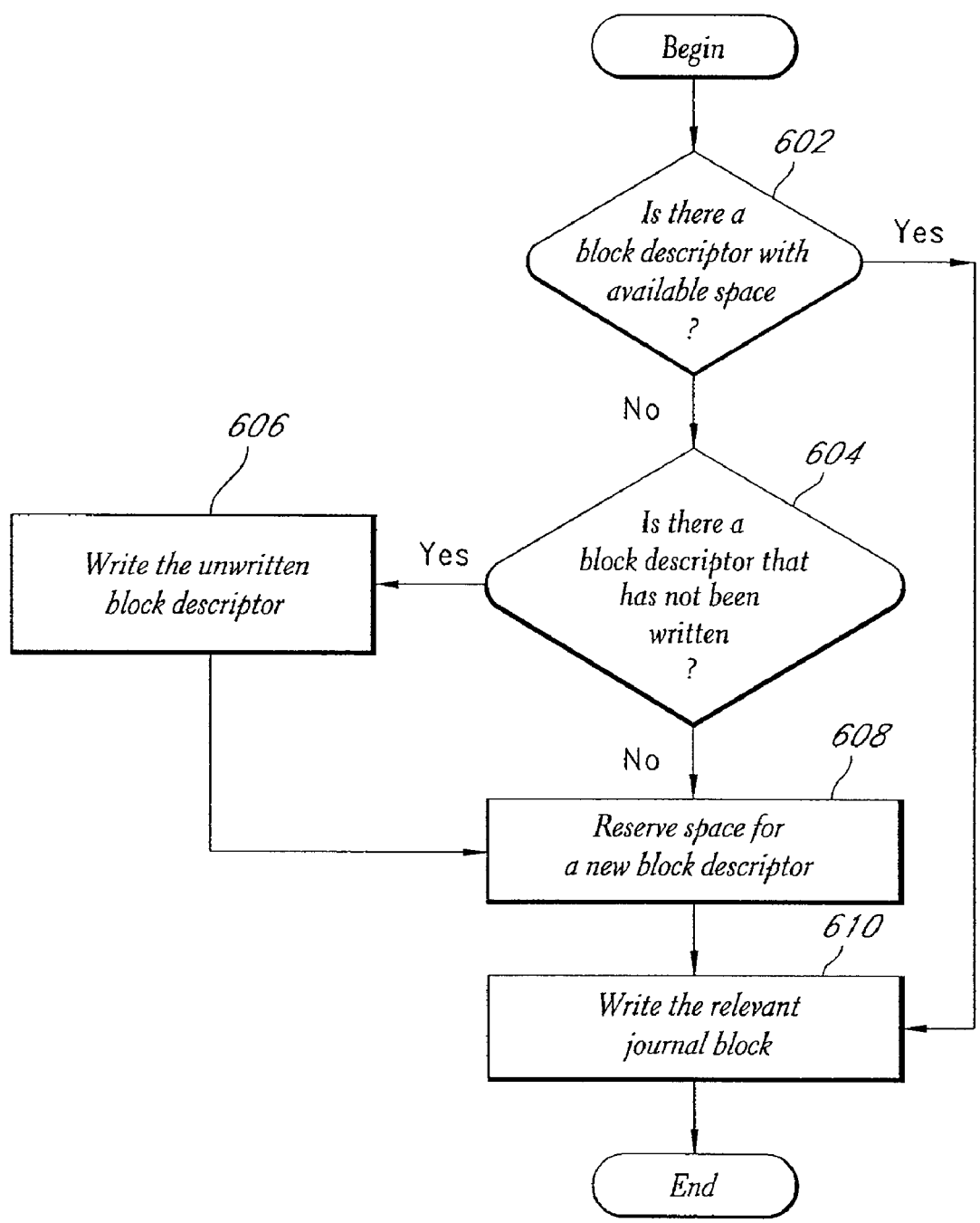
FIGS. 6A, 6B, and 6C illustrate flowcharts of embodiments of building, modifying, and removing nonlinear journal data structures.
Figure 6B:
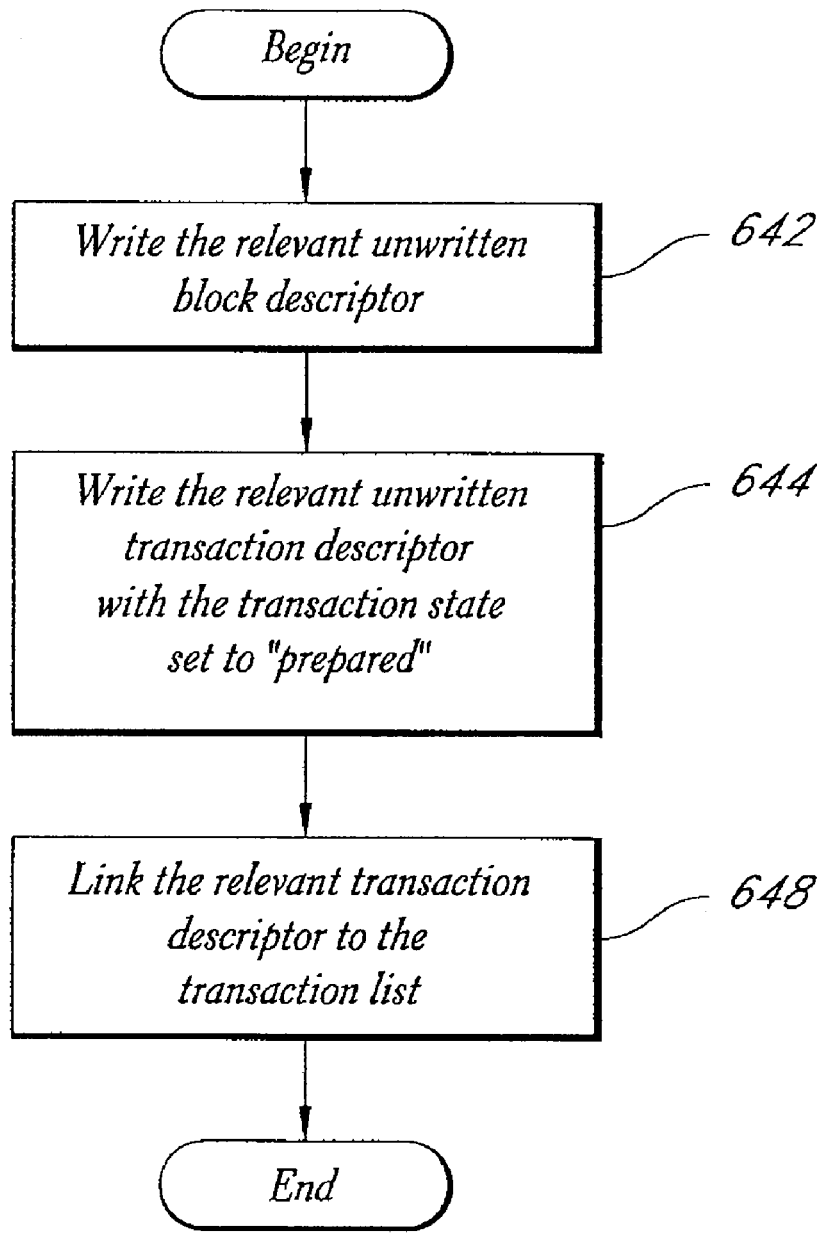

FIGS. 6A and 6B illustrate flowcharts of embodiments of building, modifying, and removing nonlinear journal data structures. FIG. 6A illustrates one embodiment of building a block list 310 corresponding to a particular transaction 200 following a "write" message. In state 602, upon receiving a "write" message, the participant module determines whether there is a block descriptor 306 with space available for an additional journal block 190. If there is a block descriptor with available space, the participant module proceeds to state 610. If there is no block descriptor 306 with available space, the participant module proceeds to state 604. In state 604, the participant module determines whether there is a block descriptor 306 that has not been written to persistent storage 156. If there is a block descriptor 306 that has not been written, then the participant module proceeds to state 606. If it is not the case that there is a block descriptor 306 that has not been written, then the participant module proceeds to state 608. In state 606, the participant module writes the unwritten block descriptor 306, and then proceeds to state 608. Writing a block descriptor 306 is described above in further detail with respect to FIG. 3B. In state 608, the participant module reserves space for a new block descriptor 306. In state 610, the participant module writes the relevant journal block 190. Although in the illustrated embodiment an allocated but unwritten block descriptor 306 is written before a new block descriptor 306 is written, in other embodiments block descriptors 306 for a particular transaction may wait to be written until after the journal blocks 190 for the transaction have been written. It will be appreciated by one skilled in the art that there are many suitable ways to order the writing of journal blocks 190 and their associated descriptors. For example, in one embodiment block descriptors 306 may include metadata for a single journal block 190 and be written before or after the respective journal block 190 is written.

FIG. 6B illustrates a flow chart of one embodiment of building a transaction list 308 for a nonlinear journal 300 following a "prepare" message. Because the most recently written block descriptor 306 is not written, in the illustrated embodiment, following the most recent "write" message, there is an unwritten block descriptor 306 in persistent memory 156 when the "prepare" message is received. In state 642, the participant module writes the unwritten block descriptor 306 to persistent memory 156. As described above with reference to FIG. 6A, in some embodiments block descriptors 306 may be written at various suitable moments; hence, there may not be an unwritten block descriptor 306. In some embodiments, the participant module may determine whether there is an unwritten block descriptor 306. In other embodiments, the participant module may know whether there is an unwritten block descriptor 306 based on the specific implementation. In state 644, the participant module writes the unwritten transaction descriptor 304 to persistent memory 156 with its txn_state data field 356 set to "prepared." Writing a transaction descriptor 304 is discussed above in further detail with respect to FIG. 3B. In state 648, the participant module links the relevant transaction descriptor 304 to the transaction list 308.

VI. Exemplary Journal Space Management

FIGS. 4C and 4D illustrate state diagrams describing the life cycle of journal blocks 190 in nonlinear journal 300. In the illustrated embodiment, journal blocks 190 and their associated descriptors are held in nonlinear journal 300 until the corresponding disk blocks 178 have been written. In one embodiment, the participant module instructs the respective hard-disk drive 150, or possibly a subset of hard-disk drives 150, to flush the contents of its drive cache 172, causing the contents of the cache blocks 176 to be written to the respective disk blocks 178. The term subset, as used herein, is given its ordinary mathematical meaning, which includes the possibility that the entire set is a subset of a set. Additionally and/or alternatively, the hard-disk drives 150 may be self-flushing, regularly flushing the contents of their respective drive cache 172. In some embodiments, the hard-disk drives may communicate to a participant module when their respective drive cache 172 has been flushed. Additionally and/or alternatively, the participant module may be programmed to expect such regular flushes.

In still other embodiments, journal blocks 190 are released on a least recently used (LRU) basis. Some of these alternative embodiments are discussed in greater detail below following the more detailed discussion of the cache-flush (or synchronization) embodiments, which follows immediately.

A. Sync Expiration

In the illustrated embodiment, journal blocks 190 start in the unallocated state U. They enter the pinned state P when they are allocated. Once they enter state P, they are held in the nonlinear journal 300 and are only released when they are flushed or aborted. Journal blocks 190 in the flushed state F have been written to their corresponding hard-disk drives 150 and are now sitting in an indeterminate state, possibly in the drive cache 172 of the respective hard-disk drive 150, waiting to be written to the respective disk platter 174. In the illustrated embodiment, a list of such blocks $D_F$ is retained until the next drive sync completes, at which time the list is detached and cleared, and all such blocks are sent back to the unallocated state U. In one embodiment, drive sync is implemented as a background process (or thread) that may periodically issue the syncs, and may be woken up if space is needed.

In one embodiment, journal space is managed in system memory, such as system memory 152, with allocate and free logic. Journal space may be managed in system memory such that free blocks may be found as necessary and marked as used, and used blocks may be marked as free when no longer referenced. In other embodiments, journal space may be managed externally in persistent memory, such as persistent memory 156, through use of a table or a linked list of free blocks.

The following are exemplary entry points into one embodiment of a block handling subsystem for a nonlinear journal, such as nonlinear journal 300:

block_alloc( ): Allocate a block in the journal
block_abort( ): Free a block immediately
block_flush( ): Flush contents of journal block to disk and free it from the journal when it is safely on the disk The following exemplary pseudocode further describes space allocation and journal block lifecycle in one embodiment of a block handling subsystem for a nonlinear journal, such as nonlinear journal 300:

| In state U: | |
| --- | --- |
| on block_alloc( ): | Dp = Dp U {b} |
| | set state to P |
| in state P: | |
| on block_abort( ): | Dp = Dp \ {b} |
| | set state to U |

-continued

| on block_flush( ): | write block to disk |
| --- | --- |
| | Dp=Dp\{b} |
| | $D_F = D_F \cup \{b\}$ |
| | set state to F |
| in state F: | |
| on block_synced( ): | set state to U |
| on block_lru( ): | set state to U |

In one embodiment, the values of data blocks 202 are flushed to their respective hard-disk drives 150 indirectly from the journal blocks 190 of nonlinear journal 300 in persistent storage 156. In another embodiment, the values of data blocks 202 are flushed to their respective hard-disk drives 150 directly from the memory blocks 180 in system memory 152. Indirectly flushing from the journal blocks 190 may be advantageous because it frees system memory 152 for reuse. Directly flushing from the memory blocks 180, however, may be faster.

In one embodiment, the block abort function in the pseudocode above refers to marking a block as being synced (and, thus, available for expiration from a journal), and then freeing it immediately, rather than waiting for garbage collection. It will be appreciated by one skilled in the art that many suitable functions may supply the functionality described in the pseudocode above.

The following exemplary pseudocode further describes one embodiment of disk synchronization for a nonlinear journal, such as nonlinear journal 300:

```
function drive_synced(B):
    for all b in B:
        Block_synced(b)
function start_syncer(B):
    send sync command to drives
    set state to (S, B,)
in state (W, D_F):
    on Need Space:           Start_syncer(D_F)
    on D_F > D_{Fmax}:       Start_syncer(D_F)
in state (S, B, D_F):
    on sync return:          drive_synced(B)
                             Set state to (W, DF)
```

In one embodiment, when allocating data blocks 190, if space is not available, the nonlinear journal 300 may block waiting for journal blocks 190 to be flushed or aborted. If the journal blocks 190 are associated with transactions in the writing state or associated with down drives, in one embodiment, this may lead to deadlock and may be dealt with, for example, by failing transactions. Down drives are drives that are not currently available, but that may reenter the system; they are discussed in greater detail below.

B. Alternative LRU Expiration

In one embodiment, a least recently used (LRU) module for journal-block expiration may be used. This model attempts to ensure that data is written through the drive caches 172 to the disk platters 174 by storing as much data as possible in persistent storage 156 and rewriting all of the data on replay. Replaying data is discussed in further detail below with reference to FIG. 7. Data associated with flushed transactions are freed from the nonlinear journal 300 in this model in LRU order, as new transactions allocate data. In one embodiment, the nonlinear journal 300 can operate a LRU model in a per-drive fashion. The nonlinear journal 300 may reserve a certain minimum number of journal blocks 190 that have been written to a respective hard-disk drive 150. A particular minimum reserve may be defined as sufficient to replay over the drive cache 172 of a respective hard-disk drive 150, and the LRU module may not expire journal blocks 190 if it would reduce the number of flushed blocks for a respective hard-disk drive 150 below this limit.

In one embodiment of an LRU implementation, FIGS. 4C and 4D describe the appropriate state diagrams, except that the mechanism to move journal blocks 190 from the F state to the U state is different. In the illustrated embodiment, Journal blocks 190 in the F state are retained in the nonlinear journal 300 until the number of blocks associated with a respective hard-disk drive 150 exceeds the disk replay minimum, $D_{Fmin}$, or possibly a timeout expires that represents the longest time a cache block 176 can exist in the drive cache 172. In the illustrated embodiment, once a journal block 190 is eligible for LRU, it may be retained until demand causes an LRU flush command, or when the associated hard-disk drive 150 is kicked out. Journal blocks 190 corresponding to hard-disk drives 150 that are down are typically not freed, but may be LRU'd until the $D_{Fmin}$ limit is reached. Down drives are discussed in more detail below.

In one embodiment, a nonlinear journal, such as nonlinear journal 300, may support both LRU and drive sync modules simultaneously. In this hybrid module, once a journal block 190 has been flushed to a respective hard-disk drive 150, it cannot be released for LRU until either a drive sync or another condition is satisfied. The exit condition may be configurable and may include both requirements at once.

C. Descriptor Expiration

Although journal blocks 190 may be expired from the nonlinear journal 300 in an LRU or sync fashion, the associated block descriptors 306 and transaction descriptors 304 may be expired from the nonlinear journal 300 as a side effect of their associated journal blocks 190 expiring. When journal blocks 190 are expired from the journal, either through drive sync or LRU, their space is released. To prevent a journal block 190 from being replayed, the respective data_link data field 372 of the corresponding block descriptor 306 may be cleared or nulled. This may be done by atomically rewriting the data_link data field 372 with a null value such as 0. Because block descriptors 306 reference multiple journal blocks 190, the respective block descriptor 306 may not be freed until all journal blocks 190 are unlinked. It will be appreciated that there are many ways to free space from the nonlinear journal. To unlink a block descriptor 306, the desc_link field 366 of the previous block descriptor 306 may be overwritten with the address for the succeeding block descriptor 306. Additionally and/or alternatively, the desc_list field 358 of the relevant transaction descriptor 304 may be overwritten with the succeeding address of the succeeding block descriptor 306. In another embodiment, block descriptors 304 may remain allocated until their associated transaction descriptors 304 are unlinked from the transaction list 308. In one embodiment, a transaction descriptor 304 may be released when all journal blocks 190 in the block list 310 are released and the transaction is done. This is accomplished by removing the transaction descriptor 304 from the transaction list 308. Because a path to a block descriptor 306 may be through the transaction descriptor 304, any allocated block descriptors 306 may be freed directly at this time as well.

D. Example Sync Expiration

FIG. 5D illustrates the freeing of space allocated for a particular transaction 200 as respective journal blocks 190 are synced with their corresponding disk blocks 178 following state 530. In 548, the participant module receives a "block_synced ($d_4$)" message, indicating that respective disk block 178 has been synced with journal block [$d_4$] 190. The participant module unlinks journal block [$d_4$] 190 from block descriptor [$B_1$] 306. The participant module then frees the space allocated to journal block [$d_4$] 190.

In 550, the participant module receives a "done ($T_1$)" message, which indicates that all of the participants of transaction [$T_1$] 200 have committed, and the corresponding transaction descriptor [$T_1$] 304 is no longer needed in order to rebuild the transaction when necessary. The txn_state data field 356 is atomically set to "done." The transaction descriptor [$T_1$] 304, however, is not removed until receiving "block_synced" messages for the journal blocks corresponding to the transaction descriptor [$T_1$] 304. Thus, in the illustrated embodiment, a transaction descriptor 304 is removed from the transaction list 308 when its txn_state data field 356 is set to "done" and when the contents of its corresponding journal blocks 190 are synchronized with their respective disk blocks 178 following the appropriate cache flushes.

In state 554, the participant module receives a "block_synced ($d_7$)" message. Because journal block [$d_7$] 190 is the last journal block 190 linked to block descriptor [$B_2$] 306, transaction descriptor ($T_1$) 304 is relinked atomically to block descriptor [$B_1$] 306. The participant module then frees the space allocated to journal block [$d_7$] 190 and block descriptor [$B_2$] 306.

In state 560, the participant module receives a "block_synced ($d_1$)" message. Because journal block [$d_1$] 190 is the last remaining journal block 190 in the block list 310 for transaction descriptor [$T_1$] 304, and because its txn_state data field 356 is set to "done," transaction descriptor [$T_1$] 304 is unlinked from the transaction list 308. The participant module then frees the space allocated to journal block [$d_i$] 190, block descriptor [$B_1$] 306, and transaction descriptor [$T_1$] 304, leaving only journal descriptor 302 in the nonlinear journal 300.

Although in the illustrated embodiment the "block_synced" messages suggest per-block synchronization, these "block_synced" messages may be part of a synchronization procedure that synchronizes an entire hard-disk drive 150 with an explicit cache flush of the respective drive cache 172. Corresponding "block_synced" messages may then be issued for the synchronized disk blocks 178 with corresponding journal blocks 190 still written to the nonlinear journal 300. It will be appreciated by one skilled in the art that there are many suitable ways to implement a synchronization procedure in accordance with the embodiments described herein.

E. Example Sync Expiration Procedure

Figure 6C:
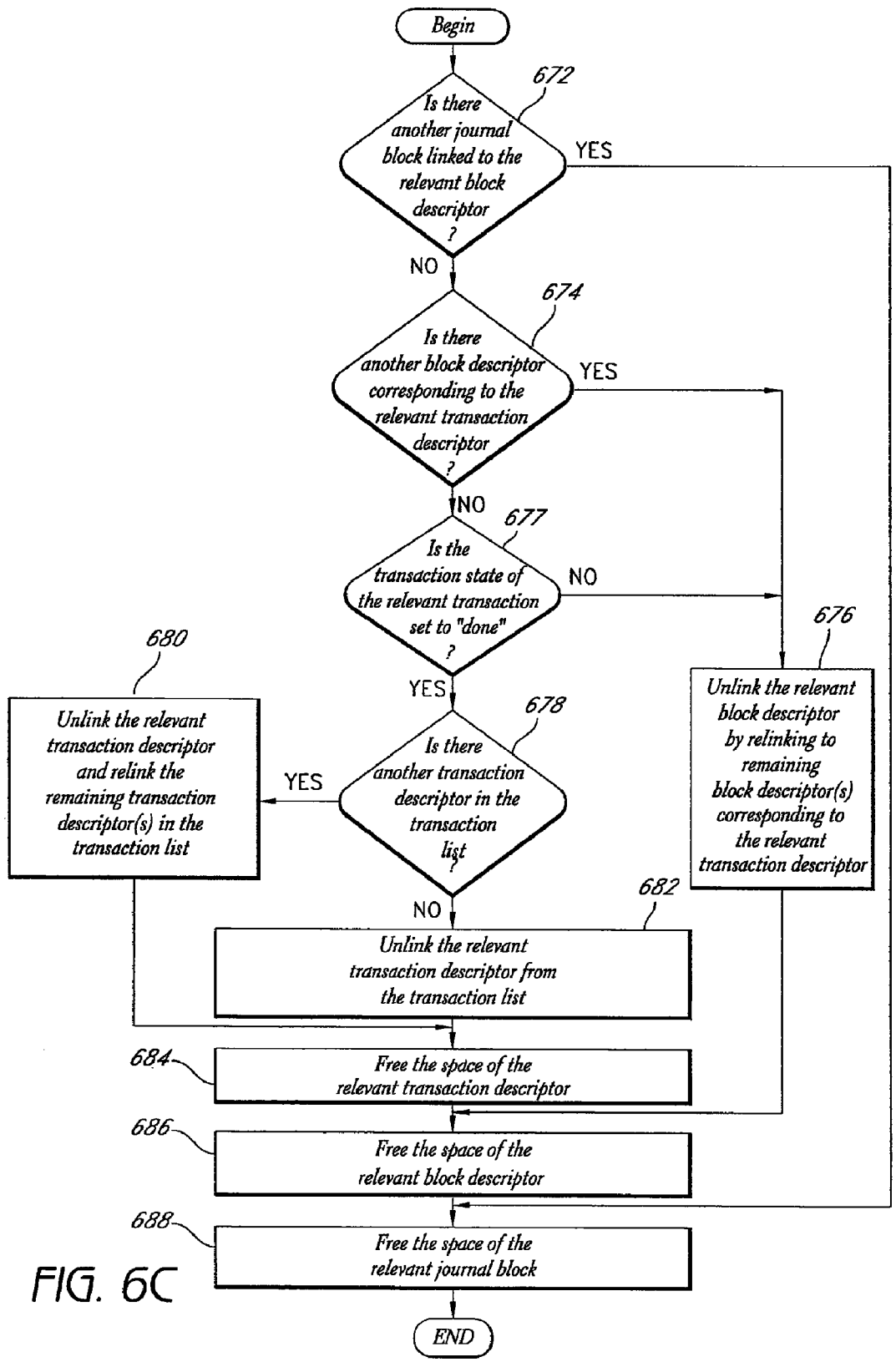

FIG. 6C illustrates a flow chart of one embodiment of removing data blocks and their related descriptors from nonlinear journal 300 and to free their associated space in persistent memory 156. In state 672, the participant module determines whether there is, in addition to the relevant journal block 190, another journal block 190 that is linked to the relevant block descriptor 306. In the illustrated embodiment, the relevant journal block 190 is the journal block 190 being removed because, for example, the corresponding disk block 178 has synced. In the illustrated embodiment, the relevant block descriptor 306 is the block descriptor from which the relevant journal block 190 is being removed. If there is another journal block 190, then the participant module proceeds to state 686. If there is not another journal block 190, then the participant module proceeds to state 674.

In state 674, the participant module determines whether there is another block descriptor 306 corresponding to the relevant transaction descriptor 304. The relevant transaction descriptor 304 is the transaction descriptor 304 from which the relevant journal block 190 is being removed. If there is another block descriptor 306 corresponding to the relevant transaction descriptor 304, then the participant module proceeds to state 676. If there is not another block descriptor 306 corresponding to the relevant transaction descriptor 304, then the participant module proceeds to state 677. In state 677, the participant module determines whether the txn_state data field 356 of the relevant transaction descriptor 304 is set to "done." If the transaction is done, the participant module proceeds to state 678. If the transaction is not done, the participant module proceeds to state 676. In state 676, the participant module relinks the remaining block descriptors 306 in the relevant block list 310, which unlinks the relevant block descriptor 306 from the nonlinear journal 300. In the illustrated embodiment, this relinking and unlinking may be performed with a single atomic write either to the desc_list data field 358 of the relevant transaction descriptor 304 (if the removed block descriptor 306 had been linked to the relevant transaction descriptor 304) or to the desc_link 306 of the block descriptor 306 that previously linked to the removed block descriptor 306. By overwriting either data field, the nonlinear journal 300 may simultaneously link and unlink, providing for a consistent journal state.

In state 678, the participant module determines whether there is another transaction descriptor 304 in the transaction list 308. If there is another transaction descriptor 304 in the transaction list 308, then the participant module proceeds to state 680. If there is not another transaction descriptor 304 in the transaction list 308, then the participant module proceeds to state 682. In state 680, the participant module unlinks the relevant transaction descriptor 304 from the transaction list 308 and relinks the remaining transaction descriptor(s) in the transaction list 308. In the illustrated embodiment, relinking the remaining transaction descriptors(s) includes either linking the txn_list data field 354 of journal descriptor 302 or the txn_link data field 360 of the preceding transaction descriptor 304 to the transaction descriptor(s) 304 in transaction list 308 that the relevant transaction descriptor 304 linked to.

In state 682, the participant module unlinks the relevant transaction descriptor 304 from the transaction list 308 by setting the relevant data field to null. In state 684, the participant module frees the space allocated to the relevant transaction descriptor 304. In state 686, the participant module frees the space allocated to the relevant block descriptor 306. In state 688, the participant module frees the space allocated to the relevant journal block 190.

VII. Exemplary Replay

When necessary, a nonlinear journal, such as nonlinear journal 300, may be replayed to the respective hard-disk drives 150. In other words, the contents of the journal blocks 190 may be written to the corresponding disk blocks 178. In the illustrated embodiment, journal blocks 190 corresponding to committed and done transactions are replayed, and journal blocks 190 corresponding to prepared transactions are ignored.

Figure 7A:
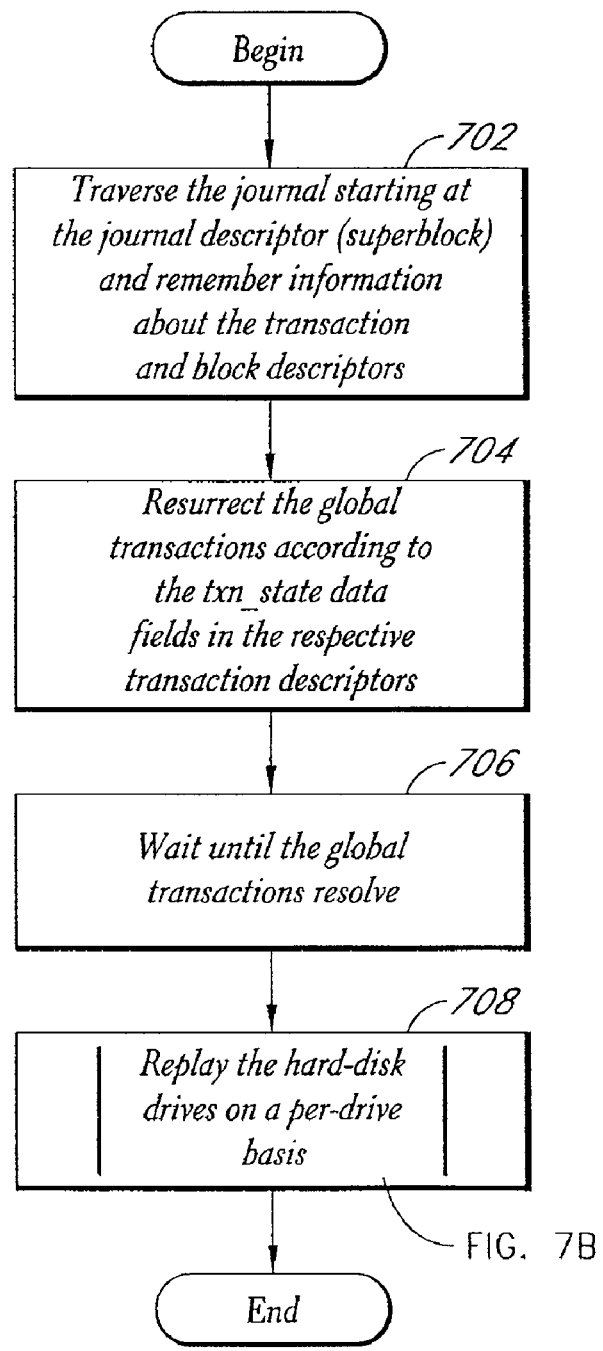
FIGS. 7A and 7B illustrate flowcharts of one embodiment of rebuilding and replaying, respectively, transactions.
Figure 7B:
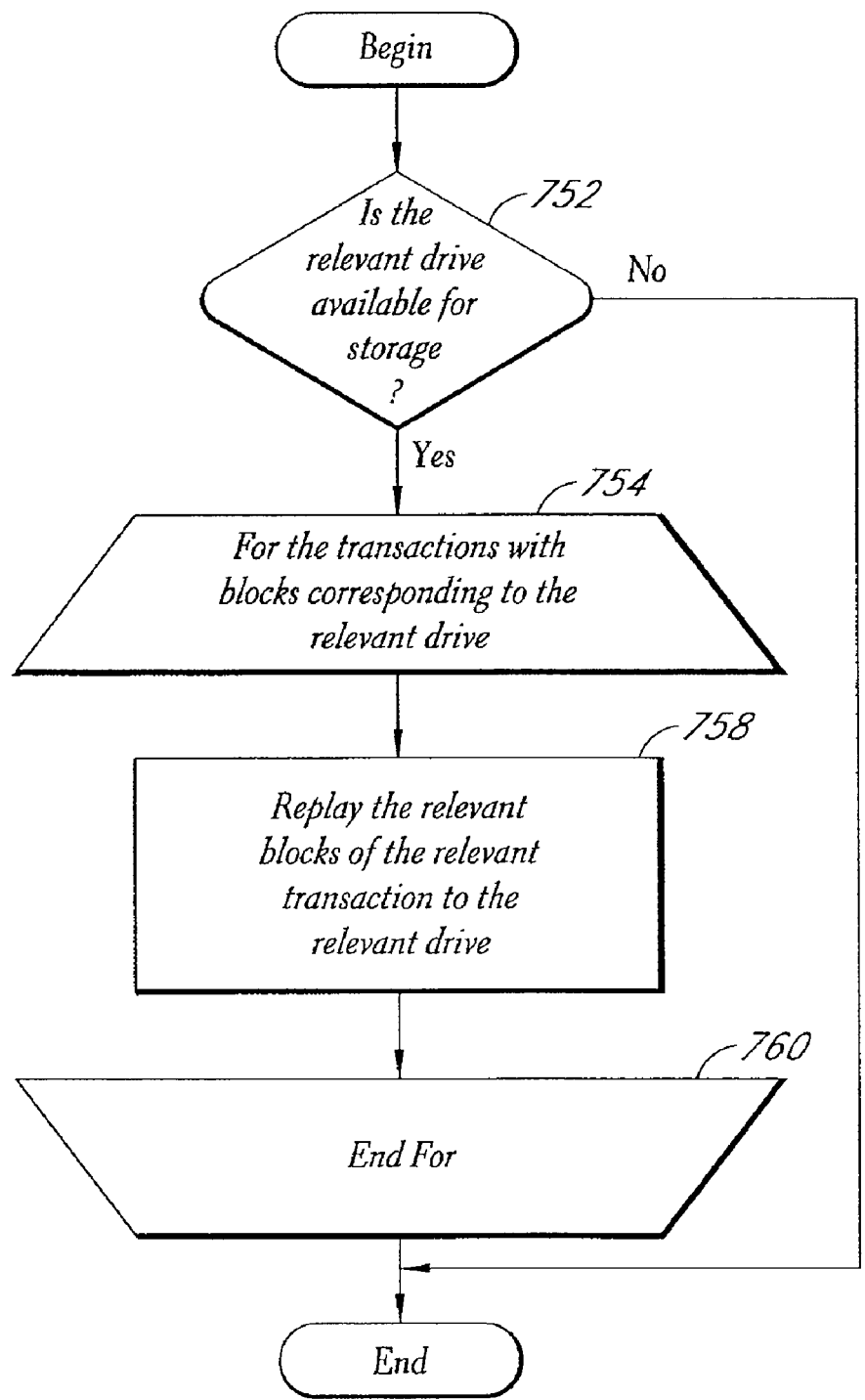

To support down drives, in one embodiment, mount (rebuild) and replay are separated into two stages. Down drives are discussed in more detail below. On initial mount, the nonlinear journal 300 is traversed starting from the journal descriptor 302 (super-block). All transaction descriptors 304 and block descriptors 306 are identified, and their information is remembered. With the information obtained from traversing the nonlinear journal 300, the global transactions are resurrected in system memory 152. After waiting to resolve them, the hard-disk drives are replayed on a per-drive basis. Initially, the hard-disk drives 150 are effectively down. A set of active (not dead) hard-disk drives 150 is then provided, and any memory blocks 180 not associated with an active drive are discarded. Once the journal is mounted, replay may be called on each drive as it is brought from down to up. FIGS. 7A and 7B describe rebuild and replay in greater detail.

FIG. 7A illustrates a flowchart of one embodiment of rebuilding transactions from nonlinear journal 300. In state 702, the participant module traverses a nonlinear journal 300 starting at the journal descriptor 302 (super-block). As the participant module traverses the nonlinear journal 300, it remembers information about the transaction descriptors 304 and block descriptors 306. In state 704, the participant module resurrects the global transactions based on the gathered information from the nonlinear journal 300. In one embodiment, the global transactions are reconstructed in system memory 152. The global transactions are restored to their respective states, as indicated by the txn_state data field 356 of their corresponding transaction descriptor 304. In state 706, the participant module waits until the transactions resolve. In state 708, the participant module replays the hard-disk drives 150 on a per-drive basis, which is illustrated in greater detail in FIG. 7B.

FIG. 7B illustrates a flowchart of one embodiment of replaying, on a per-drive basis, transactions resurrected from nonlinear journal 300, to respective hard-disk drives 150. In state 752, the participant module determines whether a particular hard-disk drive 150 is available for storage. In one embodiment, the participant module may determine that a particular hard-disk drive 150 is available for storage upon receiving a communication from the respective hard-disk drive 150. In another embodiment, the participant module may actively query whether a hard-disk drive 150 is available (up) or unavailable (down) for storage. If the relevant hard-disk drive 150 is unavailable for storage (down), then the participant module proceeds to the end. If the relevant hard-disk drive 150 is available for storage (up), the participant module repeats states between 754 and 760 for the transactions blocks corresponding to the relevant hard-disk drive 150. In state 758, the participant module replays the relevant blocks of the relevant transaction to the relevant hard-disk drive 150. In the illustrated embodiment, the in-memory buffers, such as memory blocks 180, are written (flushed) to the corresponding hard-disk drives 150. In other embodiments, the hard-disk drives 150 may be replayed directly with the contents of corresponding journal blocks 190.

VIII. Exemplary Down Drive Support

A hard-disk drive, such as one of hard-disk drives 150, may go out of service (or down) upon a temporary failure, including, but not limited to, a timeout or a cabling error. In one embodiment, hard-disk drives, such as hard-disk drives 150, may go down, and a journal, such as nonlinear journal 300, may retain journal blocks 190 corresponding to the down drive, and the drive may be safely brought back into service while a distributed system, such as distributed system 100, is still operational.

FIG. 4E illustrates a state diagram describing one embodiment of providing support for down drives in nonlinear journal 300. In one embodiment, hard-disk drives, such as hard-disk drives 150, may not be read or written in the down state. Moreover, upon transition to the down state, transactions in the writing state (W) are aborted; whereas, transactions in the prepared state (P), committed state (C), and done state (D) are retained. Committed transactions may not flush blocks to down drives, but remain instead in the journal, such as nonlinear journal 300. Transactions may behave normally in the presence of down drives. Prepared transactions may transition to committed on a commit command and to unknown on an abort command. Committed transactions may still transition to done on a done command. Transactions stay in the done state because a down drive does not flush its blocks. When a down drive transitions to up, the journal blocks, such as journal blocks 190, associated with committed or done transactions are replayed to the drive before it changes state. When a drive transitions to dead, it may not return. Transactions in the writing state (W) are aborted, and any journal blocks, such as journal blocks 190, associated with the drive are freed.

The following are exemplary entry points into one embodiment of a journal subsystem for bringing drives up and down:
   drive up( ): Bring a drive up from the down state.
   drive down( ): Bring a drive down from the up state.
   drive_dead( ): Move a drive to the dead state from either the up or down states.

The following exemplary pseudocode further describes one embodiment of a journal subsystem providing support for bringing drives up and down:

```
Function kill( ):
    for each b in Dp U Dp:
        block_abort(b)
    DF = DP = φ
    set state to dead
Function abort_writing( ):
    for each txn in state W:
        abort (txn)
Function replay(txn):
    Write all blocks associated with this drive on
this transaction to the disk.
in state up:
    on drive_down( ):           abort_writing( )
                                set state to down
    on drive_dead( ):           abort_writing( )
                                kill( )
in state down:
    on drive_up( ):             for each txn in state CUD:
                                replay (txn)
                                set state to up
    on drive_dead( ):           kill( )
In state dead:
```

IX. Exemplary Support for Shadow Buffers

Figure 8:
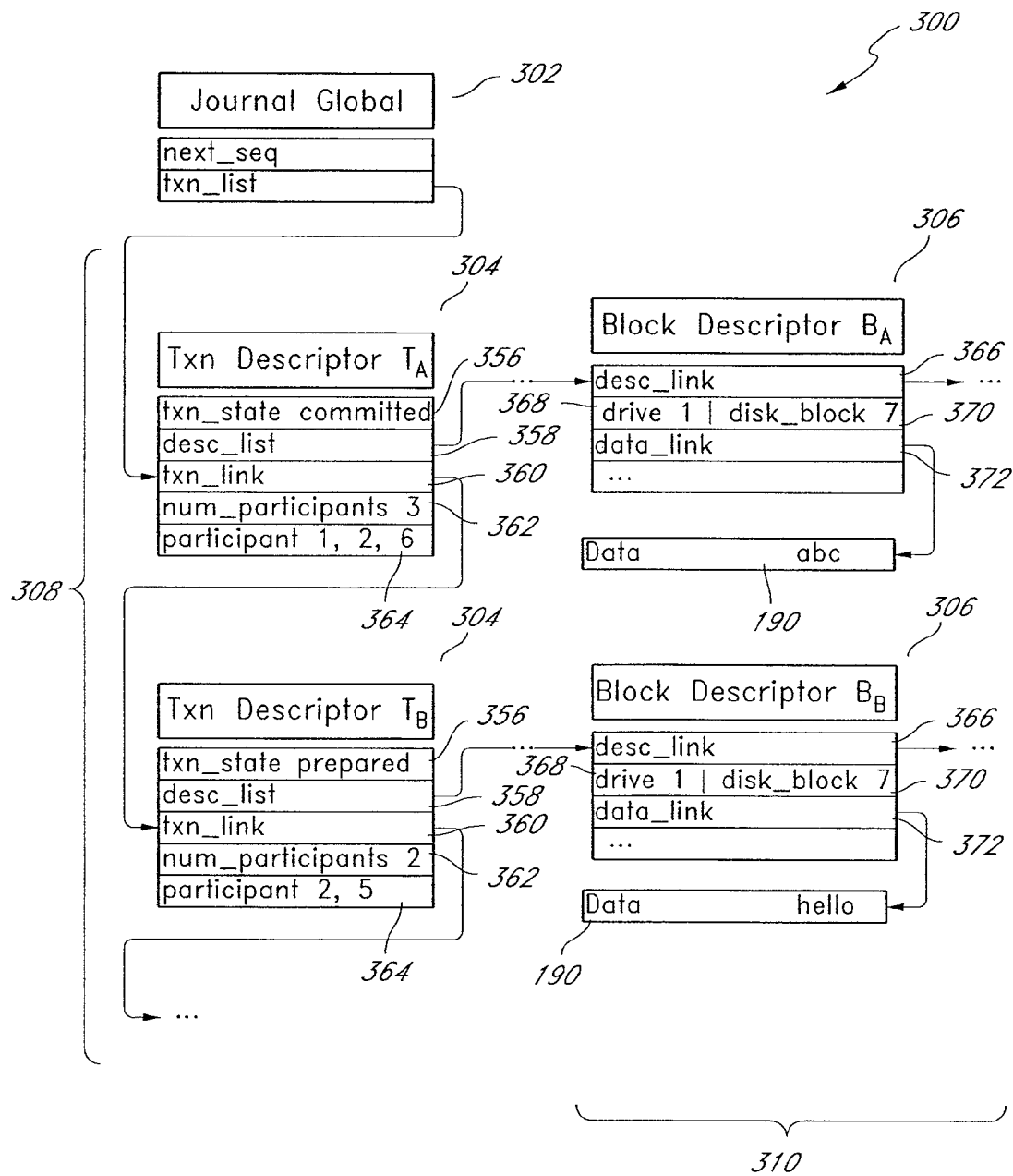
FIG. 8 illustrates embodiments of data structures for implementing a nonlinear journal configured to include a shadow buffer.

FIG. 8 illustrates embodiments of data structures implementing a nonlinear journal capable of maintaining a "shadow buffer." When a memory block 180 is overwritten by a new transaction before the memory block 180 has been written (flushed) to the corresponding hard-disk drive 150, there is a need to keep a copy of the value of the memory block 180 in the event that the overwriting transaction aborts. In one embodiment, a copy of the overwritten value is stored in system memory 152. In another embodiment, the journal block 190 corresponding to the overwritten value is preserved in the nonlinear journal 300 as a "shadow buffer." If the overwriting transaction commits, then the journal block 190 serving as the shadow buffer is freed. If the overwriting transaction aborts, however, the memory block 180 is restored to the value saved in the journal block 190 (the shadow buffer).

In the illustrated embodiment, two transactions journaled in persistent storage 156 modify the same storage destination. Transaction $T_A$ and transaction $T_B$ both include journal blocks 190 that reference the same disk block [1] 178 on hard-disk drive [1] 150. If the first transaction, transaction $T_A$, is not written (flushed) before the second transaction, transaction $T_B$, this circumstance gives rise to the need to create a shadow buffer for the previous data in the respective memory block 180. Nonlinear journal 300 illustrates one embodiment of a nonlinear journal that may be implemented to provide a shadow buffer. This embodiment reduces the need to save a copy of the data in system memory 152, thereby reducing the time and space expense of keeping a system-memory copy.

The following exemplary pseudocode further describes one embodiment of keeping a shadow buffer in the nonlinear journal 300:

```
write_buf( )  if (b is dirty):
                  grab a reference on the previous transaction's block
              modify contents of b
              write b to journal
commit( )     delete previous transaction's block out of the journal
              mark b dirty
abort( )      restore previous contents of b by reading data from previous
              transaction's block
              mark b dirty
```

A. Example Shadow Buffers

Figure 9A:

FIGS. 9A, 9B and 9C illustrate embodiments of maintaining a shadow buffer in a nonlinear journal. In 900, the memory block 180 corresponding to disk block [7] 178 on hard-disk drive [1] 150 is "Invalid," meaning that there is no memory block 180 that corresponds currently to disk block [7] 178 on hard-disk drive [1] 150. The nonlinear journal 300 also has no journal block 190 that corresponds to disk block [7] 178 on hard-disk drive [1] 150. Disk block [7] 178 on hard-disk drive [1] 150 stores the value "XYZ."

In 902, the participant module reads the value of disk block [7] 178 on hard-disk drive [1] 150 into a memory block 180 corresponding to disk block [7] 178 on hard-disk drive [1] 150. The system memory 152 now has a valid memory block 180 corresponding to disk block [7] 178 on hard-disk drive [1] 150.

In 904, the participant module receives a "write [abc] to drive 1, disk_block 7" message corresponding to transaction $T_A$. The participant module stores the value "abc" in the memory block 180 corresponding to disk block [7] 178 on hard-disk drive [1] 150. The participant module then stores the data "abc" to a journal block 190. The respective memory block 180 is clean, which means its data contents cannot yet be written to hard-disk drive [1] 150.

In the illustrated embodiment, when a memory block 180 is "clean," the journal subsystem forbids the disk subsystem from writing the contents of the memory blocks 180 to their corresponding hard-disk drives 150. When a memory block 180 is "dirty," the journal subsystem permits the disk subsystem to write the contents of the memory blocks 180 to their corresponding hard-disk drives 150. In the illustrated embodiment, memory blocks 180 are clean when their contents are uncommitted. In other words, when a memory block 180 is first written with data from an uncommitted transaction, the memory block 180 is clean. After the corresponding transaction is committed, the memory block 180 becomes dirty, and its contents may be written to the respective hard-disk drive 150. If a memory block 180 is written before its corresponding transaction is committed, the result is data corruption because the transaction could abort, leaving the contents of an aborted transaction stored on the respective hard-disk drive 150. After a memory block 180 becomes dirty, it becomes clean again when its contents are written (flushed) to the respective hard-disk drive 180, or when the contents of a new transaction are written to the memory block 180. In FIGS. 9A, 9B, and 9C, the contents of memory block 180 corresponding to disk block [7] 178 on hard-disk drive [1] 150 are marked with a subscript "d" to indicate when the memory block 180 is dirty. When memory block 180 is clean, its contents are not marked.

In 906, the participant module receives a "commit $T_A$" message. The participant module atomically writes the txn_state data field 356 of transaction descriptor [$T_A$] 304 in the nonlinear journal 300 to "committed." Afterwards, the respective memory block 180 is now dirty, indicating that the memory block 180 may be written to hard-disk drive [1] 150. The respective disk block 178 still retains the value "XYZ."

In 908, the participant module writes (flushes) the value "abc" to hard-disk drive [1] 150. The effect is that the drive cache [1] 172 includes a cache block [7] 176 with the value of "abc." Whether the disk controller 170 has written the data "abc" to the corresponding disk block [7] 178 on the appropriate disk platter 174 is uncertain. After flushing the contents of the respective memory block 180 to hard-disk drive [1] 150, the respective memory block 180 is now clean, and the respective disk block [7] 178 on hard-disk drive [1] 150 stores either the value "abc" or "XYZ."

In state 910, the participant module syncs hard-disk drive [1] 150, meaning that the contents of drive cache [1] 172 are flushed to hard-disk drive [1] 150. Accordingly, disk block [7] 178 of hard-disk drive [1] 150 is now synchronized with the respective journal block 190, and the respective journal block 190 is now freed from the nonlinear journal 300. The respective memory block 180 is still clean, and the respective disk block 178 now stores the data value "abc."

Although in the illustrated embodiment synchronization occurs on a per-drive basis, in other embodiments synchronization may transpire on a per-block, per-cache, or per-platter basis, as well as other suitable alternatives and equivalents. For example, an embodiment that included hard-disk drives that offer "forced unit access" could be synchronized on a per-block basis. Additionally and/or alternatively, an embodiment that included hard-disk drives comprising separate caches for a bundle of disk platters could be synchronized on a per-cache or per-platter basis. Moreover, although in the illustrated embodiment synchronization is the result of an explicit cache flush, in other embodiments synchronization may include, for example, periodically reading the disk platters 174 to confirm that the relevant disk blocks 178 have been written. The corresponding hard-disk drives 150 would be configured to return the contents of its respective disk blocks 178, rather than the associated cache blocks 180, which may not have been flushed yet.

In still other embodiments, synchronization may be based on a waiting period that guarantees cache flushing within the determined time frame. For example, hard-disk drives 150 may guarantee a cache flush on a periodic basis. A participant module could be configured to notify the journal subsystem of the cache flush after receiving notification from the respective hard-disk drive 150 of a cache flush or as part of a cache-flush schedule that the hard-disk drives 150 follow on a determinative basis. In yet other embodiments, a least recently used (LRU) expiration model may be used in addition to, or in place of, the synchronization expiration model.

FIG. 9B illustrates an example use of a shadow buffer. Items 900, 902, 904, and 906 in FIG. 9B are the same as in FIG. 9A. In 908, the respective memory block 180 corresponding to disk block [7] 178 on hard-disk drive [1] 150 is not, however, written (flushed) to hard-disk drive [1] 150. Instead, in 912, a new transaction $T_B$ overwrites the respective memory block 180 and also writes a corresponding journal block 190. Because a memory block 180 was overwritten before the previous value was written to hard-disk drive [1] 150, the participant module keeps a copy of the previous value.

In one embodiment, nonlinear journal 300 keeps the copy of the previous value. Because transaction $T_A$ has committed, its associated journal blocks 190, including the journal block 190 corresponding to the previous value of the memory block 180, are candidates for being freed from the nonlinear journal 300 after a drive sync for a corresponding hard-disk drive 150, such as hard-disk drive [1] 150. To keep a shadow buffer of the overwritten memory block 180, the participant module keeps a reference to the journal block 190 corresponding to the value of the overwritten memory block 180. The associated block descriptor 306 and transaction descriptor 304 are likewise retained in the journal for as long as needed. The participant module keeps the shadow buffer until the overwriting transaction $T_B$ either commits or aborts. If the transaction $T_B$ commits, there is no need to keep the shadow buffer because the respective memory block 180 will not be rolled back to the previous value, and the shadow buffer and the associated descriptors are candidates for being freed. If the transaction $T_B$ aborts, the respective memory block 180 is rolled back to the previous value, using the shadow buffer in the nonlinear journal 300, and the journal block 190 that served as the shadow buffer becomes the journal block 190 for the rolled-back value of the memory block 180.

In 912, the respective memory block 180 is clean, the nonlinear journal 300 retains the journal block 190 with the previous data value "abc," the nonlinear journal 300 also retains the journal block 190 with the new value "hello," and disk block [7] 178 on hard-disk drive [1] stores the value "XYZ."

In 914, the transaction $T_B$ commits. This causes the respective memory block 180 to become dirty, meaning its contents may be written to hard-disk drive [1] 150. The shadow buffer in the nonlinear journal 300 does not need to be retained, and the respective journal block 190 with the value "abc" can be freed in a similar manner as if a drive sync had occurred. In the illustrated embodiment, the journal block 190 that served as the shadow buffer is freed automatically. In other embodiments, the journal block 190 that served as the shadow buffer may remain in persistent memory 152 until a garbage collector collects it. The nonlinear journal 300 retains, however, the journal block 190 with the overwritten data value "hello." Disk block [7] 178 on hard-disk drive [1] 150 still stores the value "XYZ."

In 916, the participant module writes (flushes) the respective memory block 180 to hard-disk drive [1] 150. The respective memory block 180 is now clean, and disk block [7] 178 on hard-disk drive [1] 150 is in an unknown condition, storing either the value "XYZ" or the value "hello," depending on whether or not the drive cache [1] 172 has flushed its contents to disk platter [1] 174.

In 918, the participant module syncs hard-disk drive [1] 150. At this point, the memory block 180 is still clean, the journal block 190 with the value "hello" is now freed, and disk block [7] 178 on hard-disk drive [1] 150 stores the value "hello."

FIG. 9C illustrates another alternative, showing the effects of an "abort" message after a shadow buffer has been created. Both 900, 902, 904, and 906 illustrated in FIG. 9C are the same as those illustrated in FIGS. 9A and 9B. And 912 is the same as 912 illustrated in FIG. 9B. Following 912, the respective memory block 180 stores the new data value "hello," and the data has not yet been written (flushed) to hard-disk drive [1] 150, making the memory block 180 clean. The nonlinear journal 300 includes a journal block 190 with the previous value "abc," which is the shadow buffer. The nonlinear journal 300 also includes a journal block 190 with the new value "hello," and disk block [7] 178 on hard-disk drive [1] 150 stores the value "XYZ."

In state 920, the participant module receives an "abort $(T_B)$" message. Because the overwriting transaction has aborted, the respective memory block 180 is rolled back to the previous value "abc" using the shadow buffer in the nonlinear journal 300. The journal block 190 that had stored the aborted value "hello" may be freed. In the illustrated embodiment, the journal block 190 that kept the shadow buffer is automatically freed because aborted journal blocks 190 are treated as if they never happened. In other embodiments, the aborted journal blocks 190 may be freed by a garbage collector. Disk block [7] 178 on hard-disk drive [1] 150 stores the value "XYZ." The memory block 180 now has the data value "abc." Because the corresponding transaction $(T_A)$ has already committed and because the restored contents of the memory block 180 have not been written to hard-disk drive [1] 150, the memory block 180 is dirty.

In 922, the participant module writes (flushes) the respective memory block 180 to disk block [7] 178 on hard-disk drive [1] 150. The respective memory block 180 still has the data value "abc," but is now clean. The nonlinear journal 300 still retains the journal block 190 with the value "abc." Disk block [7] 178 on hard-disk drive [1] 150 stores the value of either "abc" or "XYZ," depending on whether the drive cache [1] 172 has flushed its contents to disk platter [1] 174.

In 924, the participant module syncs hard-disk drive [1] 150. The respective memory block 180 still stores the value "abc" and is still clean. The respective journal block 190 with the data value "abc" is freed, and disk block [7] 178 on hard-disk drive [1] 150 stores the value "abc."

B. Example Shadow Buffer Procedure

Figure 10:
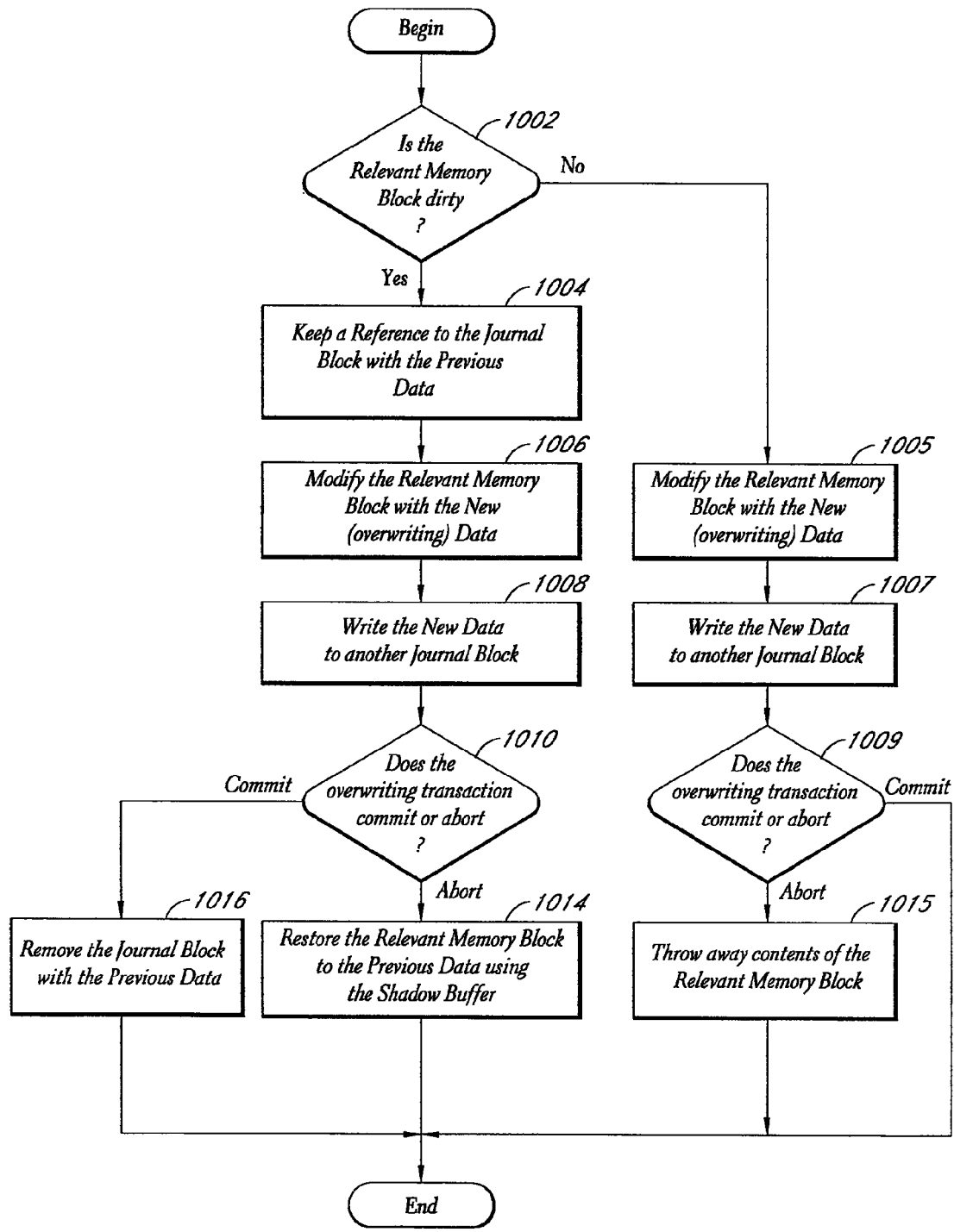
FIG. 10 illustrates a flowchart of one embodiment of implementing shadow buffers in a nonlinear journal.

FIG. 10 illustrates one embodiment keeping a shadow buffer in nonlinear journal 300. In state 1002, the participant module determines whether the relevant memory block 180 is dirty. For purposes of this example, the relevant memory block 180 is a memory block 180 that overwrites previous data with new data. If the relevant memory block 180 is dirty, then the participant module proceeds to state 1005. If the memory block 180 is clean, or not dirty, then the participant module proceeds to state 1004. In this example, a clean memory block 180 refers to a memory block 180 whose contents have committed and have already been written to disk. Memory blocks 180 whose contents are uncommitted are not relevant to shadow buffers because the need for a shadow buffer arises when a memory block 180 is overwritten, and a memory block with uncommitted contents may not, in the illustrated embodiment, be overwritten.

In state 1004, the participant module keeps a reference to the journal block 190 whose contents correspond to the previous data of the relevant memory block 180. This journal block 190 is referred to as a "shadow buffer" for the relevant memory block 180. In state 1006, the participant module modifies the relevant memory block 180 with the new, overwriting data. In state 1008, the participant module writes the new data as a new journal block 190. In state 1010, the participant module determines whether the overwriting transaction either commits or aborts. In one embodiment, the participant module determines whether the transaction commits or aborts by waiting to receive a "commit" or "abort" message from, for example, a global transaction module. If the overwriting transaction aborts, then the participant module proceeds to state 1014. If the overwriting transaction commits, then the participant module proceeds to state 1016.

In state 1014, the participant module restores the relevant memory block 180 to the previous data using the shadow buffer, the journal block 190 with the previous data contents of the relevant memory block 180. In state 1016, the participant module removes the shadow buffer, which is the journal block 190 corresponding to the previous data.

If, in state 1002, it is determined that the relevant memory block 180 is clean, then the participant module, in one embodiment, does not need to keep a shadow buffer. The procedure for processing an overwrite without a shadow buffer is similar to the procedure described above, except the participant module need not keep track of a shadow buffer. In state 1005, the participant module overwrites the relevant memory block 180 with the new (overwriting) data. In state 1007, the participant module writes the new data to another journal block 190 beside the journal block 190 that keeps the previous data. The journal block 190 with the previous data is now a candidate for being released from the nonlinear journal 300. If the overwriting transaction aborts before the journal block 190 with the previous data is synced, the participant module can use its contents to restore the relevant memory block 180. If the overwriting transaction aborts after the journal block 190 with the previous data has been synced, the participant module can read the contents of the corresponding disk block 178 to restore the relevant memory block 180. In state 1009, the participant module determines whether the overwriting transaction commits or aborts. In one embodiment, the participant module may make the determination by waiting to receive either a "commit" or "abort" message from, for example, a global transaction module. If the overwriting transaction commits, the participant module proceeds to the end. If the overwriting transaction aborts, then the participant module proceeds to state 1015. In state 1015, the participant module disregards the contents of the relevant memory block 180, which contents correspond to the aborted transaction.

X. Supporting Concurrent Transactions with a Nonlinear Journal

In one embodiment, a nonlinear journal, such as nonlinear journal 300, allows for limited concurrent transaction support. In some embodiments, when the participant module attempts to write transactions that both include a journal block 190 corresponding to the same disk block 178 on the same hard-disk drive 150, each transaction owns the block exclusively until it resolves. Thus, the first transaction acquires the block and holds it from the moment it writes it until the transaction is committed. At this point, another transaction may wake up and acquire this block for writing. In other words, in some embodiments, two transactions may not both be in the prepared state with data writes to the same block.

To allow for a limited concurrency, some embodiments of a nonlinear journal, such as nonlinear journal 300, take advantage of the idea that some operations are commit order independent. For example, a sequence of additions and subtractions will yield the same result regardless of the order of the operations. Thus, as long as the nonlinear journal 300 includes enough data to reconstruct the block, there is no requirement for exclusivity for these operations. The data structures and modules supported by the nonlinear journal 300 to implement concurrent operations are referred to herein as Deltas. In one embodiment, Deltas can be used at the same time as block-level writes, but since block writes are order-dependent, block writes may wait for delta transactions on the block to commit and flush, and new delta writes may wait for the block write.

There are a number of operations that can be supported using Deltas. Primarily, these operations are order independent, but Deltas may also be used for some partially ordered operations. In one embodiment, order independent operations may include: addition, subtraction, integer multiplication, maximum, minimum, XOR, set union and set intersection. In one embodiment, some of these operations, such as addition/subtraction, may be strictly reversible, meaning that at any point a transaction may be removed by inverting the operation and reapplying it. In one embodiment, other operations (such as maximum) are not strictly reversible, and reapply the delta operations from some known point. In one embodiment, some operations (such as integer multiplication and set union) are subject to overflow. If an overflow occurs, the result may be undefined. In one embodiment, it is the responsibility of the user of the nonlinear journal 300 to guarantee this does not occur. In one embodiment, a type of delta operation may be incompatible with other types of delta operations, as well as with block operations. In one embodiment, the caller guarantees that the operations do not overlap.

Another type of operation that might be done with delta operations is of the class of partially ordered block writes. For example, consider a 512-byte block which is split into four 128-byte regions. If a predecessor block exists, a delta operation might represent a partial-block write to any of these four sub-blocks, each of which would behave similarly to a normal write to a whole block. This allows subdivision of a block between multiple users. Each of these sub-blocks could be written independently of the other sub-blocks. Writes to this sub-block would therefore be partially-ordered such that the ordering is guaranteed only within sub-block boundaries. Up to four transactions could be in progress on a four-region block of this sort at the same time without contention. The "delta" operation in the case of a partially-ordered operation would simply be to overwrite the sub-block in question.

Figure 15:
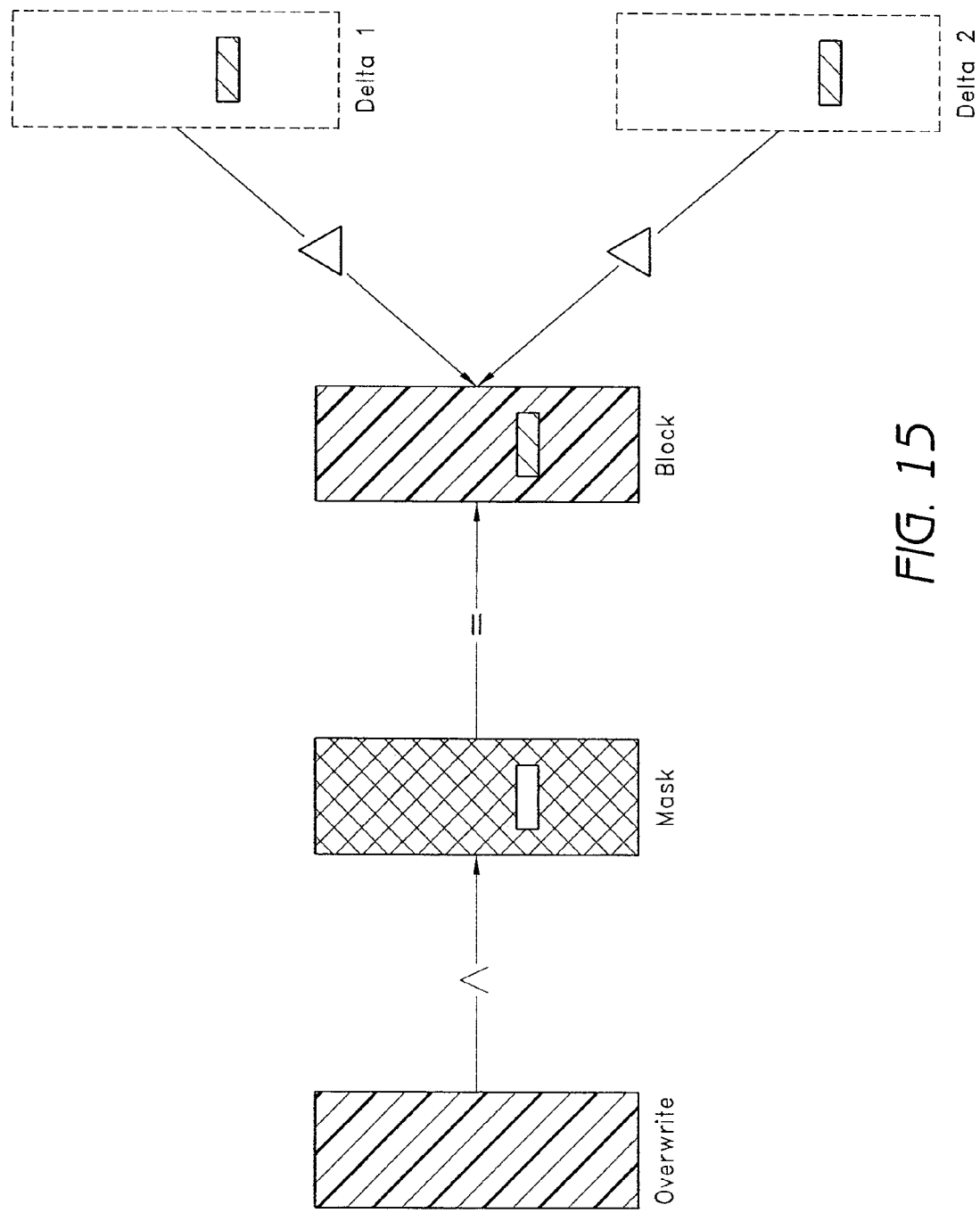
FIG. 15 illustrates one embodiment of combining commit order independent operations with partially ordered block writes.

The idea of partial-block overwrites being independent could be extended to include order-independent operations as well. The basic principle is that a type of delta operation is incompatible with another at the same location. Thus, a single block might be subject to partial-overwrites and delta operations at the same time provided that the same operations do not overlap. One way this could be implemented would be with a mask overwrite. Instead of just overwriting a simple region, a partial-block write would overwrite the block through some arbitrary mask, which masks out the portions of the block meant to be modified through other delta operations. In this way, a large number of transactions could efficiently apply delta operations concurrently, while a disjoint set of transactions could mask overwrite the block serially. To do a full block overwrite, a lock that excludes both mask and delta writes may have to be taken. FIG. 15 illustrate one embodiment of combining commit order independent operations with partially ordered block writes.

In one embodiment, to avoid having to support JO errors on reads, Deltas maintain the property that journal replay is write-only to the hard-disk drives 150. Because of this, delta operations stored in the nonlinear journal 300 points back to a copy of a journal block 190—not a disk block 178. Thus, in one embodiment, the journal does not apply a Delta unless it can find a predecessor journal block 190. When applying a Delta, the nonlinear journal 300 attempts to find a predecessor journal block 190 for the Delta. If one exists, the Delta will be applied. If no journal block 190 corresponding to the same disk block 178 as the Delta exists in persistent memory 152, the journal module will read the disk block 178 and then apply the Delta in a corresponding memory block 180, writing the modified memory block 180 as a normal block-write, which includes recording a journal block 190. This allows the next delta operation to find a predecessor block—the respective journal block 190.

In another embodiment, the predecessor journal block 190 may be omitted, and Deltas may be applied to the data value at the corresponding disk block 178, which requires reading the contents of the disk block 178 into a memory block 180, performing the operation with the Delta, and then writing out the result back to the disk block 178. In addition to the general expense of JO operations, the read may introduce the possibility of a read error, which would prevent the Delta from being written to the disk block 178. In some embodiments, this problem may be overcome by treating the read error as a permanent error and discarding the remaining Deltas until the disk block 178 is overwritten. These embodiments may require modifications to other embodiments described herein.

There may be many important applications of Deltas to support commit-order independent and partially ordered operations. Some possible uses include, without limitation, updating data that represents accounting, ctime, parity, combinations of the same, and suitable equivalents.

A. Delta Data Structures

Figure 11A:
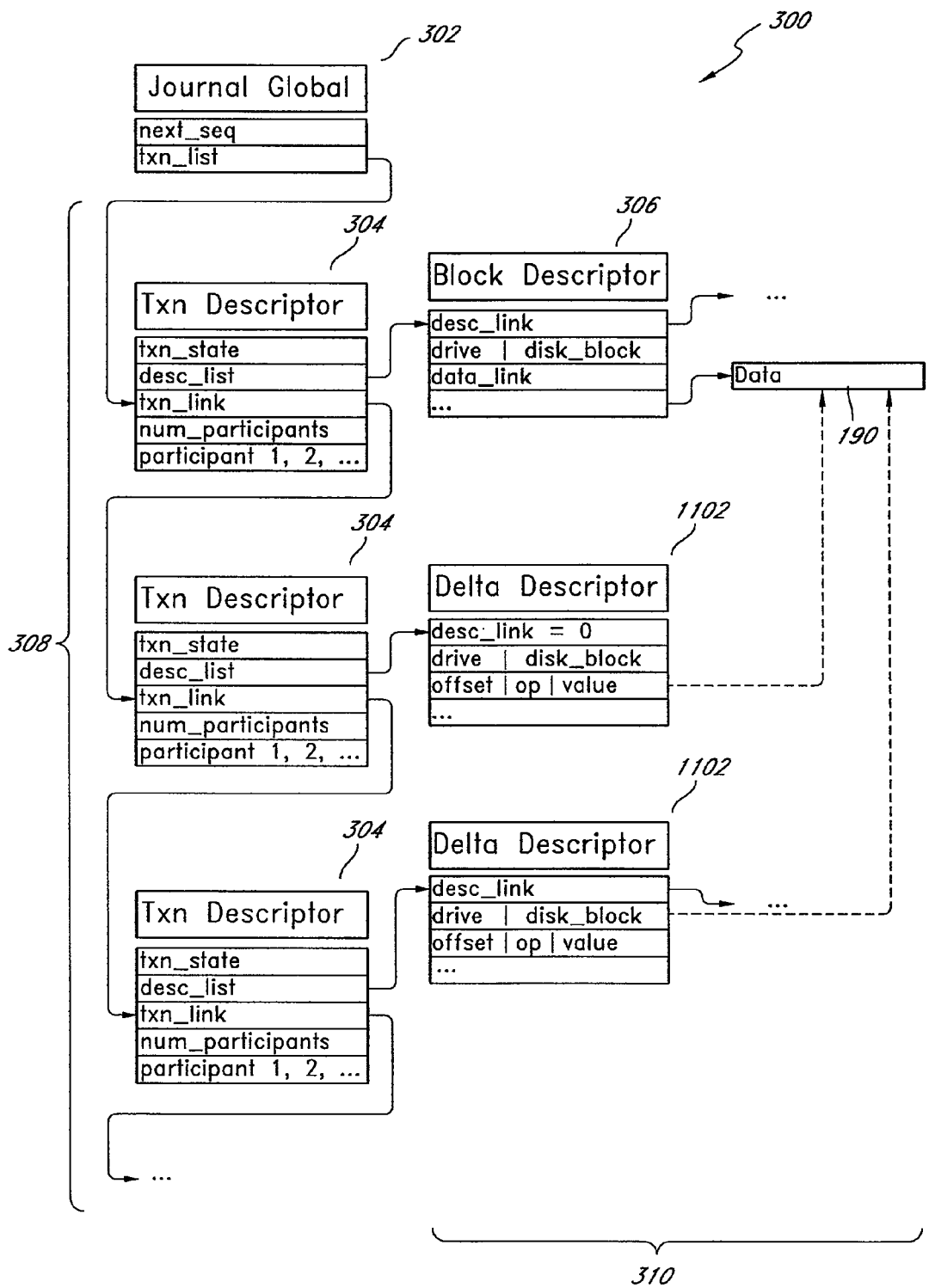
FIGS. 11A and 11B illustrate embodiments of data structures for implementing a nonlinear journal capable of handling concurrent transactions.
Figure 11B:
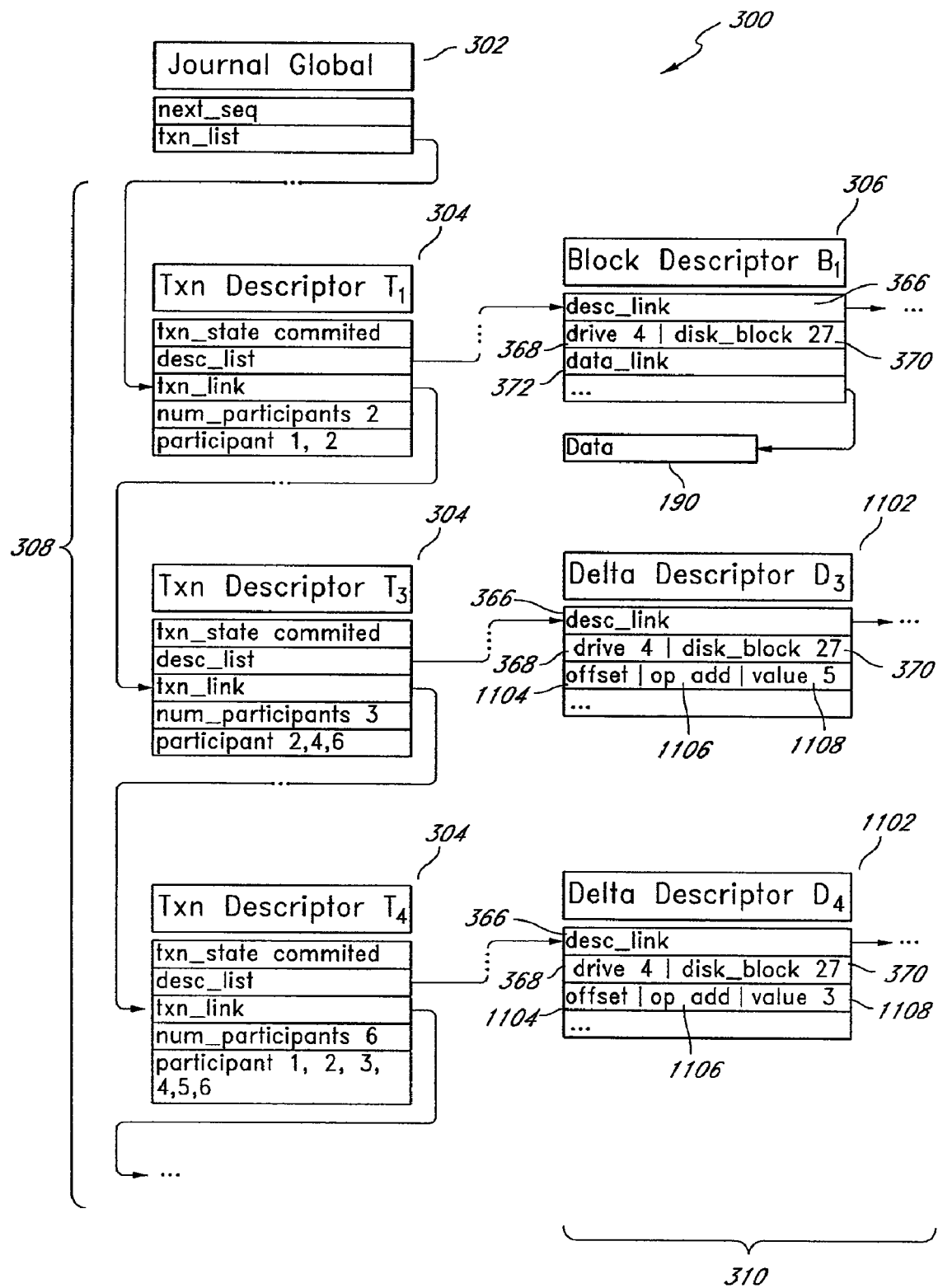

FIGS. 11A and 11B illustrate embodiments of data structures for implementing a nonlinear journal capable of handling concurrent transactions. In the illustrated embodiment, nonlinear journal 300 includes at least three transaction descriptors 304, corresponding to three separate transactions that have been written to nonlinear journal 300. The nonlinear journal 300 also includes a block descriptor 306 that includes at least one journal block 190. The nonlinear journal 300, illustrated in FIG. 11A, also includes at least two delta descriptors 1102. Delta descriptors 1102 include metadata representing certain concurrent transactions. In the illustrated embodiment, the two delta descriptors 1102 and the block descriptor 306 correspond to the same disk block [27] 178 on hard-disk drive [4] 150.

In the illustrated embodiment delta descriptors 1102 are chained along with the block descriptors 306 of each transaction descriptor 304. A delta descriptor 1102 includes a desc_link data field 366 for linking to it other delta descriptors 1102 or block descriptors in a block list 310. A delta descriptor also includes multiple groups of five data fields (called delta elements) that include: a drive data field 368, a disk_block data field 370, an off-set data field 1104, an operation data field 1106, and a value data field 1108. In the illustrated embodiment, there are no direct links between delta descriptors 1102 corresponding to the same disk block 178 on the same hard-disk drive 150, or between delta descriptors 1102 and block descriptors 306. Linkage of these descriptors is determined implicitly when the journal is mounted based on the drive and block addresses. In general, if a Delta exists in the nonlinear journal 300, some journal block 190 to the same location exists previously for the Delta to apply to it. As described above with reference to FIG. 7A, during the mount (rebuild) process, the nonlinear journal 300 is scanned, global transactions are resurrected based on the journal blocks 190 and the associated descriptors, the system waits until the transactions have resolved, and the hard-disk drives 150 are then replayed.

Because, in the illustrated embodiment, a Delta cannot exist by itself, requiring a predecessor block to chain off of, expiring Deltas from the nonlinear journal 300 may require an atomic operation. For the Deltas to stop being relevant and be safe to delete, some atomic operation is done which reliably makes them irrelevant. If the journal block 190 that the respective Delta is associated with is written to disk and synced (presumably after a period of inactivity), then, in one embodiment, the predecessor block may be unlinked, provided that the previous predecessors have already been unlinked. At this point, the Deltas have no block to refer to and can be unlinked as well. On replay, they can simply be ignored.

If the delta block is written to often, though, it may never be written to disk. In this case, it may not be safe to delete the predecessor, so a method to make it safe to delete the deltas and/or predecessor may be used. In one embodiment, the delta writers are quiesced. The delta block could be exclusively locked and synchronously written to the respective hard-disk drive 150. Unfortunately, this may require blocking deltas for a long period of time—which may block the writers in the cluster for some applications. Embodiments of systems and methods for quiescing are disclosed in U.S. patent application Ser. No. 11/357,740, titled "Systems and Methods for Providing a Quiescing Protocol," filed on Feb. 17, 2006, which is hereby incorporated by reference herein in its entirety.

In another embodiment, not involving disk IO, a sequence of Deltas could be collected together and written out in a new Delta against the same block. If, for example, a predecessor journal block 190 had two committed Deltas among a chain of five total Deltas, the two committed Deltas could be collected together and written as a combined Delta already committed when it is written. It may be difficult, however, to atomically unlink the two old Deltas. Thus, this new "compacted" delta transaction may need to include some sort of blackout references in it, indicating that the previous delta transactions no longer apply. If the participant module later reads the delta chain, the blackout references signal it to ignore those Deltas, causing the participant module to read the combined Delta, but not the two lingering Deltas that have been blacked out, though not atomically unlinked.

In still another embodiment, the journal module may do a block-wise overwrite of the entire journal block 190 that the Delta applies to. Once a new definitive copy of the journal block 190 exists, the previous predecessor journal block 190 and delta chains can be freed from the journal safely without worry of atomicity. This new journal block 190 may be thought of as a pseudo-transaction, combining the operations of multiple transactions that apply to the same disk block 178.

Unlinking a delta from the nonlinear journal 300 once it is masked by a full block write (and thus safe), in some embodiments, may approximate unlinking a journal block 190. In some embodiments, an element of the delta descriptor 1102 is atomically zeroed, unless doing so would leave the entire block descriptor 306 and/or the transaction descriptor 304 empty, in which case unlink writes may be elided.

In some embodiments, some blocks may be written entirely through Deltas, and never (or almost never) through whole block writes. Since a whole block write is necessary to free a delta from the journal, some form of periodic flush, in some embodiments, may be necessary or the journal may eventually become completely full of delta blocks. To perform a periodic flush efficiently, the journal may construct a definitive copy of the block to write out as part of a dummy transaction. This block includes a copy of the block as it would appear after all committed transactions, but without the changes that may be made by writing transactions, which may abort. For strictly reversible operations, this block may be constructed by taking the current copy of the block, and then reversing all writing deltas and un-applying them. This would yield the last definitive copy. However, this technique, in some embodiments, may only be possible for reversible operations.

A general technique which may work for all order-independent and partially-ordered operations is to restore the last predecessor block into a temporary buffer, and then apply each committed delta to this block. This may be much more expensive than the strictly reversible approach in terms of CPU time. Once the definitive copy block is constructed, it is written to the journal and then linked into the proper place. Because it represents an order-dependent operation on the block, it is linked into the transaction list after the last transaction it masks, but before any transactions including deltas that it does not represent. In one embodiment, the participant module simply waits for all transactions in the delta chain to either commit or abort, and blocks other transactions from starting, until the definitive copy is constructed and written. In another embodiment, the transaction descriptor 304 could be inserted into the transaction list 308 after the last committed transaction via two ordered atomic writes. This "splicing" of the definitive copy results in this pseudo-transaction committing out of order. Once the dummy transaction is committed, in some embodiments, all blocks and deltas which it masks may be freed from the journal, as if they had been overwritten. For example, if a predecessor journal block 190 had five Deltas, two of which were committed, a definitive copy could be spliced just after the two committed Deltas, but before the three others. The definitive copy becomes the new predecessor journal block 190 and the two committed Deltas can be released as if they had been overwritten.

It should be noted that journal deltas as described may require allocating space in the journal as part of the process of freeing space in the journal. Thus, in some embodiments, there may be a method where, when a journal delta is created, enough space in the journal is reserved to represent a definitive block which allows the deltas and predecessor blocks to be freed. If a drive is down, compaction via definitive block can still be applied, since it only requires journal JO, not disk JO. Thus, once a drive is down, in some embodiments, any block and delta sequence can be compacted into a single block in the journal.

B. Example Concurrent Transactions

FIGS. 12A, 12B, 12C and 12D illustrate embodiments implementing concurrent transactions in a nonlinear journal. In 1200, the relevant memory block 180 is in an "Invalid" state with respect to disk block [27] 178 on hard-disk drive [4] 150. In other words, the system memory 152 does not have a memory block 180 with the current value of the relevant disk block. Disk block [27] 178 on hard-disk drive [4] 150 stores the value of "1." In 1202, the participant module executes a request for an order-independent operation, transaction $T_1$, on the current value of the disk block [27] 178 on hard-drive disk [4] 150. Because the memory block 180 is in the "Invalid" state, the participant module first reads the value of disk block [27] 178 on hard-disk drive [4] 150. Following the read, the relevant memory block 180 stores the value "1," and disk block [27] 178 on hard-disk drive [4] 150 also stores the value "1." The participant module then adds the value "9" to the value in the relevant memory block 180, yielding a result of 10, which is stored in the relevant memory block 180. Because there is no predecessor journal block 190 for disk block [27] 178 on hard-disk drive [4] 150, the participant module then writes the value of the data stored in memory block 180 to a journal block 190, storing as a result the value "10." Because transaction to which journal block 190 corresponds has not yet committed, journal block 190 is writing, which is denoted with a subscript "w." In FIGS. 12A, 12B, 12C, and 12D, the subscript "w" on a journal block 190 represents the writing state and the subscript "c" represents the committed state.

In 1204, the participant module receives a "commit ($T_1$)" message from a global transaction module. The state of the relevant memory block 180 becomes "dirty." In state 1206, the participant module receives a second write request, transaction $T_2$, from a global transaction module. The participant module adds the value "2" to the respective memory block 180, yielding a result of 12, which is then stored in memory block 180. The participant module then writes to persistent storage 156 a delta element representing the order-independent operation of adding the value "2." Because there is a predecessor block, the journal block 190 corresponding to disk block [27] 178 on hard-disk drive [4] 150, the participant module may write a delta element for transaction $T_2$.

In 1208, the participant module receives a request for a third order-independent operation, transaction $T_3$, on disk block [27] 178 on hard-disk drive [4] 150. The participant module adds the value "5" to the respective memory block 180, and writes an appropriate delta element to persistent memory 156.

In 1210, the participant module receives a request for a fourth order-independent operation, transaction $T_4$, on disk block [27] 178 on hard-disk drive [4] 150. The participant module adds "3" to the respective memory block 180, storing the value "20" in the respective memory block 180. The participant module also writes an additional delta element to persistent memory 156.

In 1212, a participant module receives an "abort ($T_2$)" message. In one embodiment, an abort procedure, the participant module reads the old predecessor journal block 190 from persistent memory 156 and, for each delta that has not aborted, applies the delta, using a copy of the delta kept in system memory 152. In another embodiment, for strictly reversible operations, the operation is reversed and the reversed delta is applied. In still another embodiment, the deltas are read from persistent memory 156, rather than from separate copies in system memory 152. The participant module subtracts "2" from the respective memory block 180, and frees the delta element from transaction $T_2$. In one embodiment of the abort procedure, the transaction descriptor 304 is unlinked and then the associated blocks, deltas, and descriptors are reverted in the persistent memory 156 and the space is freed.

In 1214, the participant module receives a "commit ($T_3$)" message. Because not all of the delta elements have been committed for disk block [27] 178 on hard-disk drive [4] 150, the memory block 180 remains in an undirty state. In state 1216, the participant module receives a "commit ($T_4$)" message. Because the predecessor journal block 190 and the corresponding delta elements are committed, the respective memory block 180 enters the dirty state.

FIG. 11B illustrates the status of the nonlinear journal 300, with respect to disk block [27] 178 on hard-disk drive [4] 150, following state 1216. Three transaction descriptors [$T_1$, $T_3$, $T_4$] 304 are linked into the transaction list 308. Transaction descriptor [$T_1$] 178 links to block descriptor [$B_1$] 306, which links to the predecessor journal block 190 for disk block [27] 178 on hard-disk drive [4] 150. Transaction descriptors [$T_3$, $T_4$] 178, respectively, link to delta descriptors [$D_3$, $D_4$] 1102, which include delta elements corresponding to disk block [27] 178 on hard-disk drive [4] 150.

Figures 1, 12D:
Figures 2, 12D:
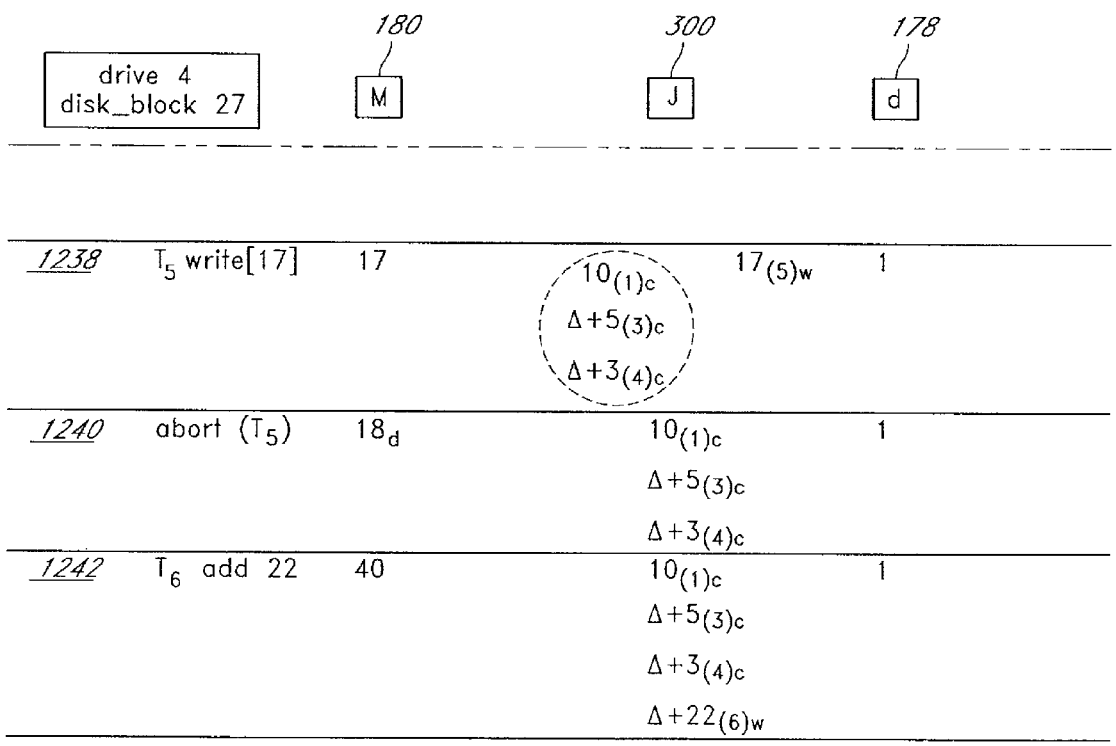

FIGS. 12A, 12B, 12C, and 12D illustrate the states until this point. FIG. 12A further illustrates a drive sync with deltas. In state 1217, the participant module writes (flushes) the contents of memory block 180 to hard-disk drive [4] 150. The contents of memory block 180 are now written into a respective cache block 176 of drive cache 172 on hard-disk drive [4] 150. After writing its contents, memory block 180 becomes clean. In 1218, the participant module syncs hard-disk drive [4] 150. The disk block [27] 178 on hard-disk drive [4] 150 now has the data value of "18." At this point, the journal block 190 and the corresponding delta elements may be unlinked from the nonlinear journal 300 and their space freed in persistent memory 156. In one embodiment, a delta element may be freed directly. A portion of the delta element is atomically overwritten to indicate that it is free, or, if it is the last delta in the delta descriptor 1102, the entire delta descriptor 1102 is freed.

In 1220, the participant module receives a message from the global transaction module requesting another transaction $T_5$, which also includes the respective memory block 180. The value 10 is added to the respective memory block 180 and the new value of the memory block 180 "28" is written to the nonlinear journal 300. In 1222, the participant module receives a message from the global transaction module committing transaction 5. The respective memory block 180 is in the dirty state, the journal block 190 is unchanged, and this block 178 is also unchanged.

FIG. 12B further illustrates coalescing predecessor blocks and delta elements. In 1224, the participant module receives a fifth request for an order-independent operation, transaction $T_5$, on disk block [27] 178 on drive [4] 150. The participant module adds the value "10" to the relevant memory block 180, and writes a corresponding delta element to persistent memory 156. In state 1226, the participant module receives a "commit ($T_5$)" message. The relevant memory block 180 is now in a dirty state. In 1228, the participant module receives a message to overwrite, transaction $T_6$, the relevant memory block 180. This may be an independent overwrite request, but it may also be a system-generated overwrite to coalesce the previous delta elements into a new predecessor journal block 190. The write value "28" equals the combination of the previous predecessor journal block 190 and its associated delta elements.

Because the previous value of the respective memory block 180 was not yet written to hard-disk drive [4] 150, the participant module creates a shadow buffer in the nonlinear journal 300 in order to save a copy of the previous value in the event that transaction $T_5$ aborts. In 1230, the participant module receives a "commit ($T_6$)" message. The relevant memory block 180 is in a dirty state, and there is no need to retain a copy of the previous value of the memory block 180, so the shadow buffer in the nonlinear journal 300 is freed.

FIG. 12C further illustrates overwriting a predecessor block and its associated delta elements. In 1232, the participant module receives a message to overwrite the relevant memory block 180 with the value "17." The participant module overwrites the respective memory block 180. Because the previous value of the respective memory block 180 "18" was not written to disk yet, the participant module creates a shadow buffer in the nonlinear journal 300. In state 1234, the global transaction module commits transaction $T_5$. The memory block 180 is in a dirty state, and the shadow buffer in the nonlinear journal 300 is freed. In state 1236, the global transaction module requests an order-independent operation on the respective memory block 180. The respective memory block 180 now stores the resultant value, and a delta element corresponding to the transaction $T_6$ is stored in persistent memory 156.

FIG. 12D further illustrates aborting an overwrite of a predecessor block and its associated delta elements. In 1238, the participant module receives a request from the global transaction module to overwrite the respective memory block 180 with the value of "17." The participant module stores the previous value of the memory block by retaining a reference to the journal block 190 and the associated delta elements. In 1240, the global transaction module aborts transaction $T_5$. The participant module uses the respective journal block 190 and the associated delta elements to restore the memory block 180 to its previous value "18." In 1242, the participant module receives a message from the global transaction module to add the value "22" to the respective memory block 180, the participant module adds the value to the current value in the relevant memory block 180, resulting in the value "40." The participant module also saves a delta element corresponding to the order-independent operation corresponding to transaction $T_6$.

C. Concurrent Transaction Procedure

Figure 13:
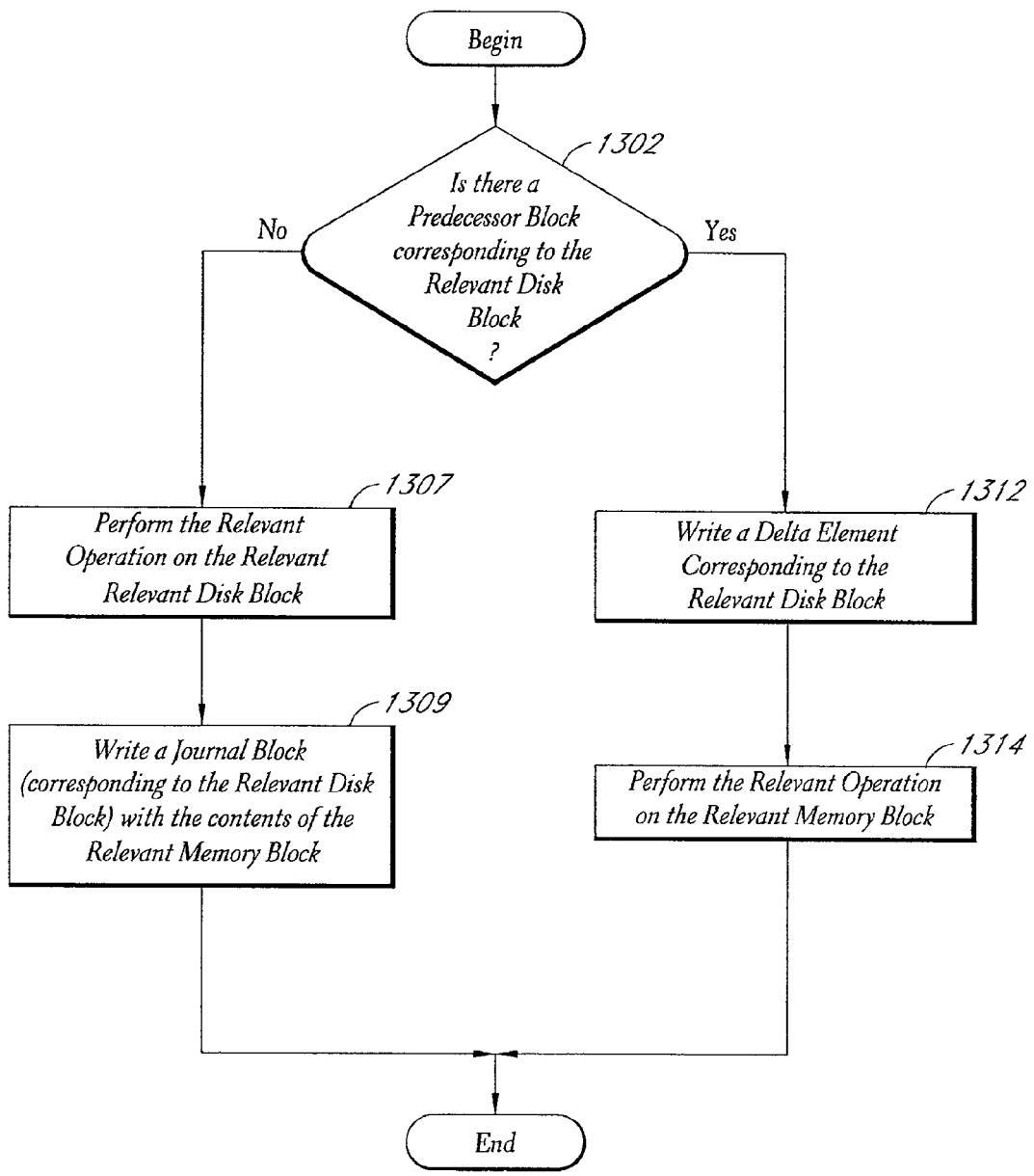
FIG. 13 illustrates a flowchart of one embodiment of implementing concurrent transactions in a nonlinear journal.

FIG. 13 illustrates a flowchart of one embodiment implementing concurrent transactions in a nonlinear journal. In state 1302, the participant module determines whether there is a predecessor journal block 190 corresponding to the relevant disk block 178. In this example, the relevant disk block 178 is the disk block 178 to which Deltas are being applied. In one embodiment, the participant module determines whether there is a predecessor journal block 190 by traversing the nonlinear journal 300. If there is no predecessor journal block 190, the participant module proceeds to state 1307. If there is a predecessor journal block 190, the participant module proceeds to state 1312. In state 1307, the participant module performs the relevant operation on the relevant disk block 178. In this example, the relevant operation is the order-independent or partially ordered operation for which a Delta is being used. In state 1309, the participant module writes a journal block 190 that corresponds with the relevant disk block 178, giving it the data contents of the relevant memory block 180. In this example, the relevant memory block 180 is the memory block 180 corresponding to the relevant disk block 178. If in state 1302, the participant module determines that there is a predecessor journal block 190, the participant module proceeds to state 1312. In state 1312, the participant module writes a delta element that corresponds to the relevant disk block 178. In state 1314, the participant module 1314 performs the relevant operation on the relevant memory block 180.

In the illustrated embodiment, the participant module implements Deltas by looking for a "predecessor block" and performing a delta if one is found. If there was no predecessor block, the participant module reads the relevant disk block 178 into a corresponding memory block 180, apply the Delta to the contents of the memory block 180, and write the result as a full block write. Other embodiments, however, are possible. In another embodiment, for example, if there is no predecessor journal block 190, a local transaction is started. The relevant disk block 178 is read for this transaction. A corresponding journal block 190 is then written with the contents of the relevant disk block 178. The transaction is committed, and the written journal block 190 becomes the predecessor journal block 190. Now the Delta may be performed with the predecessor journal block 190.

Figure 14:
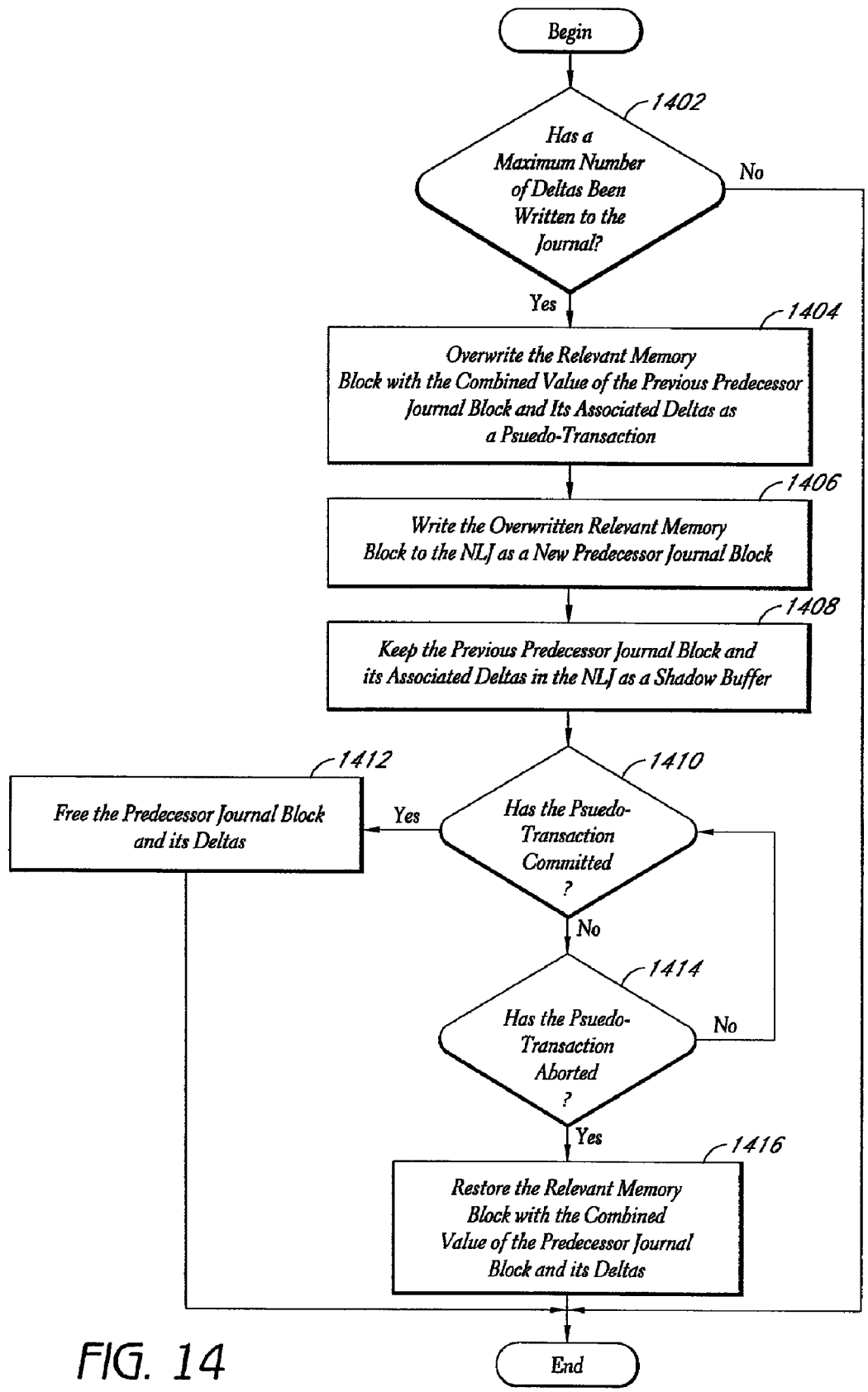
FIG. 14 illustrates a flowchart of one embodiment of collapsing delta data structures in a nonlinear journal.

FIG. 14 illustrates one embodiment of collapsing delta descriptors in nonlinear journal 300. In state 1402, the participant module determines whether a maximum number of deltas have been written to the nonlinear journal 300. In one embodiment, the participant module determines whether a maximum number of deltas has been written for the entire nonlinear journal 300. Additionally and/or alternatively, the participant module may determine whether a maximum number of deltas has been written to the nonlinear journal 300 for a particular transaction 200. If a maximum number of deltas has been written to the nonlinear journal 300, the participant module proceeds to state 1404. If a maximum number of deltas has not been written to the nonlinear journal 300, the participant module proceeds to write the relevant delta to persistent storage 156. In state 1404, the participant module overwrites the relevant memory block 180 with the combined value of the previous predecessor journal block 190 and its associated deltas. The participant module considers the combined operation as a separate transaction 200, referred to herein as a pseudo-transaction. In state 1406, the participant module writes the overwritten relevant memory block 180 to persistent storage 156 as a new predecessor journal block 190. In state 1408, the participant module keeps the previous predecessor journal block 190 in the nonlinear journal 300 as a shadow buffer. In state 1410, the participant module determines whether the pseudo-transaction has committed. If the pseudo-transaction has committed, then the participant module proceeds to state 1412. If the pseudo-transaction has not committed, the participant module proceeds to state 1414. In state 1412, the participant module frees the previous predecessor journal block 190 and its associated deltas. In state 1414, the participant module determines whether the pseudo-transaction aborted. If the pseudo-transaction aborted, the participant module proceeds to state 1416. If the pseudo-transaction did not abort, the participant module returns to state 1410, and repeats states 1410 and 1414 until the pseudo-transaction commits or aborts. In state 1416, the participant module restores the relevant memory block 180 to the combined value of the previous predecessor journal block 190 and its deltas.

XI. Other Embodiments

While certain embodiments of the invention have been described, these embodiments have been presented by way of example only, and are not intended to limit the scope of the present invention. Accordingly, the breadth and scope of the present invention should be defined in accordance with the following claims and their equivalents.

What is claimed is:

1. A system for atomically updating a journal for a data storage unit, comprising:
   persistent memory; and
   a program module configured to update a journal located in said persistent memory with atomic operations, wherein the updates to the journal include journal data that is too large to be recorded in a single atomic operation, wherein an atomic operation is an operation that either commits or aborts;
   wherein the journal is not in an inconsistent state following a write failure to update the journal, wherein an inconsistent state is a state in which it is not known whether the data was actually written before the write failure.

2. The system of claim 1, wherein the program module configured to update comprises being configured to update by linking at least one of the following into the journal: data and metadata.

3. The system of claim 1, wherein the program module configured to update comprises being configured to update by unlinking at least one of the following from the journal: data and metadata.

4. The system of claim 1, wherein the program module configured to update comprises being configured to modify metadata fields.

5. A computer implemented method of building atomically a journal for a data storage unit, comprising:

recording data in persistent memory, the data being too large to be recorded in a single atomic operation, wherein an atomic operation is an operation that either commits or aborts; and building a journal in the persistent memory, the journal comprising the data, wherein the journal is built by linking into the journal at least one of the following: the data and metadata associated with the data;

wherein the journal is built with atomic operations such that the journal does not comprise only a portion of the data.

6. The system of claim 1, wherein journaled data is designated to be written to a location on a storage device associated with the data storage unit, said data storage device being one of a plurality of storage devices associated with said data storage unit.

7. The system of claim 6, wherein data that is journaled corresponds to a plurality of transactions, and the data to be written for each of the plurality of transactions is to be distributed among two or more of the plurality of storage devices.

8. The system of claim 6, wherein at least one of data and metadata is unlinked in response to a communication from the storage device that the data has been stored at the location.

9. The system of claim 8, wherein the communication indicates that a data cache on the storage device has been flushed.

10. The system of claim 6, wherein at least one of data and metadata is unlinked based on a determination that the data is the least recently used data corresponding to the storage device.

11. The computer implemented method of claim 5, wherein the journal is built using one of the following: linked list, two-dimensional linked list, linked list of multiple-dimensional linked lists, binary tree, and b tree.

12. The computer implemented method of claim 5, further comprising unlinking at least one of the following from the journal: data and metadata.

13. The computer implemented method of claim 5, wherein journaled data is designated to be written to a location on a storage device associated with the data storage unit.

14. The computer implemented method of claim 13, further comprising unlinking data from the journal in response to a communication from the storage device that the data has been stored at the location.

15. A computer-readable storage medium having instructions stored thereon for implementing, when the instructions are executed, a journal for a data storage unit, the instructions comprising:

recording data in persistent memory, the data being too large to be recorded in a single atomic operation, wherein an atomic operation is an operation that either commits or aborts; and linking into a journal in the persistent memory at least one of the following: the data and metadata associated with the data;

wherein the linking comprises an atomic operation such that the journal does not comprise only a portion of the data.

16. The computer-readable storage medium of claim 15, wherein the journal includes one of the following: linked list, two-dimensional linked list, linked list of multiple-dimensional linked lists, binary tree, and b tree.

17. The computer-readable storage medium of claim 15, the instructions further comprising unlinking at least one of the following from the journal: data and metadata.

18. The computer-readable storage medium of claim 15, wherein journaled data is designated to be written to a location on a storage device associated with the data storage unit.

19. The computer-readable storage medium of claim 18, the instructions further comprising unlinking data from the journal in response to a communication from the storage device that the data has been stored at the location.

20. A computer implemented method for journaling data to be written to a data storage unit, comprising:

storing a plurality of data groups in persistent storage, the data groups associated with data to be written to the data storage unit, wherein at least one of the data groups is too large to be recorded in a single atomic operation; and adding the data groups to a journal stored in persistent storage, wherein adding the data groups to the journal comprises storing information about the location of each of the data groups in the journal, wherein the information about the location of each of the data groups is of a size that is capable of being written in a single atomic operation;

wherein each data group is added to the journal in a single atomic operation such that the journal is not in an inconsistent state following a write failure to update the journal.

21. A system for journaling data to be written to a data storage unit, comprising:

a computer-readable storage;

a processor configured to access the computer-readable storage; and a journal module configured to:

add a first journal entry to a journal, wherein the journal comprises a plurality of journal entries, wherein each journal entry comprises a portion that is of a size at which the portion may be written in a single atomic operation;

add a second journal entry to the journal, wherein the second journal entry of the journal comprises a first portion that is of a size at which the portion may be written in a single atomic operation and a second portion that is too large to be written in a single atomic operation;

add a third journal entry to the journal; and remove the second journal entry from the journal in a single atomic operation, wherein removing the second journal entry comprises performing an atomic write to a journal entry portion that is of a size at which the portion may be written in a single atomic operation, such that immediately after the atomic write the first portion of the second journal entry and the second portion of the second journal entry have been removed from the journal as a consequence of the single atomic operation.

22. The system of claim 21, wherein journaled data is designated to be written to a location on a storage device associated with the data storage unit, wherein the second journal entry is removed in response to a communication from the storage device that the data has been stored at the location.

* * * * *